(12) United States Patent
Steelberg et al.

(10) Patent No.: US 8,239,267 B2
(45) Date of Patent: *Aug. 7, 2012

(54) MEDIA PLAY OPTIMIZATION

(75) Inventors: Chad Steelberg, Newport Beach, CA (US); Ryan Steelberg, Irvine, CA (US); Scott Beauchamp, Indianapolis, IN (US); Russell Kevin Ketchum, Newport, CA (US)

(73) Assignee: Google Inc., Mountain View, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/694,684

(22) Filed: Mar. 30, 2007

(65) Prior Publication Data
US 2007/0168254 A1    Jul. 19, 2007

Related U.S. Application Data

(63) Continuation of application No. 11/445,768, filed on Jun. 1, 2006.

(60) Provisional application No. 60/686,535, filed on Jun. 1, 2005.

(51) Int. Cl.
*G06Q 30/00* (2012.01)

(52) U.S. Cl. .................................. 705/14.64

(58) Field of Classification Search .................. None
See application file for complete search history.

(56) References Cited

U.S. PATENT DOCUMENTS

| | | | |
|---|---|---|---|
| 4,517,562 A | 5/1985 | Martinez | |
| 5,260,778 A | 11/1993 | Kauffman et al. | |
| 5,422,624 A | 6/1995 | Smith | |
| 5,504,482 A | 4/1996 | Schreder | |
| 5,515,098 A | 5/1996 | Carles | |
| 5,649,300 A | 7/1997 | Snyder et al. | |
| 5,664,948 A | 9/1997 | Dimitriadis et al. | |
| 5,697,844 A | 12/1997 | Von Kohorn | |
| 5,712,985 A * | 1/1998 | Lee et al. | 705/7 |
| 5,738,583 A | 4/1998 | Comas et al. | |
| 5,806,018 A | 9/1998 | Smith et al. | |
| 5,999,808 A | 12/1999 | LaDue | |
| 6,104,815 A | 8/2000 | Alcorn et al. | |
| 6,151,600 A * | 11/2000 | Dedrick | 1/1 |
| 6,198,906 B1 | 3/2001 | Boetje et al. | |

(Continued)

FOREIGN PATENT DOCUMENTS

CN    1285079 A    2/2001

(Continued)

OTHER PUBLICATIONS

"By Using Multicast, Wireless Communication, New Information Can Be Distributed," Nikkei Internet Technology, Sep. 22, 1997, pp. 106-111, vol. 3.

(Continued)

*Primary Examiner* — Colleen Hoar
(74) *Attorney, Agent, or Firm* — Fish & Richardson P.C.

(57) ABSTRACT

Systems, methods, and a user interface for automatically scheduling a media play is disclosed. The user can specify criteria for play of the media play, including times, stations, and/or external criteria such as a weather condition or the occurrence of an event. Information relevant to the entered criteria is received and assessed against the criteria to determine if the criteria are met. Responsive to the received information meeting the criteria for play of the media play, an accessor accesses the media play inventory and inserts the media play into a media feed.

31 Claims, 33 Drawing Sheets

U.S. PATENT DOCUMENTS

| | | | |
|---|---|---|---|
| 6,212,392 B1 | 4/2001 | Fitch et al. | |
| 6,286,005 B1* | 9/2001 | Cannon | 707/100 |
| 6,298,218 B1 | 10/2001 | Lowe et al. | |
| 6,338,043 B1 | 1/2002 | Miller | |
| 6,416,414 B1 | 7/2002 | Stadelmann | |
| 6,430,603 B2 | 8/2002 | Hunter | |
| 6,470,180 B1 | 10/2002 | Kotzin et al. | |
| 6,498,987 B1* | 12/2002 | Kelly et al. | 702/3 |
| 6,508,710 B1 | 1/2003 | Paravia et al. | |
| 6,526,275 B1 | 2/2003 | Calvert | |
| 6,527,638 B1 | 3/2003 | Walker et al. | |
| 6,527,641 B1 | 3/2003 | Sinclair et al. | |
| 6,628,928 B1 | 9/2003 | Crosby et al. | |
| 6,628,939 B2 | 9/2003 | Paulsen | |
| 6,650,892 B1 | 11/2003 | Thiriet | |
| 6,674,995 B1 | 1/2004 | Meyers et al. | |
| 6,678,501 B1 | 1/2004 | Valeski | |
| 6,711,474 B1* | 3/2004 | Treyz et al. | 701/1 |
| 6,735,435 B2 | 5/2004 | Newell et al. | |
| 6,767,284 B1 | 7/2004 | Koza | |
| 6,778,820 B2 | 8/2004 | Tendler | |
| 6,820,277 B1 | 11/2004 | Eldering et al. | |
| 6,895,238 B2 | 5/2005 | Newell et al. | |
| 6,957,041 B2 | 10/2005 | Christensen et al. | |
| 6,975,835 B1 | 12/2005 | Lake et al. | |
| 7,031,932 B1 | 4/2006 | Lipsky et al. | |
| 7,080,018 B1* | 7/2006 | Fox et al. | 705/14.5 |
| 7,185,044 B2* | 2/2007 | Ryan et al. | 709/200 |
| 7,231,358 B2 | 6/2007 | Singh et al. | |
| 7,313,359 B2 | 12/2007 | Steelberg et al. | |
| 2001/0003099 A1 | 6/2001 | Von Kohorn | |
| 2001/0034772 A1 | 10/2001 | Fisher et al. | |
| 2001/0042019 A1 | 11/2001 | Omachi | |
| 2001/0048748 A1 | 12/2001 | Van Ryzin | |
| 2001/0055954 A1 | 12/2001 | Cheng | |
| 2002/0010625 A1* | 1/2002 | Smith et al. | 705/14 |
| 2002/0013757 A1* | 1/2002 | Bykowsky et al. | 705/37 |
| 2002/0038455 A1 | 3/2002 | Srinivasan et al. | |
| 2002/0049037 A1 | 4/2002 | Christensen et al. | |
| 2002/0049717 A1 | 4/2002 | Routtenberg et al. | |
| 2002/0059619 A1 | 5/2002 | Lebar | |
| 2002/0069404 A1 | 6/2002 | Copeman et al. | |
| 2002/0087532 A1 | 7/2002 | Barritz et al. | |
| 2002/0092019 A1* | 7/2002 | Marcus | 725/37 |
| 2002/0095339 A1 | 7/2002 | Galloway | |
| 2002/0103699 A1* | 8/2002 | Figueiras Ferreiro | 705/14 |
| 2002/0132575 A1 | 9/2002 | Kesling et al. | |
| 2002/0151272 A1 | 10/2002 | Simon | |
| 2002/0168967 A1 | 11/2002 | Clapper | |
| 2003/0014483 A1 | 1/2003 | Stevenson et al. | |
| 2003/0023489 A1* | 1/2003 | McGuire et al. | 705/14 |
| 2003/0032409 A1 | 2/2003 | Hutcheson et al. | |
| 2003/0033292 A1 | 2/2003 | Meisel et al. | |
| 2003/0055816 A1 | 3/2003 | Paine et al. | |
| 2003/0069032 A1 | 4/2003 | Jarvi et al. | |
| 2003/0093792 A1* | 5/2003 | Labeeb et al. | 725/46 |
| 2003/0119528 A1 | 6/2003 | Pew et al. | |
| 2003/0139190 A1 | 7/2003 | Steelberg et al. | |
| 2003/0149988 A1 | 8/2003 | Ellis et al. | |
| 2003/0177490 A1 | 9/2003 | Hoshino et al. | |
| 2003/0182266 A1* | 9/2003 | Stern | 707/1 |
| 2003/0225641 A1 | 12/2003 | Gritzmacher et al. | |
| 2004/0028388 A1 | 2/2004 | Kataoka et al. | |
| 2004/0038723 A1 | 2/2004 | Schneier et al. | |
| 2004/0054589 A1* | 3/2004 | Nicholas et al. | 705/14 |
| 2004/0064524 A1 | 4/2004 | Van Steenbergen et al. | |
| 2004/0083133 A1* | 4/2004 | Nicholas et al. | 705/14 |
| 2004/0093394 A1 | 5/2004 | Weber et al. | |
| 2004/0103024 A1 | 5/2004 | Patel et al. | |
| 2004/0117831 A1 | 6/2004 | Ellis et al. | |
| 2004/0127199 A1 | 7/2004 | Kagan et al. | |
| 2004/0177383 A1 | 9/2004 | Martinolich et al. | |
| 2004/0194131 A1 | 9/2004 | Ellis et al. | |
| 2004/0205829 A1* | 10/2004 | Hane, III | 725/135 |
| 2005/0021521 A1 | 1/2005 | Wycoff | |
| 2005/0090279 A9 | 4/2005 | Witkowski et al. | |
| 2005/0137958 A1 | 6/2005 | Huber et al. | |
| 2005/0188402 A1 | 8/2005 | de Andrade et al. | |
| 2005/0198317 A1 | 9/2005 | Byers | |
| 2005/0229202 A1 | 10/2005 | Berstis | |
| 2005/0239402 A1 | 10/2005 | Gioscia et al. | |
| 2005/0267817 A1 | 12/2005 | Barton et al. | |
| 2005/0289630 A1 | 12/2005 | Andrews et al. | |
| 2006/0026067 A1* | 2/2006 | Nicholas et al. | 705/14 |
| 2006/0074752 A1 | 4/2006 | Newmark | |
| 2006/0080171 A1* | 4/2006 | Jardins et al. | 705/14 |
| 2006/0212916 A1 | 9/2006 | Steelberg et al. | |
| 2007/0022032 A1 | 1/2007 | Anderson et al. | |
| 2007/0027762 A1 | 2/2007 | Collins et al. | |
| 2007/0067297 A1* | 3/2007 | Kublickis | 707/9 |
| 2007/0106610 A1 | 5/2007 | Forsythe et al. | |
| 2007/0168254 A1 | 7/2007 | Steelberg et al. | |
| 2007/0169146 A1 | 7/2007 | Steelberg et al. | |

FOREIGN PATENT DOCUMENTS

| | | |
|---|---|---|
| JP | 03-184486 | 8/1991 |
| JP | 05-284162 | 10/1993 |
| JP | 07-505028 | 6/1995 |
| JP | 09-018430 | 1/1997 |
| JP | 2000-244427 | 9/2000 |
| WO | WO 99/49663 | 9/1999 |
| WO | WO 02/01869 A1 | 1/2002 |

OTHER PUBLICATIONS

"Eonstreams, Inc. Secures Financing to Deploy Revolutionary Ad Insertion Capability," Source Eonstreams, Inc., Mar. 29, 2005, 2 Pages, [online] [retrieved on Apr. 8, 2005] Retrieved from the Internet: <URL: http://www.prnewswire.com/cgi-bin/stories.pl?ACCT=104&STORY=/www/story/03-29-2005/0003288 . . . >.

"Eonstreams, Advertise with us!," Eonstreams, Inc., 2006, 1 page, [online] [retrieved on Apr. 28, 2006] Retrieved from the Internet: <URL: http://www.eonstreams.com/Advertisers.htm>.

"Eonstreams, advertising . . . ," Eonstreams, Inc., 2004, 1 page, [online] [retrieved on Apr. 7, 2005] Retrieved from the Internet: <URL: http://www.eonstreams.com/ServicesAdv.htm>.

"Eonstreams, be on eon!," Eonstreams, Inc., 2004, 1 page, [online] [retrieved on Apr. 7, 2005] Retrieved from the Internet: <URL: http://www.eonstreams.com/>.

"Eonstreams, Better together . . . ," Eonstreams, Inc., 2006, 1 page, [online] [retrieved on May 22, 2006] Retrieved from the Internet: <URL: http://www.eonstreams.com/>.

"Eonstreams, case studies . . . ," Eonstreams, Inc., 2004, 2 pages, [online] [retrieved on Apr. 7, 2005] Retrieved from the Internet: <URL: http://www.eonstreams.com/SamplesCase.htm>.

"Eonstreams, clients love us . . . ," Eonstreams, Inc., 2004, 1 page, [online] [retrieved on Apr. 7, 2005] Retrieved from the Internet: <URL: http://www.eonstreams.com/Testimonials.htm>.

"Eonstreams, FAQs," Eonstreams, Inc., Mar. 3, 2006, 7 pages, [online] [retrieved on Apr. 28, 2006] Retrieved from the Internet: <URL: http://www.eonstreams.com/HowToFaqs.htm>.

"Eonstreams, Kevin Woods, CTO," Eonstreams, Inc., 2004, 1 page, [online] [retrieved on Apr. 7, 2005] Retrieved from the Internet: <URL: http://www.eonstreams.com/CoInfoCTO.htm>.

"Eonstreams, pay-per-view . . . ," Eonstreams, Inc., 2004, 1 page, [online] [retrieved on Apr. 7, 2005] Retrieved from the Internet: <URL: http://www.eonstreams.com/ServicesPPV.htm>.

"Eonstreams, Press releases . . . ," Eonstreams, Inc., Feb. 2, 2006, 6 pages, [online] [retrieved on Apr. 28, 2006] Retrieved from the Internet: <URL: http://www.eonstreams.com/PressReleases.htm>.

"Eonstreams, Steve Newman, CEO," Eonstreams, Inc., 2004, 1 page, [online] [retrieved on Apr. 7, 2005] Retrieved from the Internet: <URL: http://www.eonstreams.com/CoInfoCEO.htm>.

"Eonstreams, streaming . . . ," Eonstreams, Inc., 2004, 1 page, [online] [retrieved on Apr. 7, 2005] Retrieved from the Internet: <URL: http://www.eonstreams.com/ServicesStreaming.htm>.

"Eonstreams, Streaming . . . ," Eonstreams, Inc., 2006, 1 page, [online] [retrieved on Apr. 28, 2006] Retrieved from the Internet: <URL: http://www.eonstreams.com/Streaming.htm>.

"Eonstreams, subscription . . . ," Eonstreams, Inc., 2004, 1 page, [online] [retrieved on Apr. 7, 2005] Retrieved from the Internet: <URL: http://www.eonstreams.com/ServicesSub.htm>.

"Eonstreams, Susan Seagraves, CFO," Eonstreams, Inc., 2004, 1 page, [online] [retrieved on Apr. 7, 2005] Retrieved from the Internet: <URL: http://www.eonstreams.com/CoInfoCFO.htm>.

"Eonstreams, testimonials, 650WSM Nashville's Country Legend!, WSM | Citadel Broadcasting Corporation," Eonstreams, Inc., 2004, 1 page, [online] [retrieved on Apr. 7, 20057] Retrieved from the Internet: <URL: http://www.eonstreams.com/TestimonialsWSM.htm>.

"Eonstreams, testimonials, Citadel Communications Corporation, WSM | Citadel Broadcasting Corporation," Eonstreams, Inc., 2004, 2 pages, [online] [retrieved on Apr. 7, 2005] Retrieved from the Internet: <URL: http://www.eonstreams.com/TestimonialsCitadel.htm>.

"Eonstreams, Tools . . . ," Eonstreams, Inc., 2006, 1 page, [online] [retrieved on Apr. 28, 2006] Retrieved from the Internet: <URL: http://www.eonstreams.com/How_To_Tools.htm>.

"Eonstreams, total solutions . . . ," Eonstreams, Inc., 2004, 1 page, [online] [retrieved on Apr. 7, 2005] Retrieved from the Internet: <URL: http://www.eonstreams.com/Services.htm>.

"Eonstreams, what we do . . . ," Eonstreams, Inc., 2004, 1 page, [online] [retrieved on Apr. 7, 2005] Retrieved from the Internet: <URL: http://www.eonstreams.com/Samples.htm>.

"Eonstreams, Who we are . . . ," Eonstreams, Inc., 2006, 1 page, [online] [retrieved on Apr. 28, 2006] Retrieved from the Internet: <URL: http://www.eonstreams.com/About_Us.htm>.

"Eonstreams, WIVK Knoxville, TN . . . ," Eonstreams, Inc., 2004, 1 page, [online] [retrieved on Apr. 7, 2005] Retrieved from the Internet: <URL: http://www.eonstreams.com/SamplesDemosWIVK.htm>.

"Eonstreams, Z100, NY . . . ," Eonstreams, Inc., 2004, 1 page, [online] [retrieved on Apr. 7, 2005] Retrieved from the Internet: <URL: http://www.eonstreams.com/SamplesDemosZ100.htm>.

Jones, J. L., et al., "Combinatorial Auctions Using Rule-Based Bids," Decision Support Systems, 2002, pp. 59-74, vol. 34.

"MediaSpan Online Services Partners With Eonstreams," EContentMag.com, Feb. 3, 2006, 3 pages, [online] [retrieved on Apr. 28, 2006] Retrieved from the Internet: <URL: http://www.econtentmag.com/Articles/ArticleReader.aspx?ArticleID=1 5031>.

"NAB2005—The World's Largest Electronic Media Show," National Association of Broadcasters, 2005, 2 pages, [online] [retrieved on Apr. 28, 2006] Retrieved from the Internet: <URL: http://www.nabshow.com/exhibitors/NAB2005/company.asp?id=11150>.

"Streaming Audio and Video Development and Media Hosting Solutions," VitalStream, Inc., 2000-2006, 1 page, [online] [retrieved on May 22, 2006] Retrieved from the Internet: <URL: http://www.vitalstream.com/about/index.html.>.

"VitalStream Acquires Eonstreams to Provide Comprehensive Online Advertising Solutions," VitalStream, Press Release, May 22, 2006, 3 pages, [online] [retrieved on May 22, 2006] Retrieved from the Internet: <URL: www.vitalstream.com/news/release-05-22-06.html>.

PCT International Search Report, PCT/US02/04769, Jul. 23, 2002, 2 pages.

PCT International Search Report, PCT/US02/19983, Oct. 18, 2002, 1 page.

PCT International Search Report and Written Opinion, PCT/US06/09350, Jan. 11, 2007, 7 pages.

European Supplementary Search Report, EP06771930.2, Apr. 14, 2011, 6 pages.

U.S. Patent Office, U.S. Appl. No. 11/694,684, filed Mar. 30, 2007, in Office Action mailed Mar. 17, 2010, 13 pages.

U.S. Patent Office, U.S. Appl. No. 11/554,965, filed Oct. 31, 2006, in Office Action mailed Feb. 5, 2010, 11 pages.

U.S. Patent Office, U.S. Appl. No. 11/694,684, filed Mar. 30, 2007, in Office Action mailed Jun. 1, 2009, 11 pages.

U.S. Patent Office, U.S. Appl. No. 11/694,691, filed Mar. 30, 2007, in Office Action mailed Aug. 11, 2009, 13 pages.

U.S. Patent Office, U.S. Appl. No. 11/694,691, filed Mar. 30, 2007, in Office Action mailed Mar. 26, 2010, 14 pages.

PCT Communication including International Search Report (PCT Application No. PCT/US06/21433), 9 pages, mailed Jun. 27, 2008.

United States Patent Application entitled "Media Play Optimization Using Make Good Strategies," U.S. Appl. No. 11/530,864, filed Sep. 11, 2006.

U.S. Patent Office, U.S. Appl. No. 11/445,768, filed Jun. 1, 2006, in Office Action mailed Dec. 17, 2009, 16 pages.

U.S. Patent Office, U.S. Appl. No. 11/445,768, filed Jun. 1, 2006, in Office Action mailed Jun. 16, 2009, 13 pages.

* cited by examiner

FIG. 9I dMarc RadioAds Beta - Mozilla Firefox

File Edit View Go Bookmarks Tools Help https://services.dmarc.net/radioads/cmFitWizCreatives.aspx dMarc  *Innovation through Automation*™

| Campaign Management | Account Management | Reports |

Audio Creatives

1) Campaign type [edit]   Creative Length [edit]   Markets [edit]   Formats [edit]
2) Run times and budgets [edit]

Step 3a: Select audio creatives

| Creative Name | Creative Phone # | Tracking Phone # | Call Center Phone # | Expiration Date | Status | Type | Listen |
|---|---|---|---|---|---|---|---|
| ☑ CROOKED TEETH - 011106 | 60 | | | | Approved | Uploaded | listen |
| ☑ Google Local Ad -- Crooked Teeth Specialist | 60 | | | | Pending Approval | Uploaded | listen |
| ☑ Placeholder: 60 second spot | 60 | | | | Approved | Uploaded | listen |
| ☑ TOOTH DOCTOR - 011106 | | | | | Approved | Uploaded | listen |

New Media

[ Save & Continue > > ]

2005 dMarc Broadcasting, Inc.    -    RadioAds Home    -    Privacy Policy    -    Contact Us 995
914

| | Type | Created | Modified | Starts | Ends | Ad Cap | Spent | Plays | Audience | Status | History |
|---|---|---|---|---|---|---|---|---|---|---|---|
| ▼ Google Local (329) | | | | | | | | | | | |
| ○ Clean Teeeth | CPM / D / P / 60 / 2676 | Feb-27-06 | Feb-28-06 | Mar-05-06 | | $1,000.00 | $0.00 | 0 | 0 | Expired | History |
| ○ Local-Teeth Jan. 13 | CPM / D / P / 60 / 2428 | Jan-11-06 | Jan-12-06 | Jan-13-06 | Jan-13-06 | $25.00 | $22.84 | 2 | 2,300 | Expired | History |
| ○ Local-Teeth Jan. 13 - Jan 16 | CPM / D / P / 60 / 2436 | Jan-12-06 | Jan-13-06 | Jan-16-06 | Jan-16-06 | $1,000.00 | $787.10 | 49 | 157,400 | Stopped | History |
| ○ Local-Teeth Jan. 17 - Jan 19 | CPM / D / P / 60 / 2430 | Jan-11-06 | Jan-12-06 | Jan-17-06 | Jan-19-06 | $200.00 | $973.28 | 4 | 54,100 | Expired | History |

999

Example of Feedback from Previous Plays

Example of Feedback from Previous Plays

MEDIA PLAY OPTIMIZATION

CROSS-REFERENCE TO RELATED APPLICATION

This application is a continuation of U.S. patent application Ser. No. 11/445,768, filed Jun. 1, 2006, entitled "Media Play Optimization," which claims priority under 35 U.S.C. §119(e) to U.S. Provisional Patent Application Ser. No. 60/686,535, "System and Method for Media Play Optimization," filed Jun. 1, 2005, the subject matters of which are incorporated herein by reference in their entirety.

FIELD OF THE INVENTION

The present invention relates to broadcasting and online media, and more particularly to systems for selling, scheduling and tracking media plays.

BACKGROUND

Audio advertisers spend great sums of money and countless hours to produce advertising campaigns aimed at maximizing the response from the listeners. By tailoring the advertising media, the timing of the audio play, the content of the advertisement, and many other variables, advertisers can influence who will or is likely to hear the advertising message. In this way, audio advertisers can concentrate their efforts on reaching the listeners who are most likely to respond to their advertising message. Generally, advertisers are willing to pay more money for advertising slots that allow them to deliver their message to the most members of their target audience. Because advertisers have a limited budget and limited time to manage campaigns, they are eager to identify which campaigns are effective and, perhaps more importantly, which are not.

At the same time, broadcasters rely on advertising revenues from selling advertising air time to cover operational expenses. Thus, it is to the broadcaster's advantage to sell all available advertising air time in order to maximize income. Unfortunately, a significant portion of the available advertising air time is not sold due market demand factors, poor ratings, station inefficiencies, trafficking logistics, programming logistics, and other factors. In fact, radio stations, for example, often operate with daily unsold advertising inventory that accounts, on average, for up to 30% of the total advertising air time. This unpaid air time has traditionally been filled with public service advertisements, bonus advertisements, remnant advertisements and/or low-priority advertisements.

SUMMARY

One embodiment of the present invention is directed to a system for optimizing play of media content. The system includes a hub that is at least partially remote from a media content play point. The hub accesses and instructs a forwarding of the media content for play. At least one output associated with the hub contributes non-play content, and at least one module at the media content play point parses the non-play content. The parsed non-play content enables the hub to instruct a preemption of a first of the media play content with an accessing and insertion of a second of the media play content to the media content play point.

In another embodiment, the present invention also includes a user interface for scheduling media plays. The user can specify, via the user interface, criteria for play of the media play, including times, stations, and/or external criteria such as a weather condition or the occurrence of an event. Information relevant to the selected criteria is received and assessed against the criteria to determine if the criteria are met. Responsive to the received information meeting the criteria for play of the media play, an accessor accesses the media play inventory and inserts the media play into a media feed.

According to one aspect of the invention, the criteria for play of the media play can include a targeted response to a previous media play. For example, information regarding the number of phone calls, website hits, coupons used, or sales in response to a previous media play can be used as criteria to determine what to play in the future.

It is to be understood that the figures and descriptions of the present invention have been simplified to illustrate elements that are relevant for a clear understanding of the present invention, while eliminating, for the purposes of clarity, many other elements found in a typical inventory tracking system. Those of ordinary skill in the pertinent art will recognize that other elements are desirable and/or required in order to implement the present invention.

BRIEF DESCRIPTION OF THE DRAWINGS

FIG. 10 is an illustration of an example campaign summary.

A person skilled in the art will readily recognize from the following discussion that alternative embodiments of the structures and methods illustrated herein may be employed without departing from the principles of the invention described herein.

DETAILED DESCRIPTION OF THE EMBODIMENTS

It is to be understood that the figures and descriptions of the present invention have been simplified to illustrate elements that are relevant for a clear understanding of the present invention, while eliminating, for the purpose of clarity, many other elements found in typical communication system and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

In one embodiment, the present invention provides a system and method for scheduling the broadcast of an audio advertisement according to specified criteria with the goal of improving the listener response to the advertising message. The present invention may provide a communication environment configured to monitor and track a specific advertisement or program.

Figure 1:
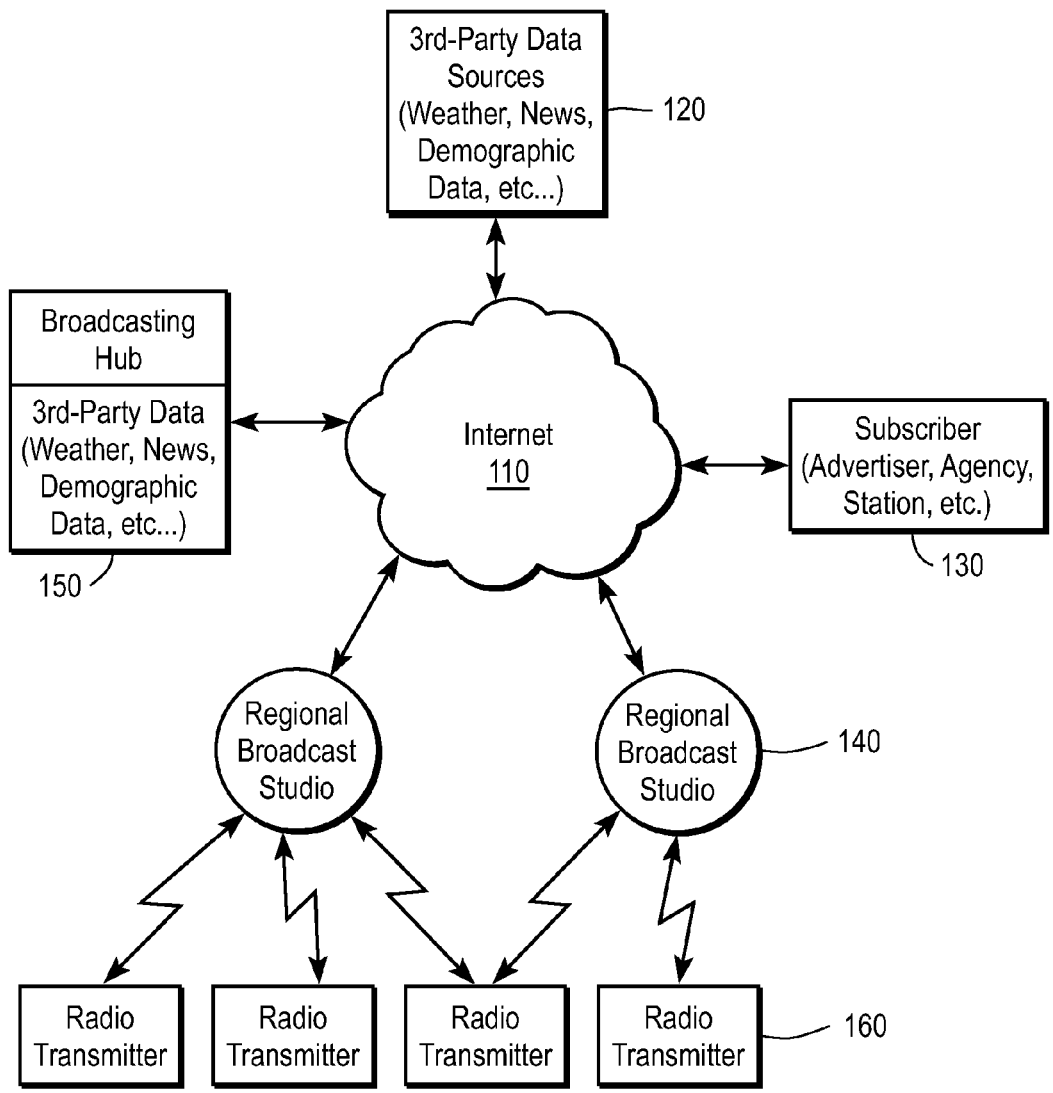
FIG. 1 illustrates an architecture of a communication system 100 according to an aspect of the present invention.

FIG. 1 shows an example architecture of a communication system 100 according to an aspect of the present invention. Communication system 100 may include a network 110 to communicatively couple third-party data sources 120, at least one subscriber 130, at least one regional broadcast studio 140, and a broadcasting hub 150. In a radio broadcast implementation, at least one regional studio 140 may be further communicatively coupled to at least one radio transmitter 160.

As shown in FIG. 1, the network 110 is the Internet. In other implementations, the network 110 can be any network, such as a LAN, a MAN, a WAN, a wired or wireless network, a private network, or a virtual private network.

In the example shown in FIG. 1, third-party data sources can be any database, data mart, or other data source that provides data of interest to a subscriber 130 relevant to the scheduling of their advertisement. For example, the third-party data may be Arbitron ratings and demographic breakdowns for each station in a broadcast network. In addition, third-party data may be the weather forecast, current weather conditions, or news events such as stock prices, sports scores, data from a syndicated data feed such as an RSS feed, or any other data relevant to a subscriber's desire to play an advertisement. In another embodiment, information or data is received or collected directly by the broadcasting hub 150 rather than from third-party sources. Regardless of the source, the broadcasting hub 150 uses the information in evaluating whether criteria are met for the play of an advertisement.

A subscriber 130 is also communicatively coupled to the broadcasting hub 150. This allows the subscriber 130 to purchase, schedule, and upload an advertising spot using a user interface of the broadcasting hub 150 that is described in detail below. Subscriber 130 may access hub 150 via a connection to internet 110. The connection to internet 110 may be any conventional connection that allows access to hub 150. For example, subscriber 130 may access hub 150 using TCP/IP and a conventional dial-up connection over a modem, or a dedicated connection that provides constant access. Hub 150 may have a unique HyperText Transfer Protocol (HTTP) address, a unique FTP address, or any other addressing scheme that allows subscriber 130 to identify hub 150. Subscribers 130 can be advertisers, agencies, stations, or any other entity that interacts with the broadcasting hub 150. In some embodiments subscribers 150 have an account with the broadcasting hub 150 and are charged a fee for use of the broadcasting hub 150. In other embodiments, subscribers can access the broadcasting hub 150 free of charge.

A regional broadcast studio 140 is also communicatively coupled to the broadcasting hub 150, such that the broadcasting hub 150 is capable of forwarding an advertisement to the regional broadcast studio 140 for play. Thus, a subscriber 130 is capable of submitting to the broadcasting hub 150 an advertisement for play along with specific criteria for the play of that advertisement, and the broadcasting hub 150 will forward the advertisement to a regional broadcasting studio 140 for play as appropriate.

Stations may desire and may be able to isolate themselves from the internet for a myriad of reasons. According to an aspect of the present invention and pursuant to what is currently deemed best practice for radio stations, stations may isolate mission critical on-air work stations from the public internet. Specifically, the present system may enable on-air workstations to connect securely to a data center over the internet without the on-air workstation being connected directly to the internet. Such a configuration may be achieved by using encryption and secure protocols, including, but not limited to outbound-originating protocols.

According to an aspect of the present invention, the identification of when a radio advertisement or radio program was broadcast may be achieved. This identification may be performed within the broadcasting hub 150. Within hub 150 a data collector may identify verification of broadcast information related to an audio file associated with an advertising campaign or radio program, and may forward that information to networked environment 110. Hub 150 may include software for tabulating and formatting the information into a serviceable report, such as in response to a request by subscriber 130. The information in, for example, such a report, may be presented based on many different criteria, such as, for example, the total number of advertising or programming broadcasts per campaign, a listing of which stations the radio advertisement or program was broadcast over, an hourly breakdown of the broadcasts, the demographics of the broadcast audience, the geography of the broadcast audience, and/or the format of the radio stations.

According to an aspect of the present invention, the reports available to subscriber 130 may reflect the latest information available. The verification of broadcast information may be forwarded from the data collector to networked environment 110, such as when the verification of broadcast information becomes available from broadcast hub 150. Such a substantially real-time report may provide subscriber 130 with substantially real-time data regarding the delivery of radio advertisements and radio programs. In other embodiments, a substantially real-time report may provide subscriber 130 with real-time data regarding the delivery of advertisements or other media plays over VoIP, internet streaming, or other media.

According to an aspect of the present invention, the verification of broadcast information associated with advertising campaigns or programs may be combined with other information, and may be stored in additional databases or memories either resident on or accessible by network 110, to produce reports of demographic information about the audience of the advertising campaign or program. Such other information for combination with the verification information may be obtained, for example, from relevant internet or intranet sites, either automatically in response to an instruction included with the submission of the program to be broadcast, or manually upon receipt of a subscriber request.

Figure 2:
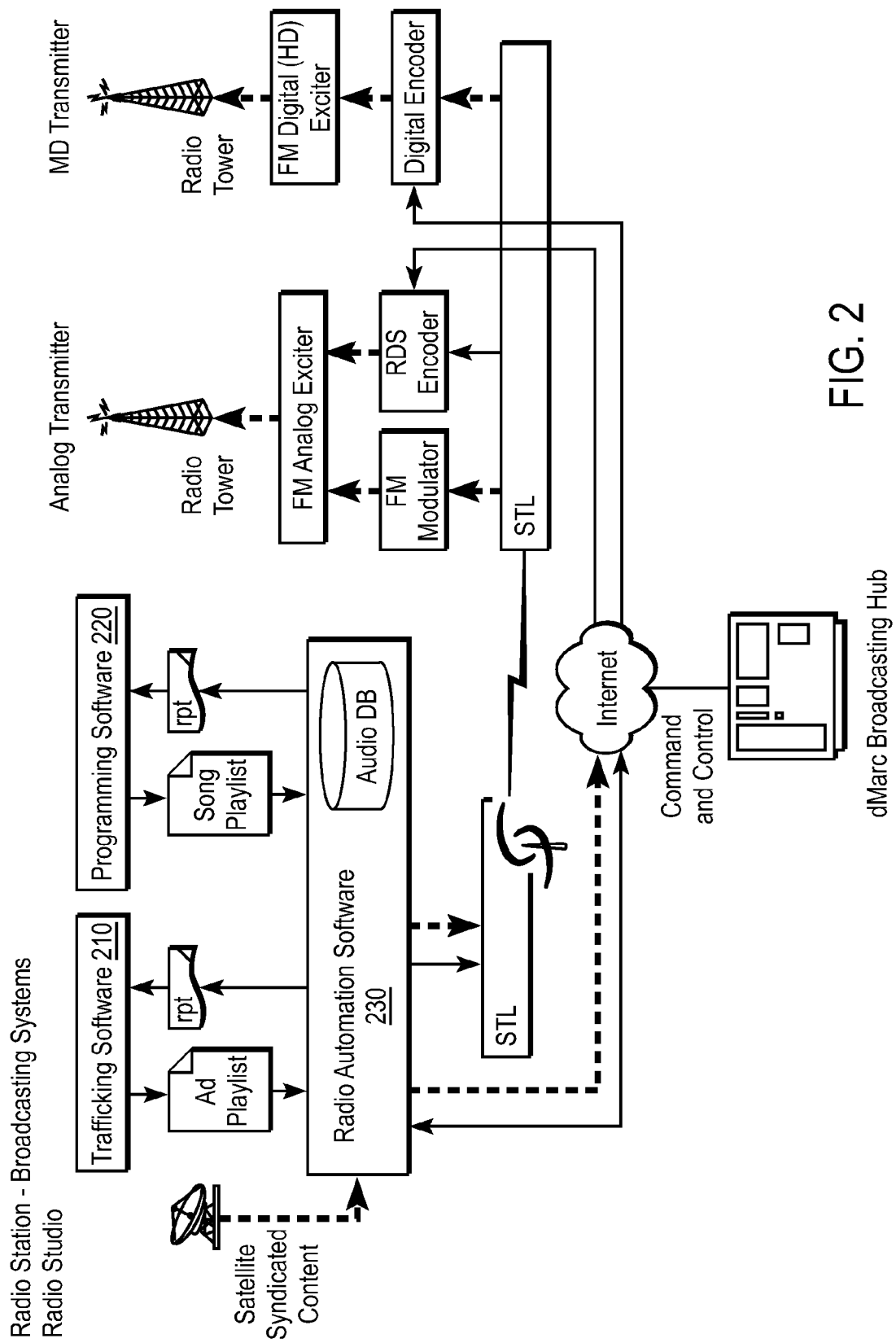
FIG. 2 further illustrates the system of FIG. 1.

In order to more fully describe the interconnectivity, an exemplary embodiment is set forth herein below. FIG. 2 shows a system according to an aspect of the present invention. Subscriber 130 may conduct one or more advertising campaigns by purchasing audio advertisements across several local and regional radio stations, for example. Subscriber 130 may distribute audio commercials to the radio stations for scheduling by a regional broadcast studio 140. Subscriber 130 may verify the delivery and track the broadcast of each of the one or more advertising campaigns and associated audio commercials. It may be beneficial for subscriber 130 to engineer the one or more advertising campaigns with a unique and corresponding file name. In this regard, each audio commercial digital file may have a subscriber-associated unique file name. The audio files associated with the advertising campaigns are referred to in this discussion as "campaign creative."

Regional broadcast studio 140 may broadcast a campaign creative for subscriber 130. Regional broadcast studio 140 may initiate a broadcast of the campaign creative by scheduling broadcast delivery within its trafficking system 210 or programming system 220. The campaign creative may be loaded onto radio automation software 230 of station 140. Radio automation software 230 may include the scheduling and/or "flight" information as provided by trafficking system 210 and programming system 220. Broadcast hub 150 may forward scheduling information regarding the campaign creative, captured from radio automation software 230, to data collector. In one embodiment, at the scheduled time, radio automation software 230 may stream the campaign creative to a station transmitter 160 for subsequent broadcast over the air. Broadcast hub 150 may forward verification of broadcast information regarding the campaign creative, captured from radio automation software 230, to data collector. The data collector may accumulate and/or store the information passed from broadcast hub 150.

According to an aspect of the present invention, data collector may isolate the verification of broadcast information related to campaign identifiers, for example, by including a table identifying the campaign identifiers. When verification of broadcast information arrives regarding one of the campaign identifiers in the campaign identifier table, the data collector may forward that verification of broadcast information ("campaign information") to hub 150. The data collector may forward the campaign information as it arrives, or on a timed basis, such as in fifteen minute increments, one-hour increments, several-hour increments, or other increment known to those skilled in the pertinent arts. The rate at which the campaign information is passed from the data collector to hub 150 may limit how current, or real-time, a report may be. In this regard, the data collector according to an aspect of the present invention may be configured to provide the campaign information to hub 150 in real-time, such as not later than a few hours after the campaign information becomes available at the data collector. A portion of hub 150 may include a web server that receives the verification of broadcast information associated with each campaign identifier (the campaign information) from the data collector and stores that information on a permanent storage medium, such as a hard disk drive. The web server may tabulate the campaign information based on each campaign identifier. The table containing the campaign information may be as current as the rate at which the data collector provides the campaign information to the web server. Consequently, hub 150 via the web server may be able to generate reports of the broadcast of radio advertisements and radio programming in substantially real-time.

Hub 150 may provide access to the tabulated data over internet 110. Although internet 110 may be described as a wide area network for making the reports available to subscribers, those skilled in the art will appreciate that the system and method of the present invention encompasses any wide area network that allows access by subscribers to data stored on hub 150.

Hub 150 may include server software, such as within a web server, that may allow subscriber 130 to request a report of a particular radio advertisement broadcast or radio program broadcast at any time. For example, subscriber 130 may connect to internet 110 in the middle of the day on a Tuesday. At that time, subscriber 130 may log on to hub 150 using a secure access protocol and issue a request to the web server to provide a report. The issued request identifies the particular radio advertisement or radio program of interest by campaign identifier. Hub 150 may respond to the request by reading the data stored in the table of campaign information associated with the campaign identifier provided by subscriber 130. Software resident on the web server may tabulate the report in accordance with the request. Finally, the web server publishes, such as in HTML or XML format, for example, the report to subscriber 130. In this manner, subscriber 130 may access and query the web server as frequently as desired to determine the broadcast of a particular advertising campaign or radio program.

Hub 150 and the web server may be configured to transmit reports to subscriber 130 at predetermined intervals, such as immediately, hourly, daily, weekly, or other time frame. For instance, software may be configured to simulate a subscriber request and cause the web server to generate and transmit the report to subscriber 130. Alternative means of delivery may also be employed, such as via electronic mail. These and other alternatives will become apparent to those skilled in the art upon a study of the disclosed embodiments.

Hub 150 and the web server may be configured to generate the report in response to a triggering event. Examples of such a triggering event may be a confirmation of broadcast for a select advertisement or program, or of a situation wherein an advertisement or program was scheduled to broadcast, but failed to deliver, or of an advertising campaign reaching a dollar cap value, for example. For instance, the web server may be configured to analyze the campaign information as it is received from the data collector. If the campaign information reflects that an advertisement with a specified campaign identifier was scheduled to broadcast at a certain time, but failed to broadcast, the web server may respond by issuing a flag to subscriber 130. According to an aspect of the present invention, the web server may be configured to extract from the campaign information the advertising client's telephone number, email, fax, or the like associated with the campaign identifier and transmit the broadcast information directly to subscriber 130 or someone associated with the subscriber, such as to follow up on the failed broadcast. The campaign information may be transmitted by digital or voice pager, by e-mail message, by human interaction, or by any other mechanism for alerting subscriber 130. In that manner, subscriber 130 may be substantially immediately notified that an advertisement failed to broadcast, and be provided with the radio station's contact information and advertising client information.

A myriad of reports can be created. By way of non-limiting example only, such reports may include campaign delivery by station, campaign delivery by market, campaign delivery by date, campaign delivery by hour, broadcast failure, and demographic reports. A campaign delivery by station report may identify upon which station a selected radio advertisement or radio program was broadcast. This report may enable subscriber 130 to verify delivery across a certain station, or within an associated geographic region. A campaign delivery by market report may identify the geographic market across which the campaign was broadcast. This report may enable subscriber 130 to verify delivery and coverage within a certain market. A campaign delivery by date report may provide subscriber 130 with per-day totals of broadcasts associated with a specified campaign. Subscriber 130 may use this type of report to easily identify those days with the heaviest advertising and programming response, such as for support planning purposes. A campaign delivery by hour report may provide subscriber 130 with per-hour totals of broadcasts associated with a specified campaign. Subscriber 130 may use this type of report to identify those dayparts with the heaviest advertising and programming response for support planning purposes. A broadcast failure report may provide subscriber 130 with a listing of the campaigns that were scheduled but failed to broadcast. This information allows subscriber 130 to attempt to manage sales support, and take action to remedy failure. A demographic report may be provided. For example, the advertising campaign, broadcast across a specific market, may be mapped to area code or zip code to provide subscriber 130 with a broad overview of geographic locations of the receiving broadcast audience. Additional databases, such as those available from Census information, may be employed to generate financial, ethnic, and age-related demographic information which may be of use to subscriber 130.

Networking models may be designed to minimize the impact on existing network configurations. For examples, two prevalent radio automation systems found in the industry are Scott Studios and Maestro. Connection to each of these legacy systems without necessitating the redesign of either system may be beneficial.

Any networking model may be used, such as a local proxy or local connection, for example. Connecting using a local proxy need not require internet connectivity, and instead may require only connection to a local area network (LAN). One computer on the LAN may have two network cards, one of which communicates with the local proxy which in turn communicates with the data center via an encrypted/unencrypted outbound-originating connection. On the other hand a direct connection may require on-air workstations to have internet connectivity and may provide an outbound-originating connection to the data center.

Figure 3:
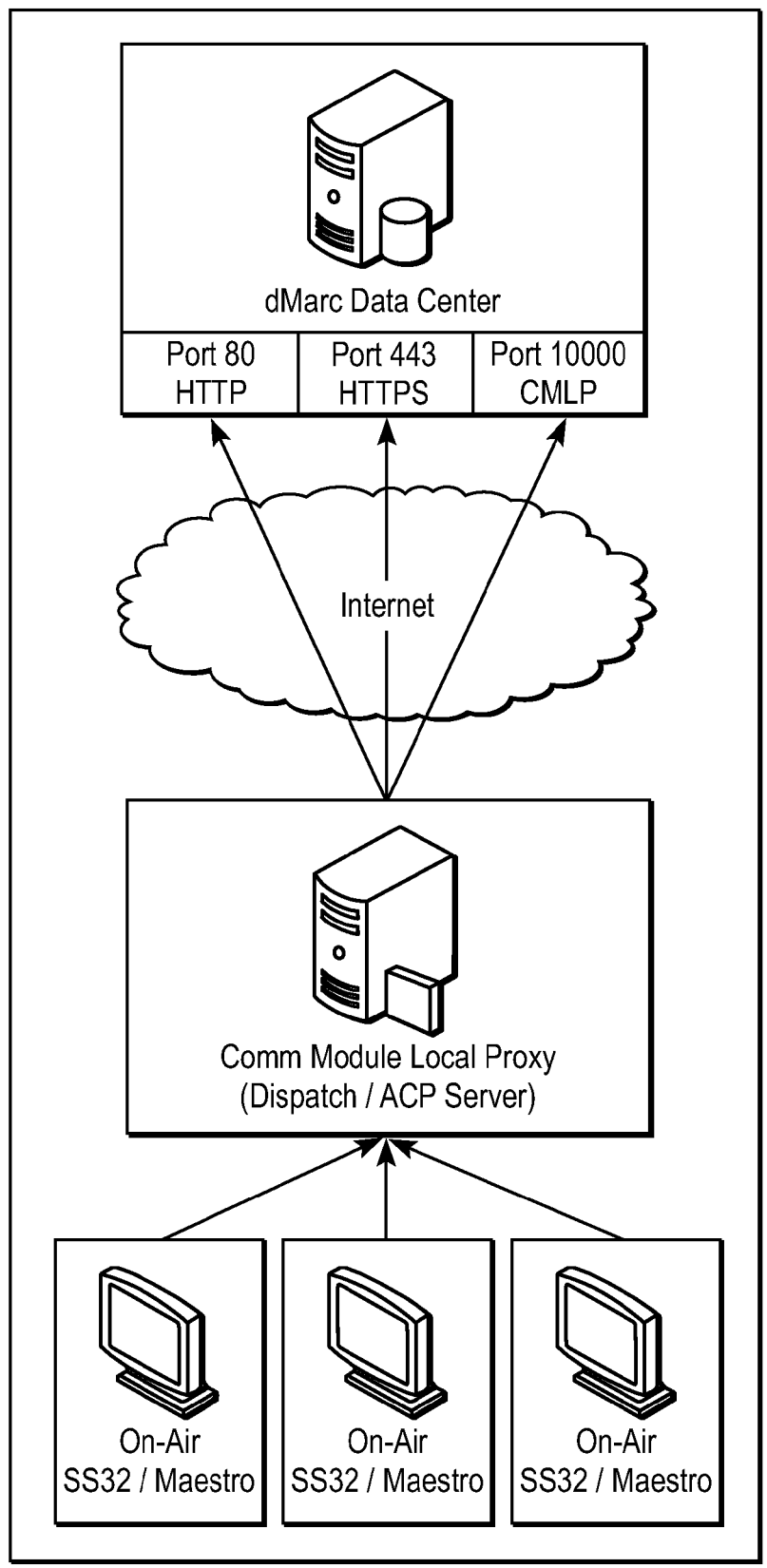
FIG. 3 illustrates a local proxy according to an aspect of the present invention.

As may be seen in FIG. 3, a local proxy may provide an encrypted/unencrypted connection to the data center and a reduction in the overall network traffic. Local proxy may use the Scott Studios and Maestro along with the local proxy to create an encrypted/unencrypted and secure connection to the data center. For this to happen, Scott Studios or Maestro may be present on each of the on-air automation workstations along with a local proxy module within the network. To establish the encrypted/unencrypted connection with the data center, the modules may rely on the station to have a dedicated internal automation system LAN and a separate corporate LAN with internet connectivity. There may also be one machine that is multi-homed, meaning it has two network cards and is aware of both networks. In most installations, the multi-homed machine is usually a dispatch computer or a server. This configuration has been and continues to be a hardware deployment by Scott Studios with both modules and hardware/network configuration in place, the Scott Studios and Maestro will automatically attempt to connect to the local proxy. Local proxy may, in turn, attempt to establish an encrypted/unencrypted connection with the data center. Local proxy may be designed to make use of the default network settings of the multi-homed machine for both the automation system LAN and the corporate LAN. Therefore, these network settings may remain largely unchanged. Additionally, the local proxy need not rely on a host name to connect to the data center but rather uses an IP address, therefore no DNS configuration should be necessary. Local proxy network settings may be modified if any of the default settings have been changed to block outbound internet traffic from the multi-homed machine over the corporate LAN or if inbound traffic from the automation system LAN has been blocked to the multi-homed computer. If these defaults have been modified, additional changes may be needed, such as: the multi-homed computer connecting outbound to the internet over the corporate LAN, such as on port 443 (HTTPS), for example; the multi-homed computer connecting outbound to the internet over the corporate LAN, such as on port 10,000, for example; the multi-homed computer connecting outbound to the internet over the corporate LAN, such as on port 80, for example; on-air workstations connecting outbound over the internal automation system LAN to the multi-homed computer, such as on port 10,000, for example; multi-homed computer accepting inbound traffic from the internal automation system LAN, such as on port 10,000, for example. Under such a configuration local proxy module may use specific ports to direct encrypted/unencrypted outbound-originating traffic over the internet. For example, ports 443 (HTTPS) and 10,000 may be used for transmitting encrypted/unencrypted station information and module control traffic. Selection between these ports may be optimized to preserve system resources. Port 80 may be used for downloading unencrypted media files from the data center. After configuring a station's network, the on-air automation workstations may connect to the data center through the local proxy module automatically.

Figure 4:
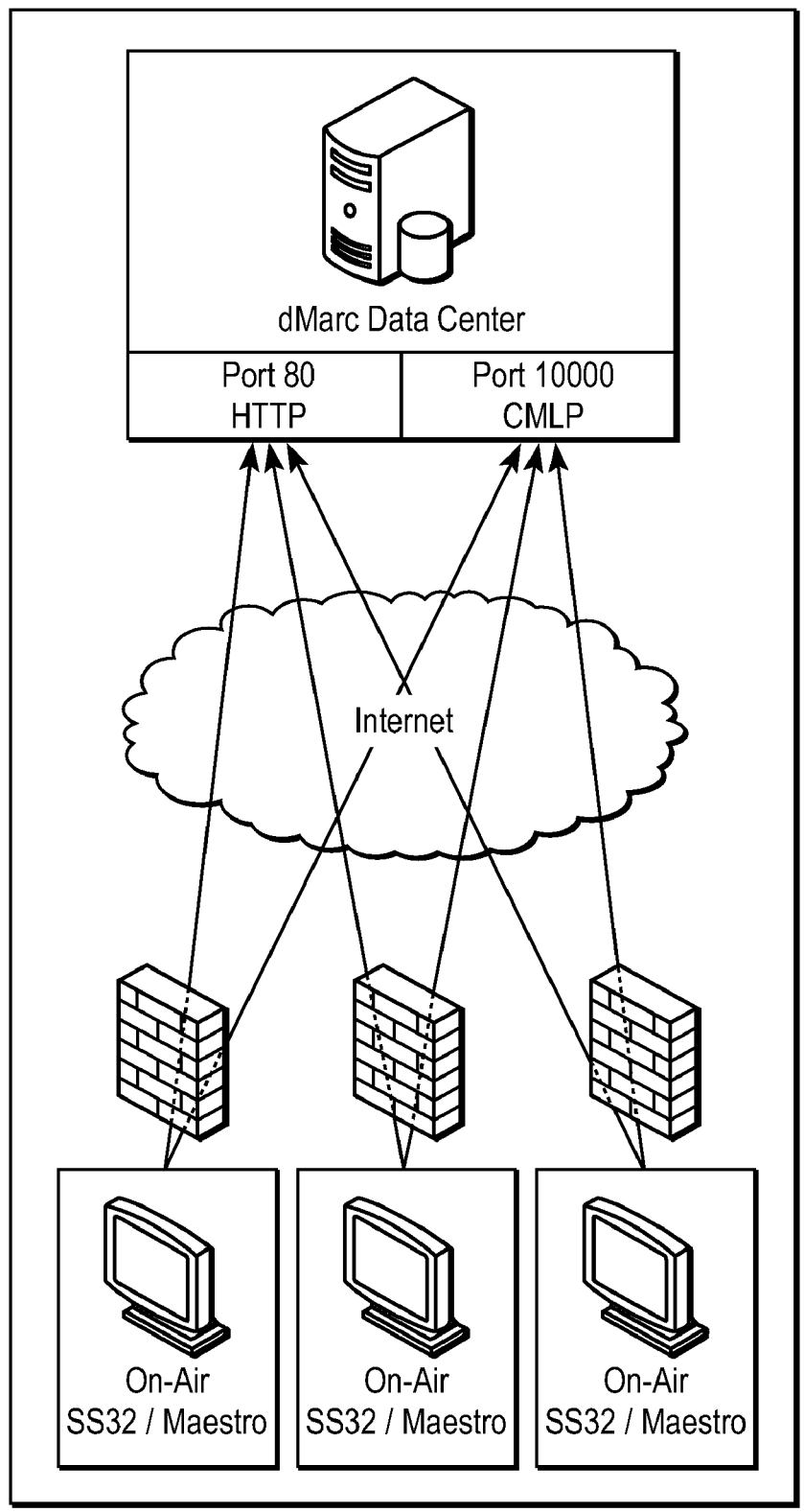
FIG. 4 illustrates a direct connection according to an aspect of the present invention.

As may be seen in FIG. 4, direct connection may be used for stations and station clusters that do not follow the automation system hardware deployment recommended for Scott Studios and Maestro equipment, stations that already have internet connectivity at each on-air workstation, or for stations that either cannot or choose not to deploy the local proxy model. Direct connection may use the Scott Studios and Maestro Modules on each on-air work station to create a secure connection to the data center. To establish the secure connection with the data center, each on-air automation workstation may have access to a network with a direct connection to the internet. With the proper communication modules installed and an internet connection present, the modules may automatically attempt to connect out to the data center. Direct connection may be designed to make use of the default network settings of the on-air workstations and instead of relying on host names to connect to the data center may use an IP address. As would be evident to those possessing an ordinary skill in the pertinent arts, using an IP address may prevent the need for a DNS configuration. On-air workstations may connect outbound to the internet over the corporate LAN, such as on port 10,000, for example. On-air workstations may connect outbound to the internet over the corporate LAN, such as on port 80, for example. Direct connection may use these specific ports to direct encrypted/unencrypted outbound-originating traffic over the internet. For example, HTTP traffic may be sent on port 80 and may be used for transmitting station information and for downloading media files from the data center. Port 10,000 may be used for transmitting communications information. Once the station's network has been configured, the on-air automation workstations may connect directly to the data center automatically.

Figure 5:
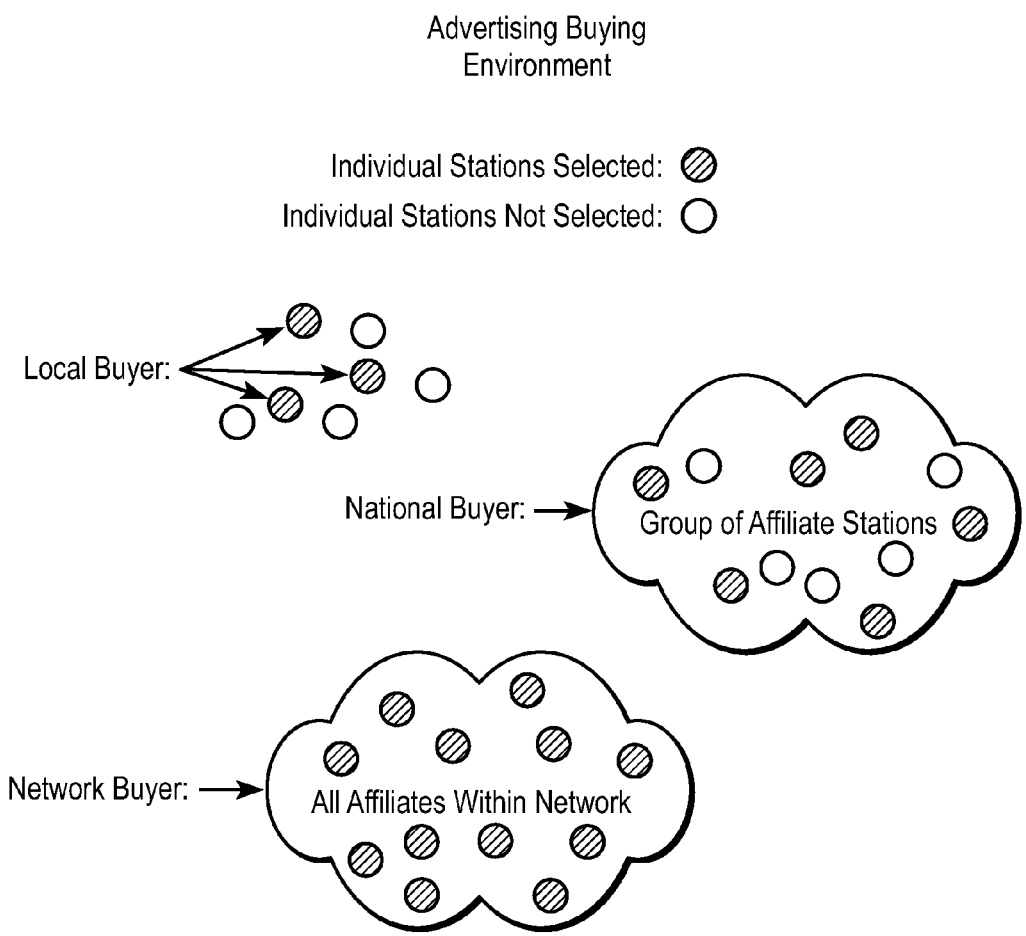
FIG. 5 is an illustration of an advertising buying environment in the present invention.

FIG. 5 is an illustration of an advertising buying environment in the present invention. FIG. 5 illustrates a local, a national, and a network advertising buyer. Of note, the local buyer buys individual ads on particular stations. The national buyer can pinpoint specific buys within a particular group of affiliate radio stations. Alternatively, a national buyer can directly or indirectly contact individual stations to do multiple local buys where the buys are not within a particular group. The network buyer buys advertising for all affiliates within a network, such as in a radio syndication show environment. In the illustrated embodiment, an advertising buyer buys an insertion order, and the advertiser request correspondent to the purchase order goes into "traffic". Radio traffic is scheduled by the trafficking system 210. For example, based on an advertiser request, the trafficking system 210 may schedule the play of a particular ad in three slots at three assigned times each day during the weekdays of Monday through Friday. Obviously, once advertising inventory builds, conflicts arise between advertising requests, particularly during rush hour or high desirability playtimes.

To address these conflicts, in one embodiment the trafficking system 210 shuffles the requested advertising to maximize the revenue generated from particular ads at particular times (of course, advertising at premium times and on premium days brings premium revenue). The trafficking system 210 compiles a list of items to be played, wherein each item on the list is assigned a cut number that links the plays on the list together. In one embodiment, a text file consisting of the traffic log is manually reconciled at least once per day.

Figure 6:
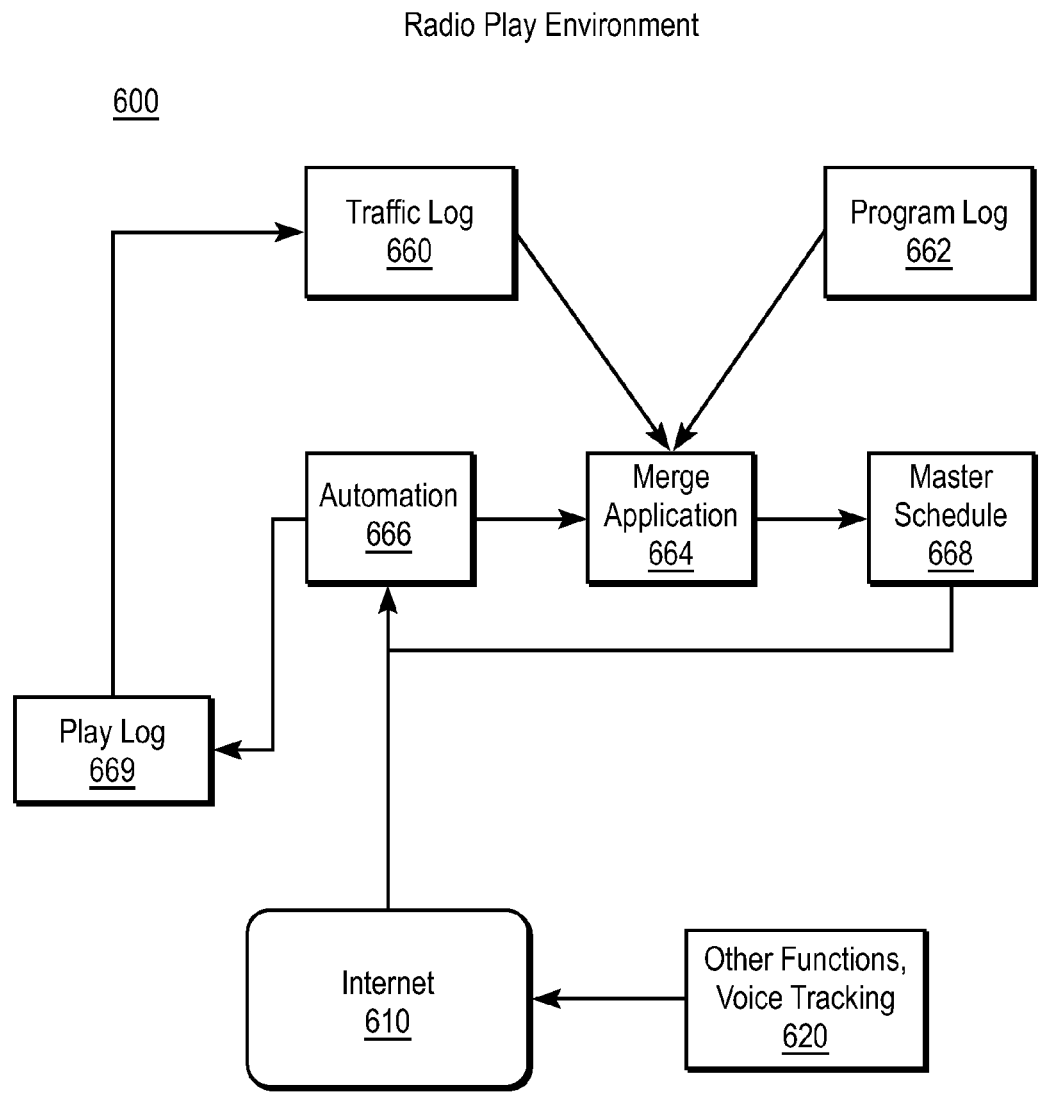
FIG. 6 is an illustration of a radio play environment.

FIG. 6 is an illustration of a radio play environment 600. The environment of FIG. 6 includes a traffic log 660 such as that discussed above, a program log 662, a merge application 664, an automation for play 666, a master schedule 668, a play log 669, and may include remote applications, including external inputs 620 such as voice tracking, satellite, and FTP, for example. The traffic log 660, the program log 662, and the master schedule 668 as illustrated preferably include identifications of the plays that are to occur in accordance with each.

The traffic log 660 is such as that handled by the trafficking system 210 as discussed hereinabove. The program log 662 may include programs, such as songs, that are to be played over the air. The master schedule 668 may include a validation of the media to be played, such as verification that the identification numbers included in the traffic log 660 and program log 662 are valid play items. In a typical embodiment, the merge application 664 merges the traffic log 660 and the program log 662 and manages the filling of any holes, such as by the automation 666, to create the master schedule 668. The master schedule 668 is directed to the automation 666, and the automation 666 monitors the inputs and outputs to and from the radio station for play over airwaves. The play log 669 is generated based on the output of the automation as that output is generated over the airwaves. The output of the play log 669 may be monitored before billing to advertisers to ensure that ads have properly been played by the automation 666.

In the embodiment discussed above, the automation 666 controls the final output over the airwaves of a radio play. The automation 666 may switch for example from a satellite channel to a local channel, or to an internet channel, and back again to obtain play from various locations for incorporation into the automation 666 play. Such plays, as received by the automation 666, may include a metadata channel that does not include the radio plays, but rather includes information regarding the radio plays in the traffic log. For example, a metadata channel may infer that a remote radio feed is about to have a "hard break" or a "soft break". A soft break is one which is at the option of, for example, a radio personality, and a hard break is non-optional. As such, in an exemplary embodiment, a syndicated radio show may arrive for local play in the form of a compact disc, or may arrive by a satellite to the automation and may include a metadata channel including the information regarding the satellite play. Consequently, in an embodiment wherein the play originates from a remote point, the metadata channel may allow for a local station to insert particular items for an otherwise remotely generated play. In such an embodiment, the automation 666 may switch back to the local play generation point for a limited set time, during which the local play point may generate local play items into the otherwise remotely generated play. Upon completion of the metadata instructed local play period, the automation 666 may switch back to, for example, the satellite channel for a renewal of the remote play. As such, in some embodiments of present radio applications, all plays, from all locations, are controlled by the automation 666, and further, the automation 666 provides validation, via the play log 669, that all plays have properly occurred.

In certain embodiments, the traffic log 660 fed to the automation 666 may include one or more "dummy" files. Such "dummy" file positions can include the place holders that allow for mapping of information, such as mapping of remote information over the internet and/or via FTP. Such a mapping may include the bundling of remote files and/or local files into a mapped position. Such mapped positions are not held as open, but rather are held as closed play positions in spite of the fact that it is unknown to the local automation 666 precisely what plays will occur in the position of the "dummy" file.

Further, ads may be inserted via channel switching instructions fed over one or more metadata channels. For example, a plurality of regional ads, each dedicated to specific one or more regions of the country, may be simultaneously playing on a series of channels incoming to the automation 666, such as channels 4 through 8. A syndicated radio program may be playing simultaneously on, for example, channel 3 incoming to the automation 666. Upon the occurrence of a break, in accordance with the traffic log 660 and metadata channels, on channel 3, the metadata channel may include instructions for each region to switch during the break to its correspondent incoming regionalized advertising channel. For example, a station playing the syndicated program on channel 3 in Philadelphia, Pa. may be instructed to switch, via the metadata channel, to channel 4 during a break in the program of channel 3 in order to play a regionalized ad on channel 4. Simultaneously, and during the same break on the program of channel 3, a station in Los Angeles, Calif. may be instructed, via the metadata, to switch to channel 8 in order to play regionalized advertising for that region then playing on channel 8. In such an embodiment, upon completion of a break on channel 3, all stations then participating in a syndicated play of channel 3 are instructed via the metadata to have the automation 666 switch back to channel 3 for continuation of the syndicated play. Similarly, advertising may be cashed on a particular channel to play in a particular order, and, when a break occurs on the channel then playing, a switch may be made to the cashed advertising channel to allow for whatever numbers of cashed ads to play that are capable of play during an allotted break window on the play channel. Upon closure of the break on the play channel, the automation 666 may be instructed to switch from a cashed advertising channel back to the play channel, and may pick up on the next switch to the advertising channel with the next keyed cashed advertisement.

In an embodiment, metadata may be shipped on a particular channel, and programming may be shipped on a plurality of other channels. In such an embodiment, the metadata channel may be keyed to the play occurring on another channel and the metadata itself may call for insertion of data on the metadata channel or another channel onto the current play channel when a break, such as a soft break, occurs according to the metadata channel. Upon the occurrence of such a break in accordance with the metadata channel, a local feed may, for example, insert local advertising onto the current play channel, such as via switching to a local channel for the duration of the break according to the metadata channel.

Switching of the automation 666 in accordance with the switching policies described hereinabove, allows for a preemption of a radio play. In existing play embodiments, if a break is called for at a particular time, such as at noon on a Friday, the channel on which the break is to occur must be continuously monitored, and the metadata of the channel on which the break is to occur must be continuously monitored, to ensure that the break occurs at the prescribed time. In embodiments described herein, a monitoring of, for example, channels such as the metadata channel may occur in real time, and as such assigned time plays, particularly of advertising or information spots, are no longer necessary. In particular, a monitoring of the metadata channel, even during a play incoming remotely on a separate channel, provides sufficient information to switch to an advertising or alternative play channel in accordance with the incoming metadata. Thus, in prior embodiments, the knowledge of the occurrence of a break must be pre-existent, and any movement of that break must be monitored. However, in embodiments discussed herein, no pre-existent knowledge of breaks is necessary. Rather, in embodiments discussed herein, the system of the present invention learns and gains knowledge of when preemption is to occur, and elects the proper preemption in real time based on the break then occurring as it occurs during the play. As such, traditional methods and systems merely inserts at a defined time, while in some embodiments, the system described herein preempts in real time based on learning from the programming as it is playing.

In order to allow for a proper learning and preemption, the present invention may include a learning module and a preemption module, which modules may be placed at any of a plurality of points within the radio play system discussed hereinabove. For example, the modules may be placed at the traffic log 660, at the master schedule 668, at the merge application 664, or at the automation 666. However, because the modules can be used to replace unsold or underpaid advertising spots with more lucrative advertising spots, the operation of a rule set from within the modules can be available at the point of placement of the modules. Consequently, although the modules may be placed within the traffic log 660 or master schedule 668, advertising payment rate data is not typically available at either location, and cannot be used to operate at either location without being affected by the merge 664. Further, placement of the modules at the merge 664 might allow the rules of the merge 664 to replace certain unsold or otherwise empty play spots with songs, or other information, thus eliminating the ability of the modules to replace the unsold or otherwise empty spots with more lucrative advertising. Consequently, it may be highly useful to place the modules within or in association with the automation 666, in order to allow the automation 666 to follow a series of metadata rules on the replacement and reevaluation of a merged traffic log.

Modules placed within the automation 666 may allow for a remote viewing of the real time automated play, in order to allow for real time reevaluation of the current play, and a comparison of the evaluation of the current play with a locally or remotely located rate and rate time chart, and for modification or replacement, via preemption, of information in the real time play list. Such preemptions may be based on cost rules or other rules applied through the add-in module or modules to the automation 666.

However, since estimated times for plays as assessed at the merge 664 may vary in accordance with the delays inherent in a radio play, the modules cannot use time estimates, or play identification estimates to assess proper preemption locations. Therefore, the modules may preferably have available a secondary feed showing real time output data of the plays occurring on a radio location then being monitored by the modules. As such, the modules may estimate a proper play location for preemption, and may then monitor to ensure that the preemption location receives preemption at the proper point. This secondary feed showing real time plays may be received from a variety of locations. For example, the play log 669 may be monitored in real time to assess the plays then occurring. However, even the play log 669 may be subject to certain delays or flaws, and as such may not give a true illustration of real time plays. Alternatively, the modules may view, from within the automation 666 itself, real time play inventory requests as they occur. For example, the automation 666 may call a particular play from a given location at a given time and that location and time may be viewed by the modules and compared with the play list in order to assess, precisely and in real time, the comparison of the play list with the play then occurring, and any preemptions may be modified according to any delays or improprieties assessed.

In an additional embodiment, because the merge 664 may eliminate much of any available unsold or empty play slots, it may be preferable to insert the modules at the merge 664, rather than waiting for the automation 666 to occur. However, in such an embodiment, the merge 664 would still require availability of, among other things, rate listings and the rates of currently assigned plays. Further, because play does not occur from the merge 664 but rather occurs from the automation 666, a built-in delay would need to be assessed from the automation 666 back to the merge 664, in order to allow a real time monitoring of inventory requests at the automation 666 to be applied to the modules performing preemption back at the merge 664. Further, the modules, whether at the merge 664 or at the automation 666, may be subject to any number of local or remote rules. The availability of such rules at the merge 664 may allow for the variation of preemption rates at the merge 664, thereby allowing the merge 664 to vary the amount of unsold or empty slots filled by the merge 664, such as by dependence on the time or day. For example, it may be more cost effective to a given station to fill more unsold or empty slots during rush hour than during the remainder of the day, because rush hour may bring higher premium rates from advertisers. As such, the amount of unsold or empty slots desired to be filled during rush hour at the merge 664 may be higher from the radio station viewpoint, or may be lower from an advertiser's viewpoint, based on the controller of the modules performing preemption at the merge 664.

Figure 7:
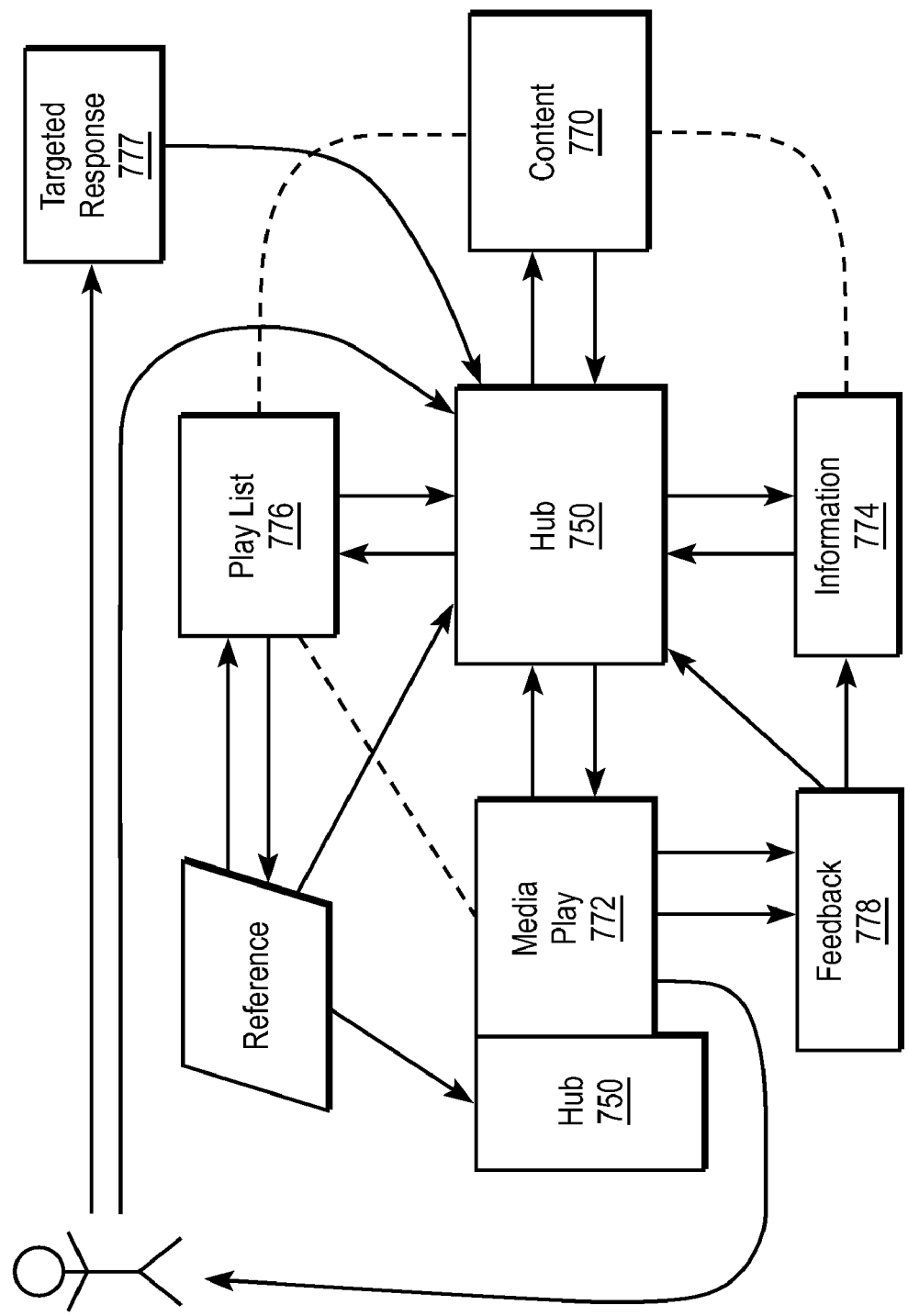
FIG. 7 is an illustration of a radio play environment.

FIG. 7 illustrates an embodiment of media play capabilities, wherein the media played is varied based on the status of certain external factors as provided by information input to the hub 750, and/or based on the actions of one or more receivers of media that was played. As used herein, the terms "radio content" and "broadcast" or "broadcast content" include any type of media that may be presented via audio, visual, or computerized output to one or more receivers of the output, and that is presently programmed or preprogrammed for media play. As used herein, the terms "nonradio content", or "nonbroadcast" or "broadcast nonspecific content", include any media that may be presented via audio, visual, or computerized output to one or more receivers of the content, for example via a media feed, and that is not presently programmed or preprogrammed for media play. As used herein, the term "media feed" includes any transmission of any media to one or more receivers of the media, including but not limited to terrestrial or satellite radio broadcasts; voice over IP; internet streaming; podcasts; webpages; and video games with a communication connection, such as console, online and handheld video games; video players with a communication connection; and mobile phones. As used herein, the term "media play" refers to the audio, visual or computerized output transmitted in the media feed.

As illustrated in FIG. 7, a hub 750 can also access a variety of content 770, including nonradio and radio content. Such content 770 may be local to the hub 750, or may be available to the hub 750 from any of a variety of sources, including but not limited to intranet, internet, satellite channel, FTP or zipped files that may be accessed by the hub 750 in accordance with one or more commands associated with the hub 750 directing media play 772. The hub 750 may have multiple portions. More specifically, the hub 750 may be any number of modules resident at any number of locations, so long as all such locations are accessible by at least one module resident at the location from which the media play 772 is to occur.

Further, the hub 750 can also access a plurality of secondary information 774, certain of which information 774 may be available in real time. The information 774 may be relevant to criteria for the play of certain advertisements, and may be data from a third-party data source 120, for example. In various embodiments, the information 774 comprises current weather conditions, weather forecasts, temperature, pollen counts, precipitation, current events, sports scores, broadcast topics/radio guests, terror-alert color, traffic conditions, stock market data, interest rates, gas prices, or other financial indicators, or any other information 774 available to the hub 750 that is relevant to deciding when listeners 773 would be most receptive to a media play message and most likely to undertake a targeted response 777. Examples of the use of this information 774 in scheduling advertisements are described herein below with reference to the user interface.

In a specific exemplary embodiment, the hub 750 can access a play list 776 for at least one radio studio in at least one marketing region. Multiple radio stations may be available to a single hub 750, and a marketing region may be any geographic region including but not limited to a city, a county, or state, for example. In this embodiment, the hub 750 may, in part, direct the play list 776 of the one or more radio stations, such as by preempting that which was to be played by the radio station in accordance with the play list 776 with an intelligent insertion that is more likely to bring success in accordance with the predetermined criteria than would the preempted play on the play list 776.

In this example, the play list 776 of a radio station may generally include advertising plays and music plays. As will be apparent to those skilled in the art, listenership generally decreases when ads begin to play and increases during a continuous music play on a radio station. There are exceptions, such as wherein listenership falls for a radio station during play of an unpopular song, for example. Further, listenership even during advertising may not fall if the advertising is popular, such as wherein the advertisement is amusing or of significant interest to listeners.

Information about listeners 773 can be used as feedback 778 to the hub 750, such as real time monitoring of numbers of listeners 773 to one or more stations. For example, as is known to those skilled in the art, vehicles can be monitored at a heavy intersection to determine the station to which they are tuned. The hub 750 may modify the radio station play list 776 in real time according to certain predetermined criteria. For example, if listenership of the particular radio station begins to fall, the hub 750 may preempt certain advertising that was to play with popular music. Consequently, listenership for that radio station will rise. When listenership reaches a particular level, premium advertising rates may become available, and the hub 750 may at that stage preempt the music play with premium advertising in order to maximize advertising revenues and maximize the number of listeners who hear a given advertisement. Thus, when demand for advertising spots and advertising rates are high, the creation of more advertising spots thusly increases advertising revenues. Further, an advertiser willing to pay only lower rates will be able to place ads during times when the advertising can best be afforded by that advertiser.

As an example, an advertiser may desire to have an advertisement run only when listenership is above 100,000, regardless of the time of day. Using these predetermined criteria, the hub 750 may modify the radio station play list 776 in real time to intelligently preempt music play, for example, once the 100,000 listener threshold set by the advertiser has been met or exceeded. Once the advertisement has run, the hub 750 may return to music play or continue with running advertisements. Various criteria for the play of advertisements can be set, and examples will be described below in the context of the user interface for scheduling a media buy.

It will be apparent in light of the description hereinabove that various sources may be mined in order to access any desirable variation in the play list 776. For example, popular music downloads, as assessed by certain internet sites, may give excellent guidance on what would be the most popular radio music plays at a given time. Playing not simply music but the most popular music at a given time will have the greatest return in increasing listenership to the radio station at that given time. Further, such an embodiment of intelligent preemption and insertion can make available to the hub 750 even more refined decisions. For example, greater advertising rates can be charged for advertising that plays immediately adjacent to the most popular songs available for play by the radio station. The hub may also limit certain content to control the price of advertising by, for example, playing only a limited amount of the most popular music in a given time period. By way of further example, advertising rates may be set according to actual listenership either measured in real time or estimated based on broadcast content.

Listeners 773 to a radio station may respond to certain advertising by undertaking the activity advised by the advertisement, such as by stopping for food at a food establishment, shopping at a particular retail establishment, using an advertised coupon, visiting an advertised website for more information, calling a particular customer service number, and the like. The activity advised or encouraged by the advertisement, either directly or indirectly, is known as the targeted response 777. Measures of this targeted response 777 assist the advertiser in assessing the efficacy of the advertisement. The targeted response 777 may vary significantly based on the circumstances of the advertisement placement. Advertisers desire to play advertisements when it is perceived or known that the greatest targeted response 777 will be achieved. Techniques in accordance with the present invention for observing the targeted response 777 are described herein below. Measures of the targeted response 777 may be collected and provided to the hub 750 to inform whether a given campaign creative should be played again, or alternatively, which campaign creative among two or more alternatives should be played. As such, subsequent media plays 772 may be varied in accordance with the success or failure of proceeding radio plays.

According to one aspect of the present invention, a variety of techniques can be used for observing the targeted response 777. These techniques include but are not limited to tracking phone calls, coupon usage, SMS coupons, website hits, and sales. In various embodiments, these techniques can be used separately or in combination with each other to observe the targeted response 777, and ultimately the efficacy of a campaign.

In one embodiment, a campaign creative provides a particular phone number to call to obtain more information about an advertised product or service. In one implementation, the number of phone calls is tracked directly by the call center. In another embodiment, phone calls to a phone number are routed through a tracking module that registers incoming calls, for example by tracking caller ID information to determine the location of the caller, to one or more numbers before routing the calls to a call center. In one embodiment, calls to one number routed through a tracking module can be correlated to the advertisement played most recently in the caller's geographic market. Over time, the effectiveness of advertisements played in prompting listeners to call can be measured for various creatives, at various times, in various markets. In another embodiment, more than one phone number is used to measure the number of calls in response to one creative compared to the number of calls in response to another creative that advertises a different phone number. Alternatively or additionally, the number of calls in response to the play of one creative on one station can be compared to the number of calls in response to the play of that creative on a different station merely by advertising different phone numbers for each.

In another embodiment, targeted response 777 can be tracked by tracking coupon usage. Different coupon codes can be advertised in each creative played or each station can play an advertisement having a different coupon code. Thus, as customers identify their coupons upon the purchase of goods or services, the seller is able to track by which advertisement the customer was influenced. In one embodiment, the coupon code can be sent back to listeners who respond to an advertisement in SMS format, and the coupon code can be unique on a customer by customer basis and/or can be correlated to a particular play of an advertisement. Thus, when the coupon code is used at a point of sale, whether it be at a website, through a call center, or at a store, the sale can be matched to the inquiry and/or ultimately to the played advertisement.

In yet another embodiment, the number of website hits that a particular site receives can be tracked and correlated to media plays. In one embodiment, advertisers can use different web addresses to measure the relative effectiveness of two or more advertisements. Alternatively, the IP addresses of computer visitors can be used to determine the geographic location of those that access an advertised website.

In one embodiment, advertisers can track sales figures for advertised goods, services, businesses, or the like. They can then correlate sales numbers with campaign creatives played, for example, on a temporal basis or on a geographic market basis. For example, data from cash register receipts from stores that sell an advertised product in one geographical area can be compared to data from cash register receipts from stores that sell an advertised product in another geographical area. Alternatively, data from cash register receipts from stores that sell an advertised product in the days following the play of one campaign creative can be compared to data from cash register receipts from stores that sell an advertised product in the days following the play of a different campaign creative. However the targeted response 777 is measured, the data collected can be used as a feedback to the hub 750 to inform which creative within a campaign are most effective.

In various embodiments of the present invention, intelligent insertion may be performed in any media play context, including any audio source into a media feed. For example, insertion may be made in a radio station or streaming Internet radio context, a cellular telephone context, in a Voice over IP (VoIP) context, an SMS context, a WiMax context, a downloadable audio file context such as for iPods or other MP3 players, videogame systems, or the like. The media play insertion may include a song, a message, a news, traffic, sports, or weather update, one or more coupons, or an instant message, for example.

Figure 8:
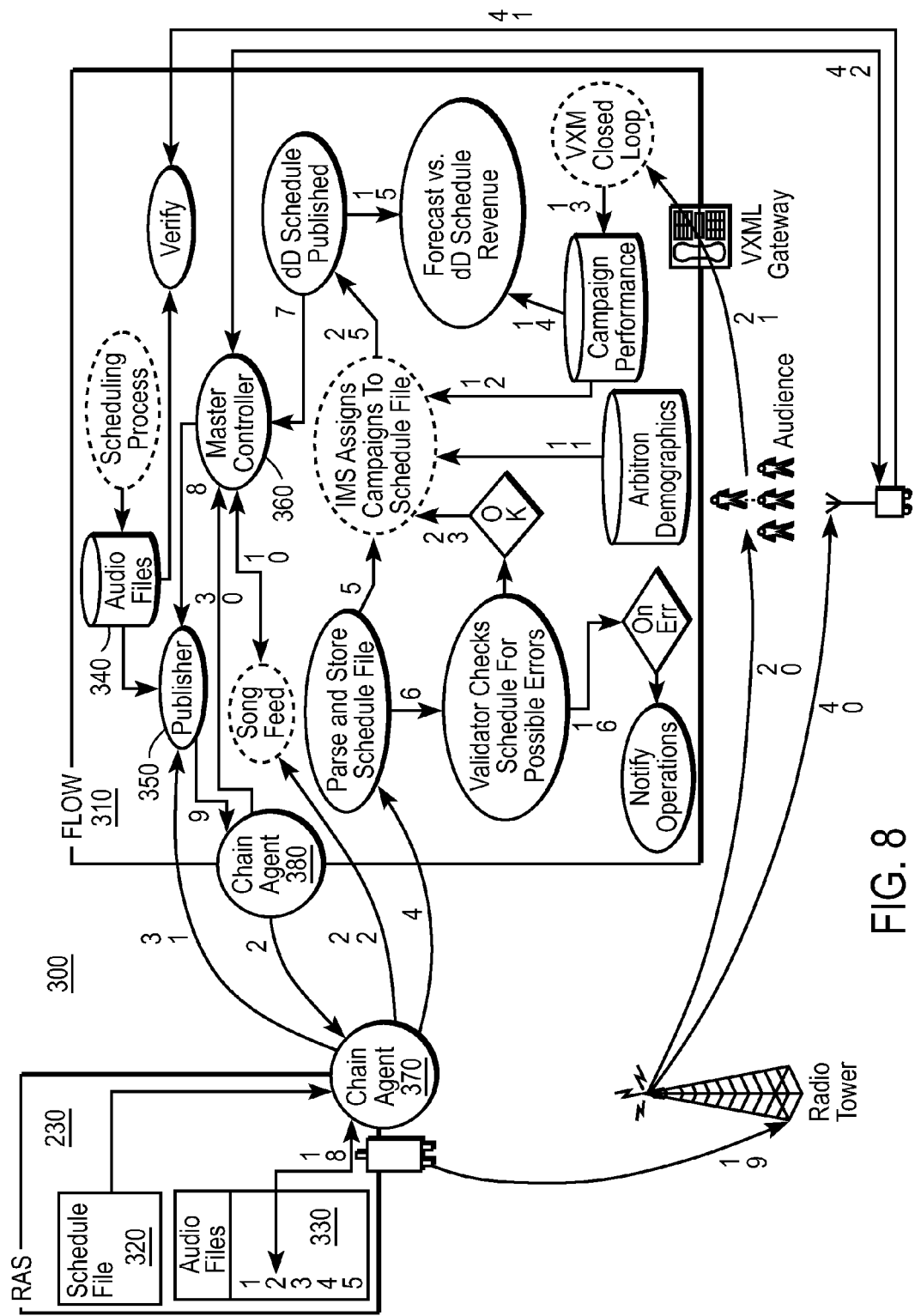
FIG. 8 illustrations a schematic diagram of the flow of information within the communication system of FIGS. 1 and 2.

FIG. 8 shows a schematic diagram of the flow of information within the communication system of FIGS. 1 and 2. FIG. 8 shows information flow 300, which includes two principle regions, Radio Automation Software ("RAS") 230 and workflow 310. RAS 230 may include schedule file 320 and audio file 330. Workflow 310 may include audio advertisement files 340, publisher 350, and master controller 360. The flow of information will be described with reference to the numerals labeling the arrows representing the flow of information.

RAS 230 may include a flow of information for a new schedule file 1. New schedule file may originate with schedule file 320 and be transmitted to a first chain agent 370. This transmission may occur by an external software that publishes a new schedule file to the RAS 230 file system. A first chain agent 370, via a directory watcher process, detects new schedule file 320, and reads it off of disk. This new schedule file 320 may originate or be taken from several systems within the radio station and or from a location outside the studio itself (in the case of remote network programming). Eventually, schedule file 320 may be created while remaining unpublished to RAS 230. The filling methods may be local, and the rules for filling the inventory may not be dynamic nor take into consideration a revenue maximization function. For example, 3rd party groups today will "buy" unsold inventory in advance and give the station 1-N ads, that the station can "fill" unsold inventory. The station in this case is selling unsolds in advance without a guaranteed schedule.

First chain agent 370 residing in RAS 230 may pass information to a workflow 310. This retrieval of a new schedule file 320 may be seen in FIG. 8 as link 4. This information may be passed to a parse and store step located within workflow 310. As the RAS chain agent 370 reads schedule file 320, the file may be transmitted to workflow 310. The dD preemptable ad avails (dD Avails) may be parsed from schedule file 320 and stored for further processing. The original schedule file 320 may be stored for billing, accounting, and auditing purposes. This parsing and storing, shown and described to occur within workflow 310, may be achieved at studio 140.

After parsing and storing the schedule file, the information is transmitted to the Inventory Management System ("IMS") where the campaign is assigned to schedule file 320. This transmission is shown by label 5 and may occur within workflow 310. This represents the delivery of the dD Avails to IMS. Rather than collecting the unsold inventory report in a central location, the central location, which tracks ad effectiveness, may publish results to each station and the local station software may use this information to make "intelligent" insertion over unsold inventory. The available ads may need to be published or delivered to station 140 and station 140 may need to receive performance data on those campaigns, so that the local engine may make decisions.

Similarly, after parsing and storing the schedule file, a validator checks for possible scheduling errors. The transmission of information to the validator is shown by label 6. The validator may input this information and analyze schedule file 320 for errors in tag structure, frequency of tags, station contractual obligations, such as minimum number of spots per period, and other errors known to those possessing an ordinary skill in the pertinent arts. This validation, while shown to occur within workflow 310, may occur local to hub 150. The validator may output information to IMS on whether the schedule file 320 is validated. This validity feedback is shown by label 23. Once IMS receives an appropriate response from the validator, IMS may process the new dD Avails, by assigning dD advertisements and specific creative to specific dD Avails. This IMS, while shown to occur within workflow 310, may occur local to hub 150.

After the IMS assigns campaigns to the schedule file, the processing may be complete, and the information in the schedule transmitted to a publisher as shown by label 25. The result of the processing of dD Avails is a dB Schedule, which is specific to each station. This creation, while shown to occur within flow 310, may occur local to hub 150.

After publishing the schedule, information may be transmitted to the master controller 360 as shown by label 7. The master controller 360 may operate as the brains behind "trafficking" the unsold spots slated for preemption within the dB schedule file. The master controller 360 receives the song feed, including ads, as to what is being played currently on a station. The master controller 360 uses this feed to determine where in the current schedule file a station is. The master controller 360 manages the replacement of the ads, and the swapping back of the original ad, once the spot has run. The master controller 360, while shown to occur within workflow 310, may occur local to hub 150.

A feedback system may be created for creating new schedules as shown by labels 8, 9, and 2. This transmission path may transfer information from the master controller 360 to the publisher 350, label 8, from the publisher 350 to the second chain agent 380, label 9, and from the second chain agent 380 to the first chain agent 370, label 2. Thus, there is a schedule for a given station, master controller 360 instruction to pre-empt a spot, and master controller 360 instructions to restore the preempted spot after it has played. The master controller 360 interrogates the dB Schedule file for a given station, identifying the names of all of the creatives that are scheduled to run, and publishes these creative to the station via the 8-9-2 pathway. The chain agent examines a cache of previously stored ads to determine that it has stored all creatives. The master controller, if it determines that a spot is ready to be pre-empted, may send a notification via the 8-9-2 pathway, to instruct the chain agent to swap creative one for creative two. The chain agent 370 may confirm receipt of this message via the 2-30 pathway.

The chain agent may manage the physical preemption process. Instructions to preempt an ad may be delivered via path 18 to audio files 330. The chain agent may preserve the original audio file X by either renaming it or moving it to a different directory on the file system. The original file, the dD spot and the slated pre-emption may be copied into a directory of the same file name. The header information within the file, used to populate the RAS screen, may be different and reflects the actual ad that will run even though the file name is the same. The header information may identify what is written to the RAS log files for billing purposes and the station may be aware that the preemption occurred. Once this preemption has been completed or failed due to some error, status may be published via pathway (2-30). The chain agent, which may be responsible for sending the song feed, known as the log, of what is actually playing on the station, such as by pathway labeled 22, may monitor the feed to see the pre-empted spot run. Once it has run, the chain agent may swap the original ad back and notifies the master controller.

The feedback pathway labeled 2, 31 may enable the chain agent 370 to determine if the audio file is available. The chain agent may request the publisher, via pathway 31, to send it a specific creative. The publisher responds by sending the file along with a checksum to confirm the file was not corrupted in transmission via pathway 9, 2.

The chain agent 370 may also prompt the song feed across pathway 22. The chain agent, depending on the RAS configuration, may either watch the log file on the RAS to determine what is being played over the air, or may receive a data feed from the RAS directly containing play history. The chain agent may scrub the feed and publish it to workflow 310. The song feed may be exported directly over the WAN to workflow 310 and a local agent may not be required.

In the event that the validator determines there to be an error, information may be transmitted across pathway 16 in order for notification of an error to occur. If errors are found in the schedule file, such as a result of a contractual breach or a technical issue, a set of rules may be set up dependent upon the type or error and the station the error occurred on, to notify both systems and people that are tasked to resolve the errors.

The event ad may be played. As shown in pathways 19, 20, 21 the information derived hereinabove may be transmitted to the gateway. The information may be transmitted to a radio tower across pathway 19. Radio tower broadcasts to an audience across channel 20. As the audience responds to the pre-empted ad, by calling a telephone number, workflow 310 traps the caller ID or is notified from the call center, in substantially real time, or on a daily basis, for example.

New calls may be logged, and the information may be provided to IMS across paths 13, 12. As calls are logged, the calls may be tracked against the dB schedule file. Revenues and performance metrics may be tracked given audience size, Arbitron data, and other factors. This information may be used by IMS to optimize ad targeting.

Campaign performance, in addition to being transmitted to IMS, may be transmitted across pathway 14 to a forecaster. Forecaster may compare actual performance with predicted performance and revenues. The IMS methods may be evaluated based upon the accuracy of the predications. Over time, the forecaster may project future revenues based on inventory flow and ad campaigns scheduled in the system. The forecaster may provide automated notification to station traffic managers that the present invention may result in income.

A verification may occur. The pathway labeled 40, 42 may demonstrate the availability of verification. The master control, in addition, may instruct the local chain agent at the station to pre-empt a spot and, responsive to the notification, may notify a digital radio that can receive the broadcast of the station to record the ad scheduled by the master controller, such as by sending a schedule or a real time notification to start/stop recording. The audio may be streamed over the WAN and recorded within the workflow 310 environment. Verification may occur across transmission path 41 demonstrating an ad spot recorded off the air. Once the file is recorded, it may be transmitted to workflow 310 to verify. The verify process may compare the audio file recorded to the audio file that was shipped to the station. If there is a match, then the ad spot may be logged as verified. If no match exists, the file may be routed to a human capable of listening to the original and the recorded file to determine if the spot matches. If no match still exists, further action may be taken. Subscriber 130 may opt to listen to the recorded spots and the original in one of several verification reports. This audio may be streamed over the WAN and recorded within the workflow 310 environment.

Figure 9A:
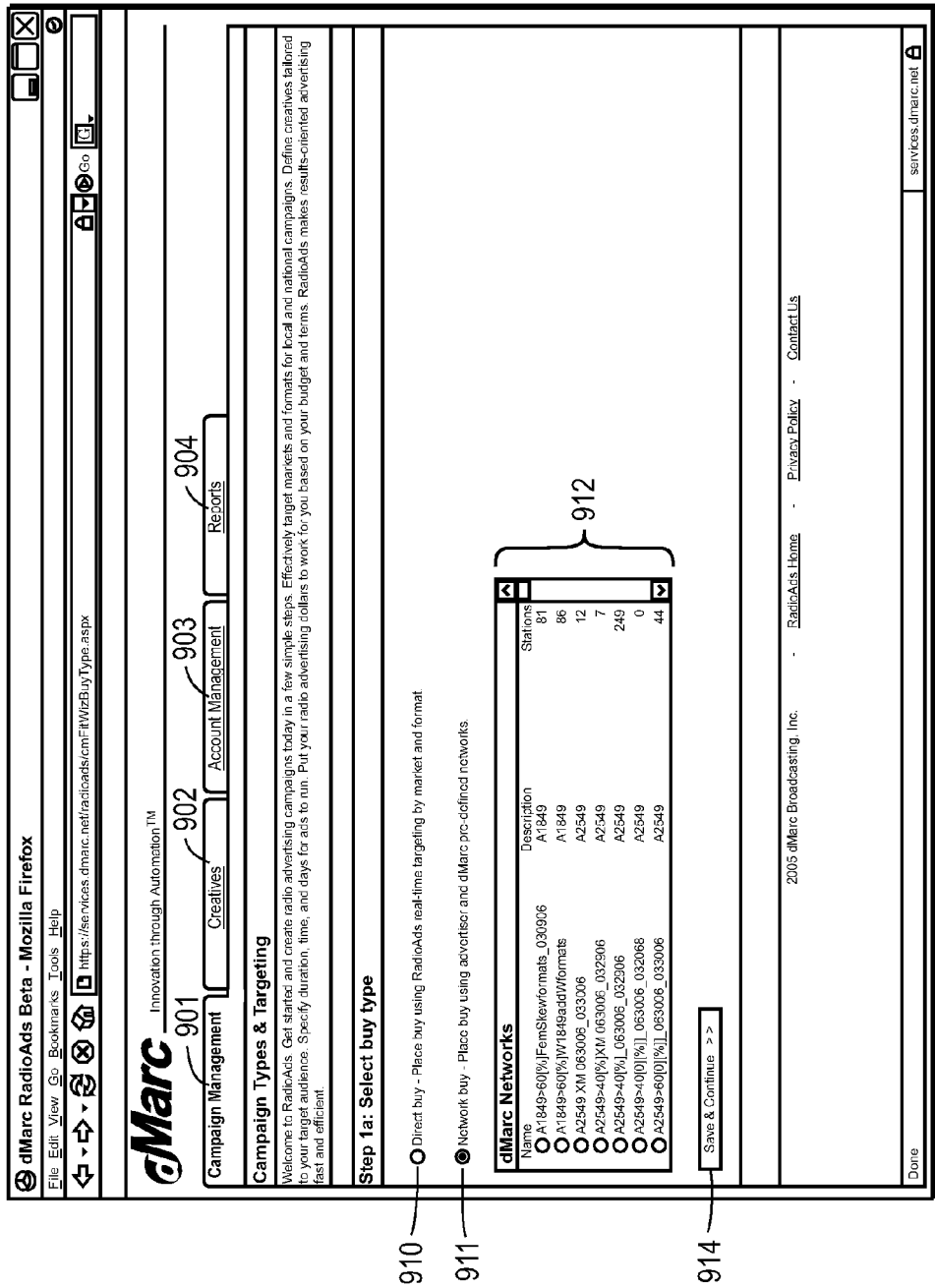
FIGS. 9A-O are illustrations of a buying interface.
Figure 9B:
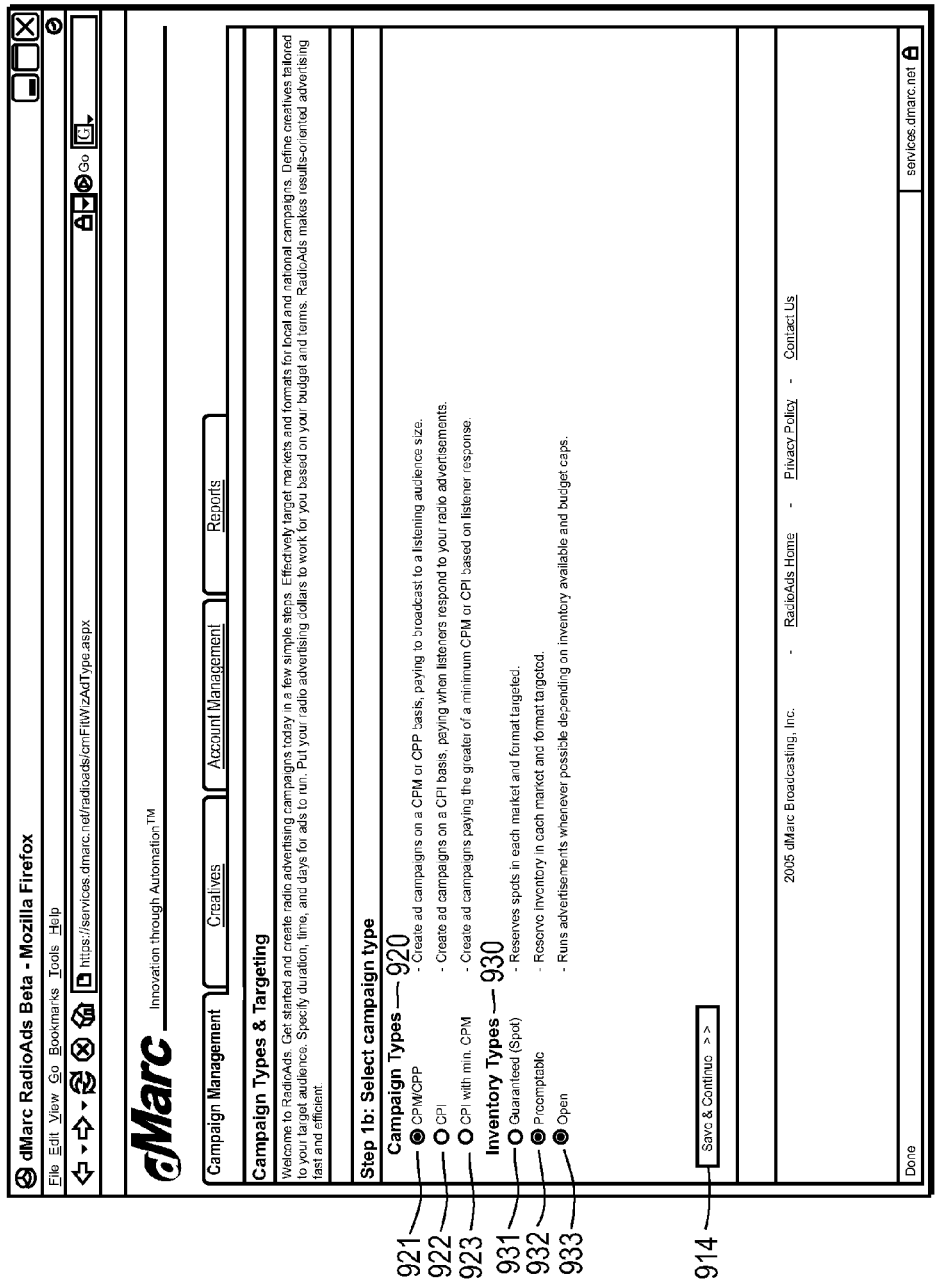
Figure 9C:
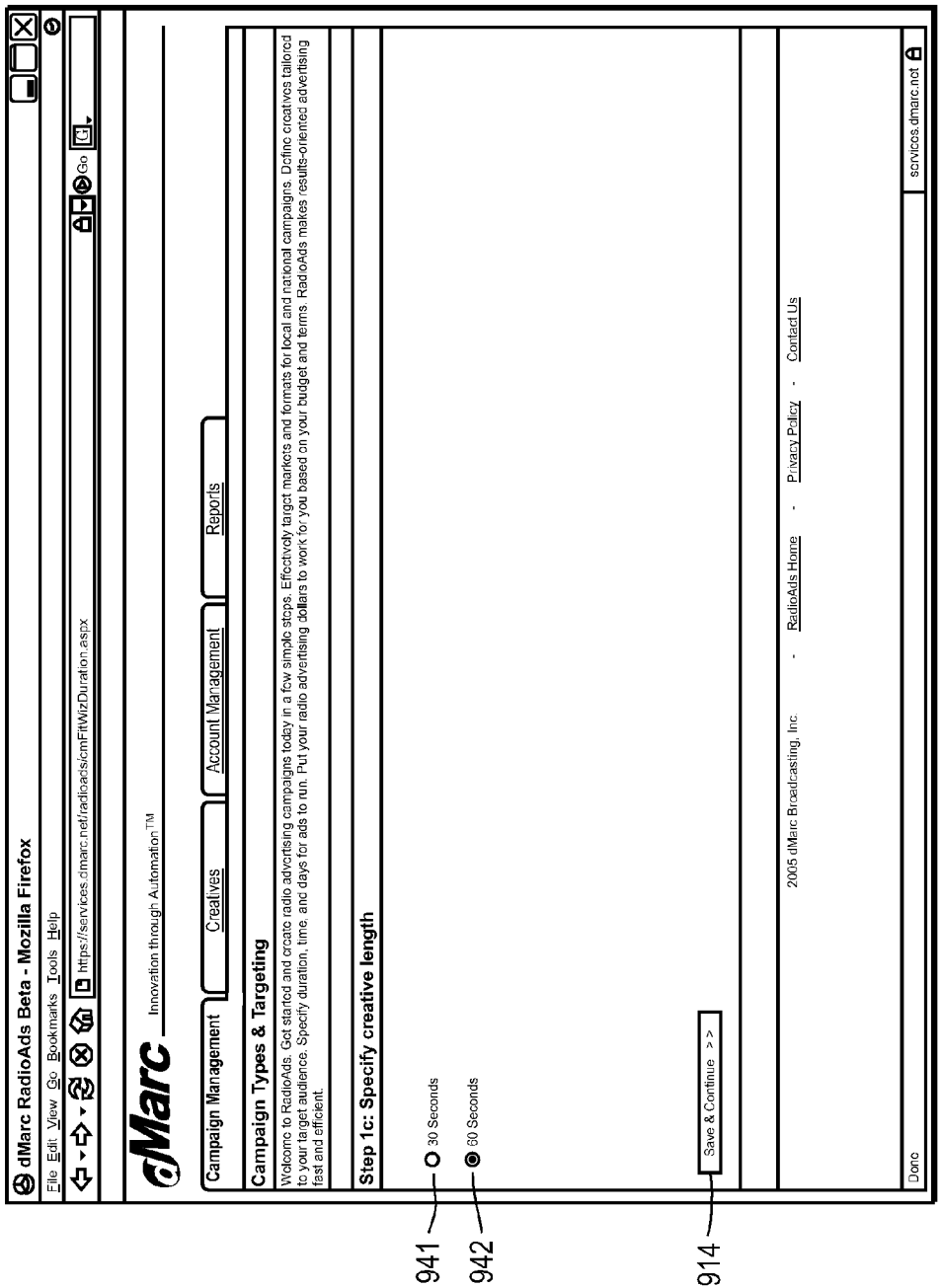
Figure 9D:
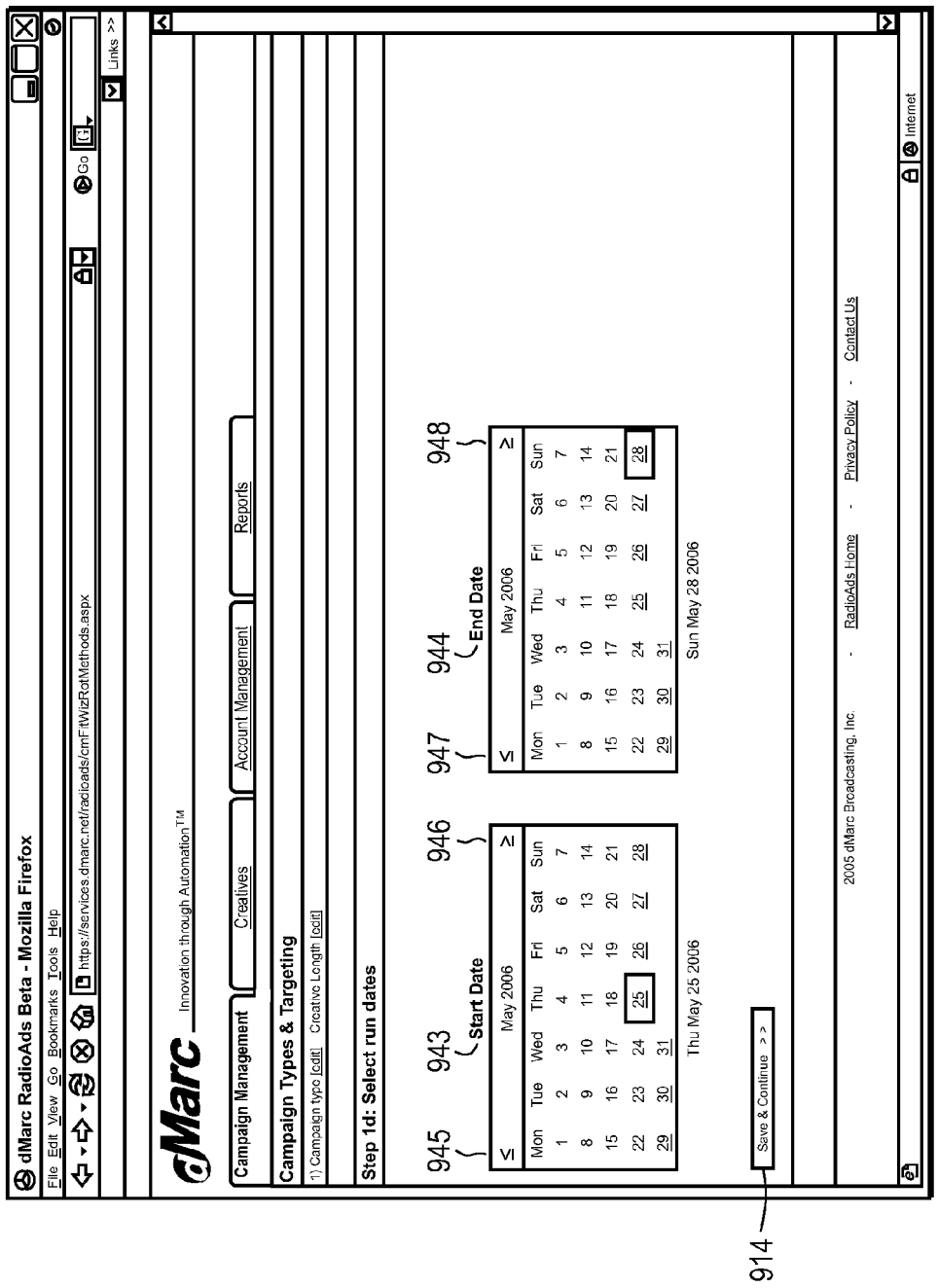
Figure 9E:
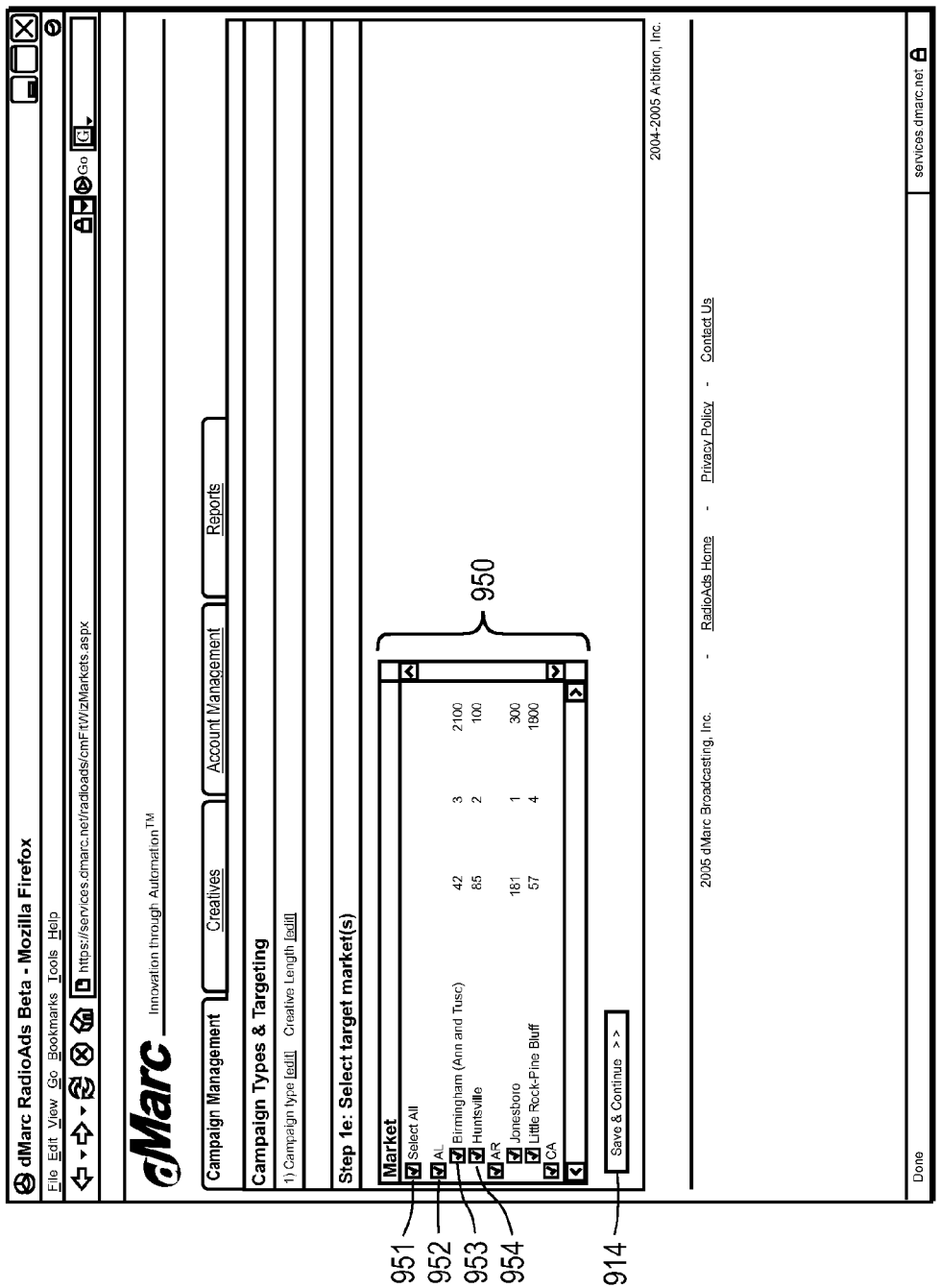
Figure 9F:
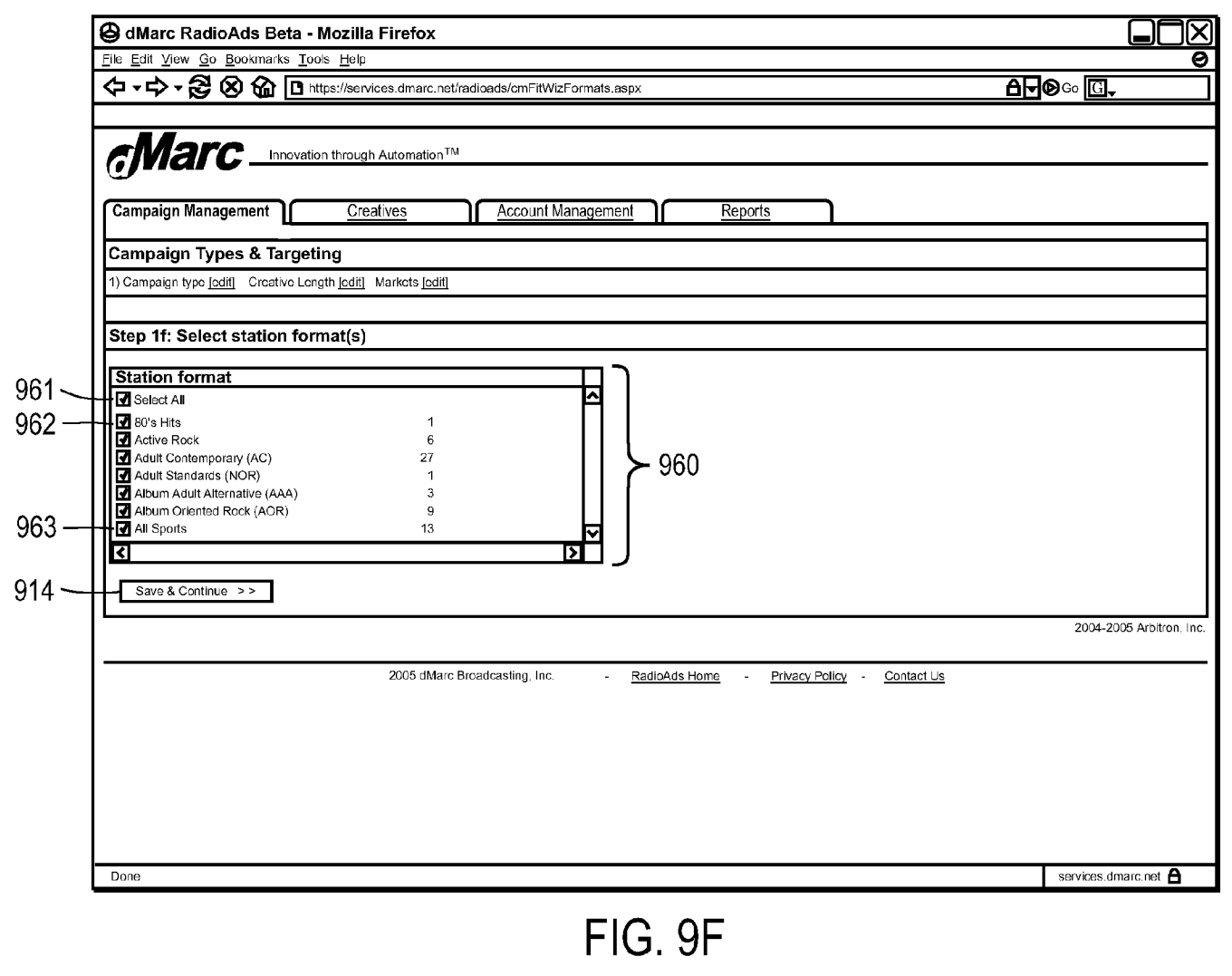
Figure 9G:
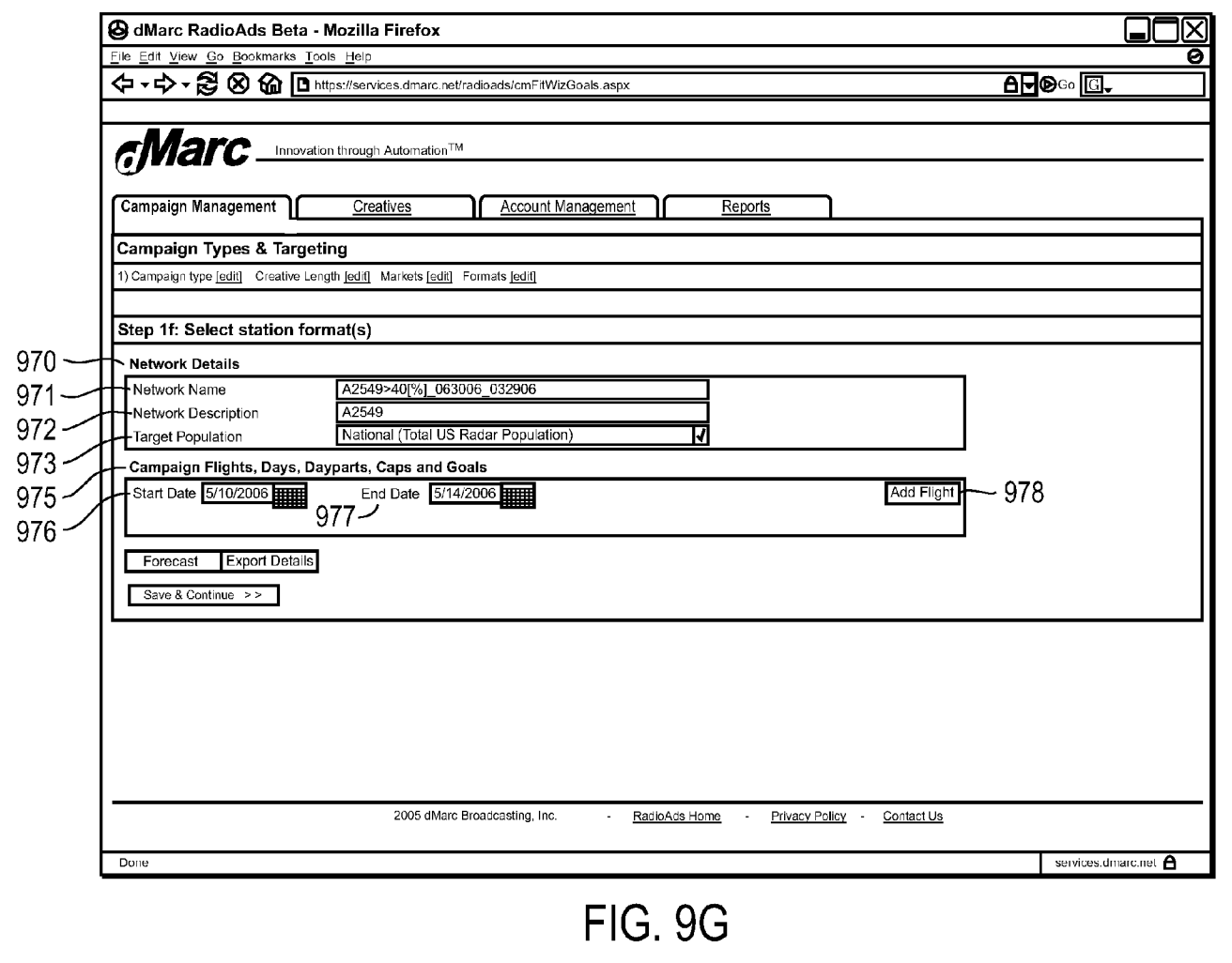
Figure 9H:
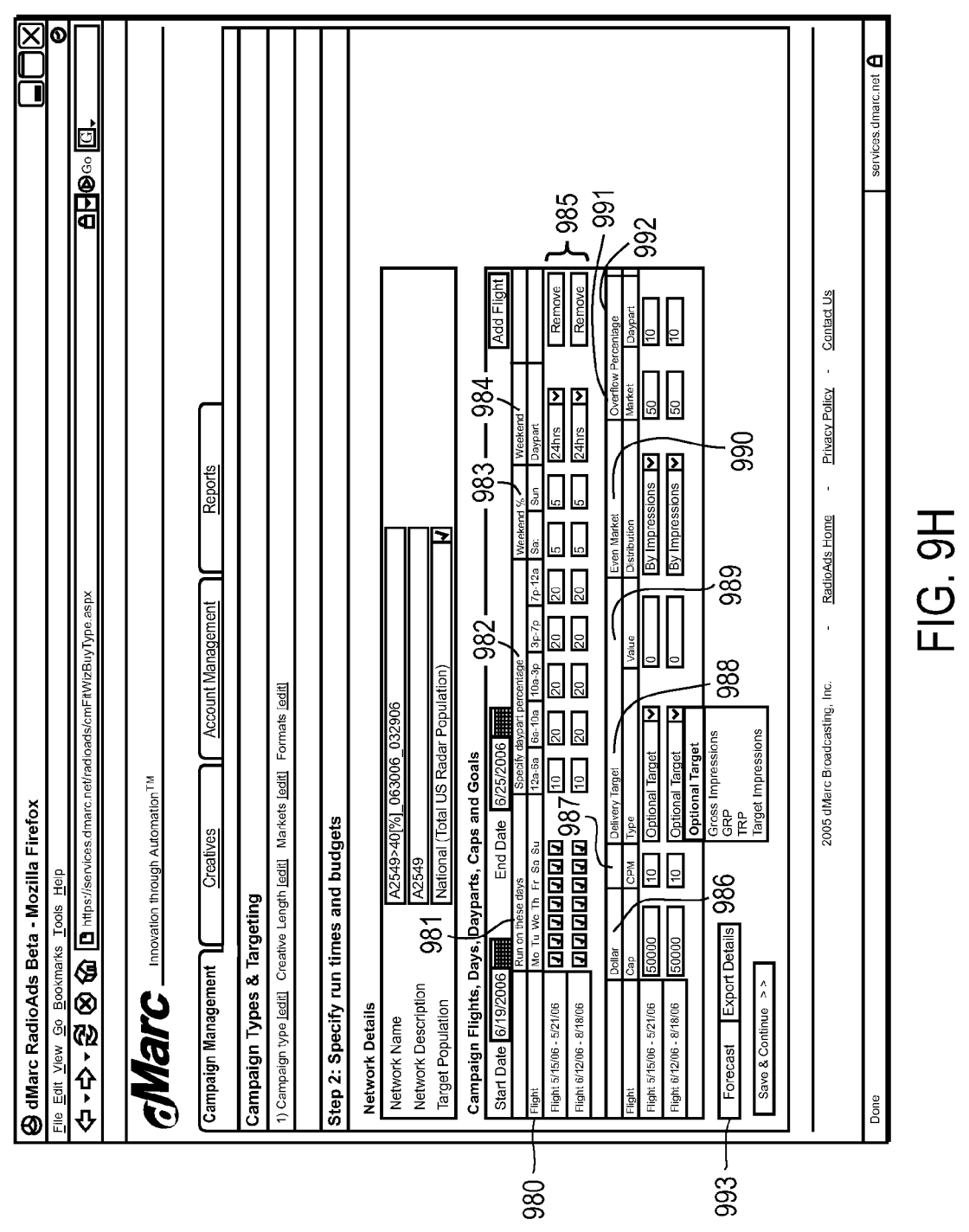
Figure 9I:
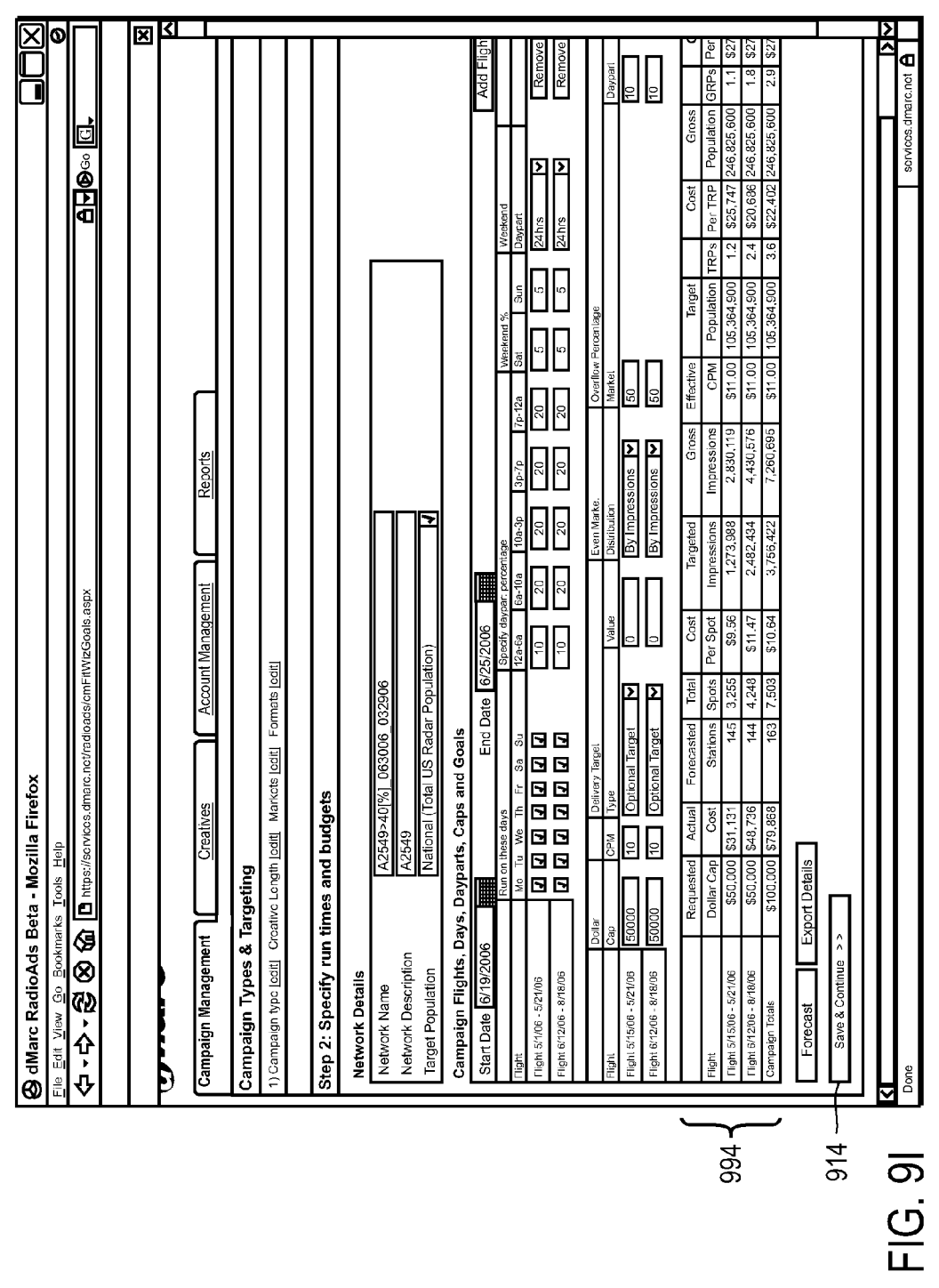
Figure 9K:
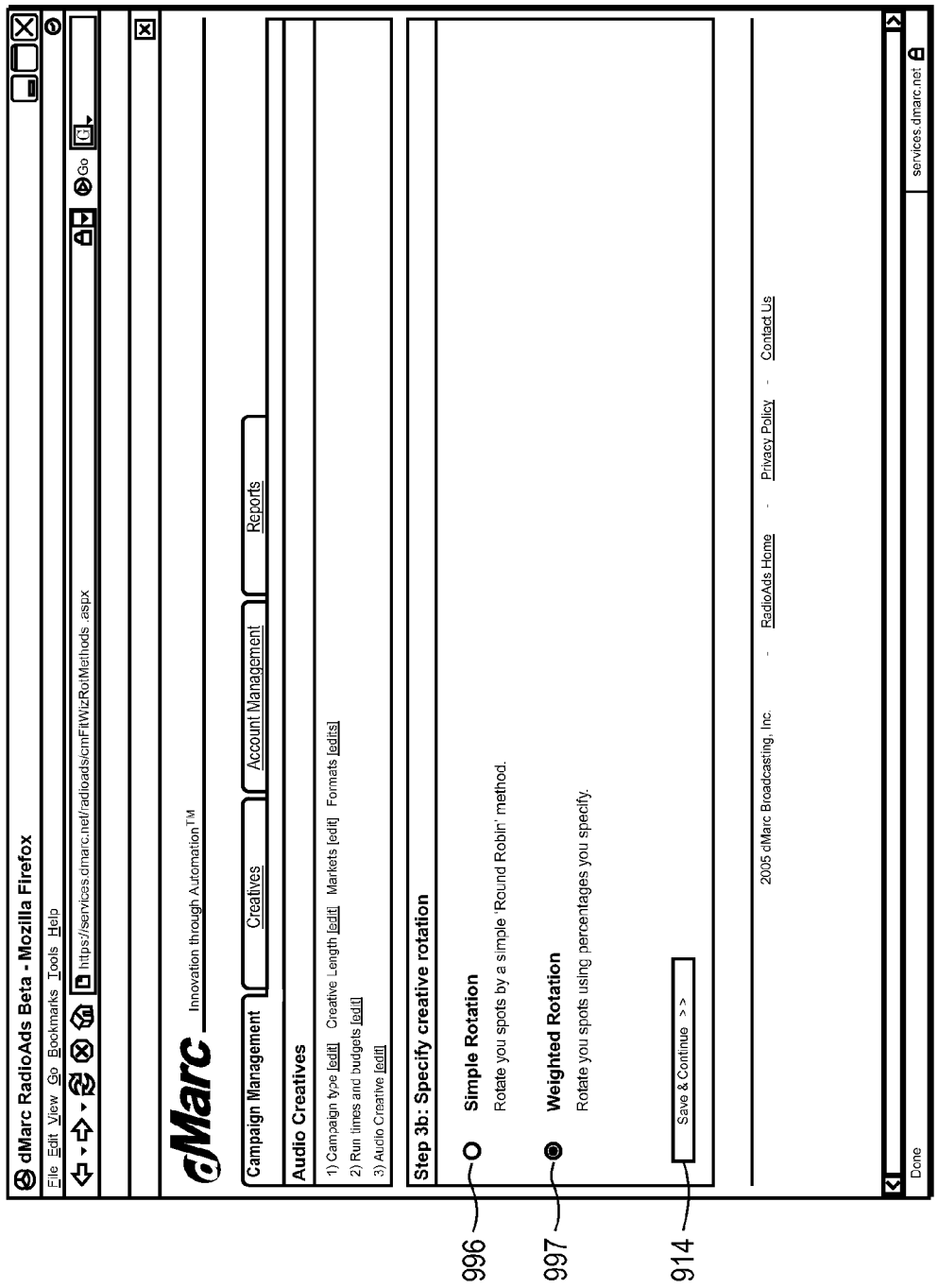
Figure 9L:
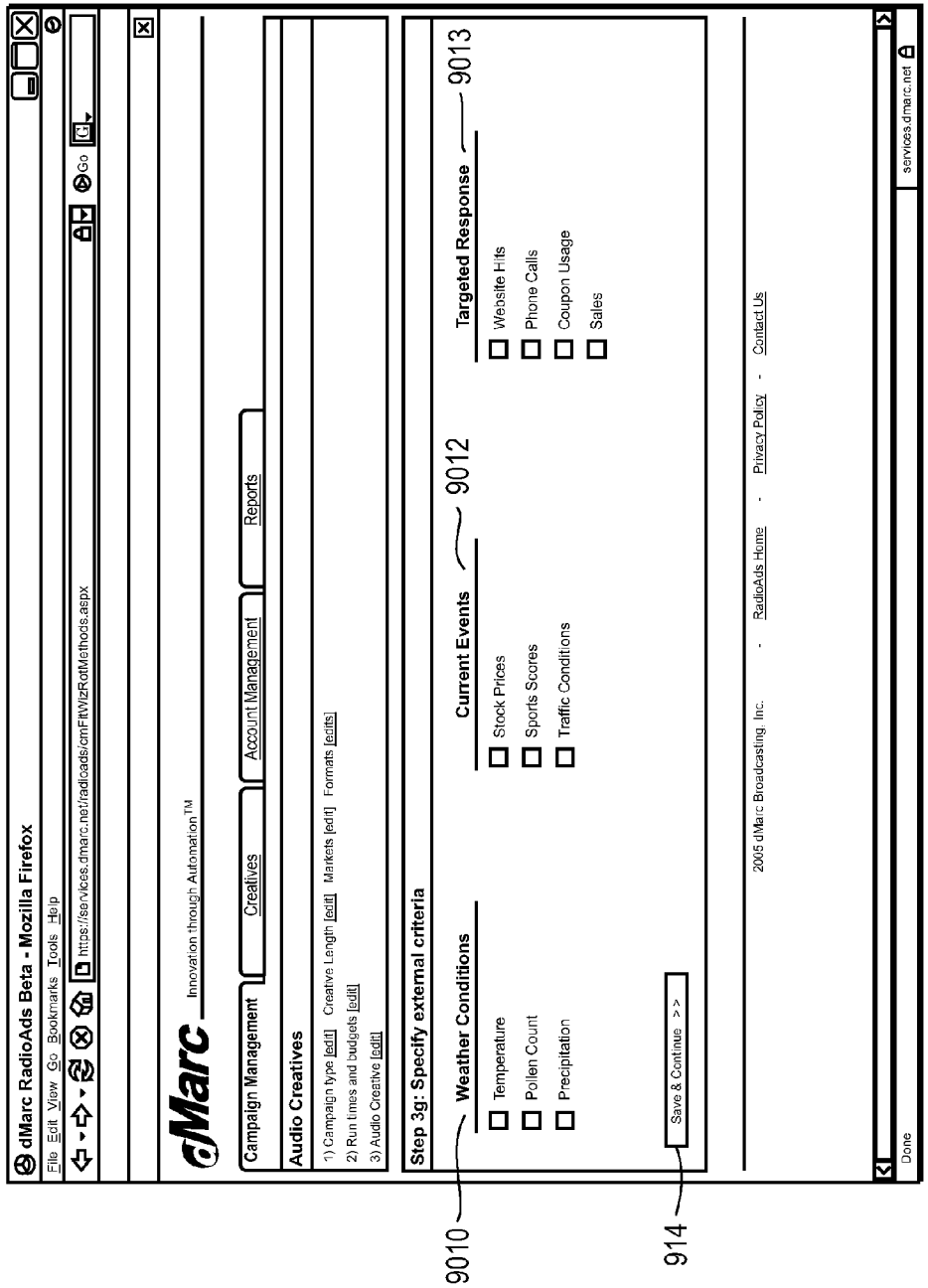
Figure 9M:
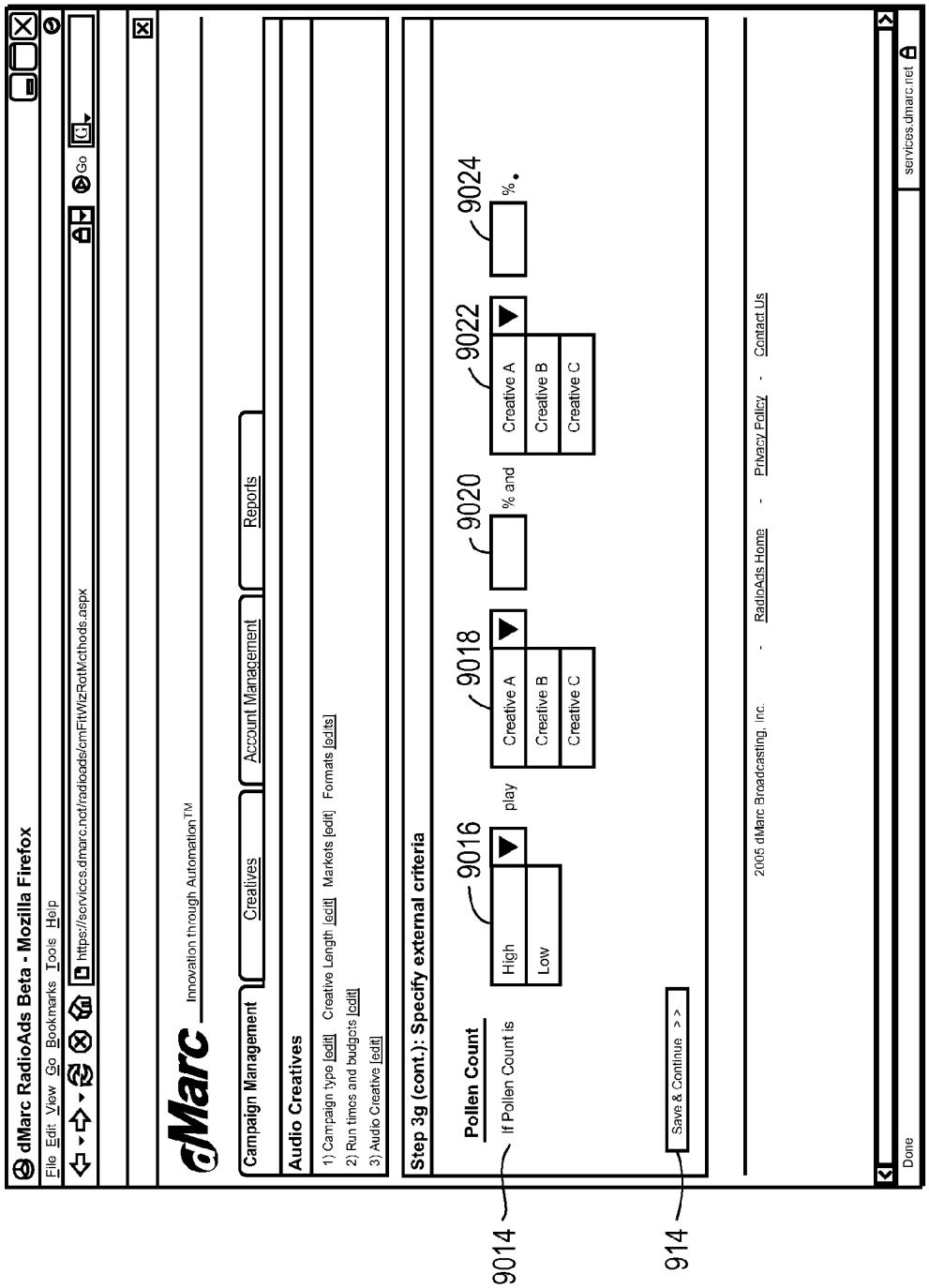
Figure 9N:
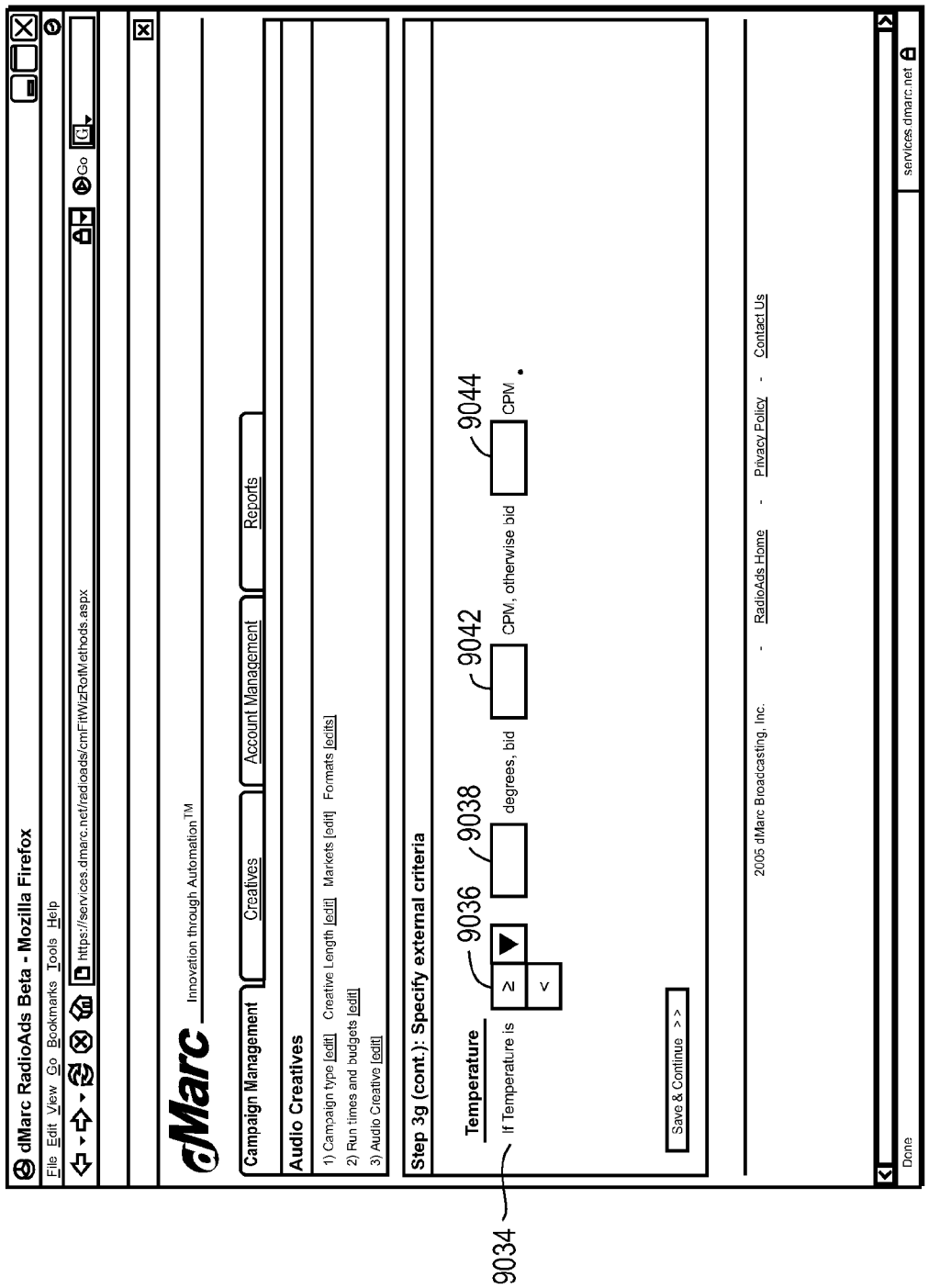

FIGS. 9A-N illustrates a user interface whereby advertisers may purchase advertising spots and develop an advertising campaign in accordance with desired and entered criteria. In general, the following discloses a user interface for purchasing and developing an advertising campaign. Several Figures are presented as screen shots depicting examples of the user interface as it might appear on a display screen or other output device. The particular screen layouts, appearance, and terminology as depicted and described herein, are intended to be illustrative and exemplary, and in no way limit the scope of the invention as claimed.

FIG. 9A illustrates a user interface for selecting a buy type for an advertising campaign. In one embodiment, the user accesses the user interface through an online account with the media broker, referred to herein as "dMarc". The account may require the user to login using a username and password or alternatively by using any other method of authentication known to those of skill in the art.

This example user interface 900 includes tabs 901-904 to allow the user easy access to the main portions of the user interface 900: campaign management 901, creatives 902, account management 903, and reports 904. In one embodiment, the user begins with the campaign management tab 901 selected. Within the campaign management tab 901, the user can develop the advertising campaign. The user can select a direct buy by selecting radio button 910. A direct buy allows the user to target advertisements by market and format, among other criteria. Alternatively, the user can select a network buy by selecting radio button 911. A network buy allows the user to place a buy using pre-defined networks. These networks may have been previously defined by the user or defined by the media broker. If a user selects radio button 911 for a network buy, the user may also select a network from the options listed in the network options window 912. In this embodiment, the name of the network, a description of the network, and the number of stations in the network are displayed. In alternative embodiments, more or less information may be listed for each option. In one embodiment, the information listed for each option in the network options window 912 is configurable by the user via user preferences specified by the user for the user's account. After the user has selected the buy type, the user selects the save & continue button 914.

FIG. 9B illustrates a user interface for selecting a campaign type. This example user interface includes a list of campaign types 920. The user selects the radio button for CPM/CPP 921 to pay based on a listening audience size. CPM stands for cost per thousand. The user selects the radio button for CPI 922 to pay based on listeners' response to the advertisement. The user selects the radio button for CPI with min. CPM 923 to pay based on the greater of a minimum CPM or CPI based on listener response. The user interface also includes a list of inventory types 930. The user selects guaranteed radio button 931 to reserve spots in each market and format that are targeted by the advertiser. The user selects the preemptable radio button 932 to reserve spots in each market and format that are targeted by the advertiser, but with greater uncertainty as to whether the user's spot will play as scheduled that with the guaranteed option. The user selects the open radio button 933 to run advertisements whenever possible depending on inventory available and budget caps. In one embodiment, default selections are made for the user on this screen, and the user can change the defaults if desired. Once the user has selected one from the list of campaign types 920 and one from the list of inventory types 930, the user selects the save & continue button 914.

FIG. 9C illustrates a user interface for selecting the creative length. This example user interface includes radio buttons corresponding to the length of the spot the user desires to air. In the example given in FIG. 9C, a radio button 941 is available for specifying a 30 second spot and a radio button 942 is available for specifying a 60 second spot. In other implementations, any other lengths of creative can be specified, for example shorter than 30 seconds or longer than one minute. In some embodiments, the user interface provides a drop down list or a text entry window to specify the length of the creative. Once the user has selected the length of the creative, the user selects the save & continue button 914.

FIG. 9D illustrates a user interface for selecting the run dates of the campaign. The user can select a start date from the start date calendar 943 and the end date from the end date calendar 944. The user can view dates of the previous month by selecting the left arrow 945, 947 or view dates of the next month by selecting the right arrow 946,948. The start and end dates the user selects can be highlighted, marked in a contrasting color, underlined, bolded, or identified in any other fashion. In this example, the user is selecting the run dates of the entire campaign rather than selecting the run dates of individual flights that make up the campaign. The user interface for selecting dates for flights is described below with reference to FIG. 9G. Once the user has selected the start and end dates of the campaign, the user selects the save & continue button 914.

FIG. 9E illustrates a user interface for selecting target markets for the play of the creative. This example user interface includes a target market options window 950. Within the target market options window 950, the user can select checkboxes corresponding to the target markets of their choice. In the example user interface shown in FIG. 9E, the target market options window 950 includes a select all checkbox 951 for selecting all market options. A checkbox is also available to select all target markets within a state by selecting the checkbox next to the state abbreviation, for example checkbox 952 for Alabama. Alternatively or additionally, a user can select checkboxes such as checkboxes 953 and 954 corresponding to individual markets within the state, in this example Birmingham and Huntsville within the state of Alabama. In various implementations, additional information is listed about each market option. For example, the market rank, the number of stations in the market, and the average AQH, a measure of the listenership of the station, can also be included. In other implementations, more or less information may be listed to help the user determine which markets to select for a campaign. The user can use the checkboxes to select or deselect the target markets of interest, and then select the save & continue button 914.

FIG. 9F illustrates a user interface for selecting station format for the play of the creative. This example user interface includes a station format options window 960. Within the station format options window 960, the user can select checkboxes corresponding to the station formats of the choice. For each station format option, there is listed the number of stations that have that station format. In one embodiment, this number is calculated only for the markets that the user selected through the user interface shown in FIG. 9E. In the example user interface shown in FIG. 9F, the station format options window 960 includes a select all checkbox 961 for selecting all station formats. A checkbox is also available to select, for example 80s Hits stations 962 or All Sports stations 963. The user can use the checkboxes to select or deselect the station formats of interest. In other embodiments, a user can make selections from a drop down menu and/or can filter the selections based on available inventory, or various other ways of making a selection known to those of skill in the art. After the user selects the station formats for the play of the creative, the user selects the save & continue button 914.

FIG. 9G illustrates a user interface for specifying run times and budgets. This example user interface includes a list of network details 970. In one embodiment, the network name and network description and target population information is automatically populated from the information selected previously by the user. In one embodiment, the user can also select or adjust the start date 976 by selecting the calendar and selecting the day on which the campaign flight should begin. Similarly, the user can also select or adjust the end date 977 for the campaign flight. The user can then select the add flight button 978. In one embodiment, the user is presented with further customizable options for the campaign flight, which will be described with reference to FIG. 9H.

FIG. 9H illustrates a user interface for specifying run times and budgets, specifically campaign flights, days, dayparts, caps, and goals. The user interface includes a list of flights in the campaign 980. The user can specify the days of the week to run the creative using the checkboxes 981 of the user interface. The user can specify the daypart percentages by entering numbers into the daypart percentage fields 982, including the weekend percentage. The daypart percentages 982 and the weekend percentage 983 specify how the user desires to weight the play of the advertisement in terms of how the spots for a week are split up into time slots. For example, the user can specify that the creative only be played during morning drive time (6 am-10 am) by weighting the appropriate daypart percentage field at 100, which corresponds to 100% of the plays of the creative during the flight. Alternatively, the user can specify any other combination of times. In other embodiment, the dayparts are more finely or coarsely defined. In the example user interface given in FIG. 9G, the entire day of Saturday and the entire day of Sunday is each treated as a daypart for percentage allocation purposes. Further, in this embodiment, the user can select the weekend daypart 984 using the dropdown menu that specifies time window on the weekend during which the creative can run. In this example, 24 hrs has been selected, which indicates that the creative can run at any time of the day or night of the weekend.

The user interface of FIG. 9H also includes a text field to specify the dollar cap amount 986 for each flight. The user can enter a cost per thousand impressions cap amount into the text field for CPM 987. Alternatively, if the user has selected a campaign type of CPI 922, the user can enter a cost per inquiry amount into a text field in place of the CPM text field 987 shown in FIG. 9H. Further alternatively, if the user has selected a campaign type of CPI with min. CPM 923, the user can enter both a cost per inquiry amount and a CPM into respective text fields. The user interface provides a drop down menu to select the delivery target type 988. The delivery target types include gross impressions, GRP, TRP, and target impressions. The user specifies, via value 989, the value of the delivery target that the user desires. The even market distribution drop down menu 990 allows the user to specify whether the user wants the delivery target to be met evenly across markets regardless of size (i.e., by impressions), or proportionally across the markets according to listening population (i.e., by percentages). For example, suppose a user enters a target of 10,000 impressions and has selected two geographic markets, Des Moines, Iowa, and New York City, N.Y. over which to make the impressions. Selecting even market distribution 990 by impressions will instruct the system to allocate spots with the goal of achieving 5,000 impressions in Des Moines, Iowa, and 5,000 impressions in New York City, N.Y., despite the size of the relative markets. However, the target of 10,000 impressions could instead by expressed as a desire to reach a certain percentage of the listeners in Des Moines and a similar percentage of listeners in New York City, thus resulting in the number of impressions in Des Moines being targeted at a proportionally lower number than New York City to adjust for the size difference between the markets. The overflow percentages fields 991 and 992 allow the user to specify by how much the constraints on even market distribution and the daypart percentages can be relaxed. In one embodiment, if zeros are entered into fields 991 and 992, then the rules are strictly followed. Given the example above, if only 3,000 impressions worth of inventory are available in Des Moines that meet the user's other criteria, then the target for impressions in New York City will also be 3,000. However, if the market overflow percentage is increased from zero to 20%, then up to 20% of the total target impressions, if not available in Des Moines, can be compensated for by impressions in New York City. The daypart overflow percentage 992 works similarly to relax the criteria specified in the daypart percentages 982-984.

By selecting the forecast button 993 shown in FIG. 9H, the user can access a forecast of the spots that are forecasted to run for each flight in a campaign. FIG. 9I illustrates a user interface showing the forecast 994 of the spots to run for two flights in a campaign. Various data can be included in the forecast, such as the requested dollar cap, the actual cost, the forecasted number of stations to run the spots, the total spots, the cost per spot, the targeted impressions, the gross impressions, the effective CPM, the target population, the TRPs, the cost per TRP, the gross population, the GRPs, the cost per GRPs, and other financial and statistical data relevant to the forecasted plays of creative in the campaign. The user can select the save & continue button 914 to exit the forecast view.

FIG. 9J illustrates a user interface for specifying the audio creative to run. This example user interface includes a list of available creative 995. In one embodiment, after the user uploads a new creative to the system, it will appear in the list of creative 995. The user can select one or more creative using the checkboxes in the list 995, and then select the save and continue button 914.

FIG. 9K illustrates a user interface for specifying how the audio creative selected via the user interface of FIG. 9J should be used in rotation. The user can select radio button 996 to specify that a simple rotation should be used, for example an alternation between two advertisements. The user can select radio button 997 to specify that a weighted rotation should be used to rotate the selected spots using user-configurable percentages. The user can subsequently select the percentages for the weighted rotation. For example, the user may specify that creative A be played 75% of the time, and creative B be played 25% of the time. Alternatively, the user may specify that any number of creative be played at any desired weighted rotation. The user can select the save & continue button 914 to save the user's preferences for the creative rotation.

FIG. 9L illustrates a user interface for specifying external criteria for the play of a campaign creative, in accordance with an embodiment of the present invention. Factors other than the time, day, and station may influence if and when a user wants to have a creative played. For example, an advertiser may determine that certain factors influence the mood or behavior of those who are likely to hear an ad, and may correspondingly influence the success of the ad in triggering the targeted response. For example, an advertiser may determine, from experience or market research for example, that people are more inclined to buy ice cream on hot days than cold days. Therefore, an ice cream advertiser may want to schedule advertisements for ice cream on hot days to increase the targeted response of ice cream purchases from his store. As another example, an advertiser may determine that consumers are more receptive to advertisements for vacations on days where commute conditions are the worst. Therefore, this advertiser may desire to schedule advertising time accordingly. As a further example, it may be determined that items branded with the name of the local sports team sell better after a recent victory by the team. As these examples illustrate, there are a number of factors, criteria, or conditions beyond the time of day and station that may directly or indirectly influence how receptive listeners are to the creative and how likely they are to make the targeted response. These factors, criteria or conditions, other than time, day, and station, are collectively referred to herein as external criteria. The present invention allows advertisers to specify these external criteria and the system schedules the spots according to these rules. The following screen shots illustrate examples of external criteria, but one of skill in the art will recognize that other criteria are also possible.

In the example of FIG. 9L, a list of weather conditions 9010, a list of current events 9012, and a list of targeted responses 9013 are displayed to the user. Each weather condition 9010, current event 9012, and targeted response 9013 has a corresponding checkbox that the user can select to specify that the corresponding criterion is of interest. In other implementations, other current events, other weather conditions, other targeted responses, or any other category of external criteria can be listed, such as a wait time of a call center, a terror-alert color, news stories, broadcast topics/radio guests, financial indicators, interest rates, gas prices, and store visits, for example. In the wait time of a call center example, a user can specify that if a wait time until a customer's call is answered at a call center exceeds, for example, 10 minutes, an alternative advertisement should play rather than playing an advertisement that encourages additional customers to call. In this way, call center wait time can be managed to ensure adequate responsiveness. In other implementations, such as in the on-demand context, individual characteristics of a person requesting the media play can be used to determine which creative to play. In those implementations, characteristics can be listed in addition to or instead of other criteria. The user can select one or more criteria, and then select the save & continue button 914.

FIG. 9M illustrates a user interface for specifying a rule 9014 for the example external criterion of pollen count. In this example, this portion of the UI determines which ad is played in a particular slot. The slot is determined, for example, according to either a reserved method (also called guaranteed) or the auction method (also called open). This example allows the user to specify criteria to decide which ad will be played in a particular slot. FIG. 9M shows selection of external criteria on a campaign-wide basis. In other implementations, the selection of the external criteria can be performed separately by geographical location, by demographic population, or by any other subgroup. Using the interface of FIG. 9M, the user can specify a criterion and identify the action the user wants taken when the criterion is met. In this example, the details of the rule the user wants followed is with respect to pollen count. The user can select from drop down menu 9016 whether the rule is defined in terms of a high pollen count or a low pollen count. The user identifies via drop down menu 9018 the creative that the user wants played from the creatives that the user has uploaded to the system. Via text entry field 9020, the user specifies the percentage that the creative identified in menu 9018 should be played in accordance with various values of pollen count. The user can also identify via drop down menu 9022 a second creative from the creatives that the user has uploaded to the system to play for the percentage specified in text entry field 9024.

For example, a company that makes allergy medicine and a pain killer may desire to establish a rule with respect to how often advertisements for each of their products are played. On an average day, the company may prefer to play an advertisement for its allergy medicine in a simple rotation with an advertisement for its pain killer. However, the company can specify a criterion and identify an action to take when the criterion is met. For example, on high pollen count days the company may want a different allocation between allergy medicine advertisements and pain killer advertisements. High pollen count days may trigger many people to consider purchasing allergy medicine, and the company may wish increase the frequency that the allergy medicine spot plays in order to induce more sales of the company's brand over the company's competitors. Therefore, the company can use the interface of FIG. 9M to establish a rule with respect to pollen count. The company may specify that if pollen count is high, then creative A (the allergy medicine advertisement) should be played 90% of the time and creative B (the pain killer advertisement) be played 10% of the time. Alternatively, the company may specify that if pollen count is high, then creative A should be played 50% of the time and creative C, another allergy medicine advertisement, be played 50% of the time. In this example, if when the criterion is met, the company only wants one advertisement to be played, 100% can be entered into the text entry field 9020.

In one embodiment, there can be a plurality of rules for conditional bidding. For example, rules can be developed on a per market basis, on a per format basis, or on a per station basis.

FIG. 9N illustrates a user interface for specifying a rule 9034 for the example external criterion of temperature. In this example, this portion of the UI determines which slot an ad is ultimately played in. The slot is determined, for example, according to an auction method (also called open). In this example, the user can specify how valuable a spot is that meets the criteria the user establishes, and this may affect the price that a campaign ultimately bids for a slot. The user can adjust how much the user is willing to bid for a spot that meets the criteria. The user can enter via drop down menu 9036 whether the rule is with respect to the temperature being greater than or equal to a threshold or below a threshold. The user can enter the threshold temperature in text entry field 9038. The user can then specify in text entry fields 9042 and 9044 what the user's respective bids are for when the criteria are met and when they are not.

For example, a company that sells tropical vacations may desire to establish a rule with respect to how much it is willing to pay to play advertisements in certain weather conditions. Suppose that the company has discovered that although people buy tropical vacations year round, people are particularly inclined to buy tropical vacations when their local temperature is below freezing. Thus, advertising time on days when the temperature is below freezing is more valuable to the company than advertising time on warmer days. In this case, the company can use the interface of FIG. 9N to establish a rule in advance, for example days, weeks, or months in advance, of scheduling any advertising time. The company may specify that if the temperature is less than 32 degrees, the company bids $10 CPM, and otherwise bids $7 CPM.

Because the company bids higher on the cold days, it is more likely to be allocated more spots on cold days than on warm days.

FIG. 9O illustrates a user interface for specifying a rule 9050 for the example external criterion of listener phone calls in response to plays of advertisements. In this example, the user can specify the percentages that advertisements should play based on the success of the respective advertisements in achieving the targeted response of phone calls. The user can specify the period over which the phone call data should be compared from drop down menu 9052. For example, the user may desire the most recent data from only the last day, or for a longer or shorter period. Alternatively, any relevant period, for example, the runs of individual flights within a campaign can be listed by date. The user can specify a creative from the drop down menu 9054 to compare via an operator from drop down menu 9056 to a creative from the drop down menu 9058. The selection from menu 9052 identifies the period of interest, and the selections from menus 9054, 9056, and 9058 identify the relationship between the response to those advertisements that defines the criteria for the following action of adjusting the play percentage. The user can specify via drop down menu 9060 a creative to increase the play percentage of by an amount specified by the user in field 9062. For example, a user may establish a rule 9050 that if phone calls from last week in response to creative A are less than the phone calls from creative B, then the play percentage of creative A should be increased 10%.

The example rules of FIGS. 9M, 9N, and 9O are merely illustrations of types of rules that can be established by users. Rules for any external criteria can be developed in a variety of formats. Moreover, multiple rules can be developed to govern the play of one campaign. Alternatively or additionally, rules for any external criteria, including listener response, can be developed on a per market basis, on a per format basis, or on a per station basis. For example, if the play of a first creative is generating a better response on one station than the play of a second creative, the user can elect to have the system automatically adjust the respective play percentages to increase or maximize the overall return the advertiser's investment.

FIG. 10 illustrates a user interface for a campaign summary 999. The campaign summary can include any data of interest in managing a campaign. In this example, the campaign summary includes a list of flights, the relevant start and end dates of the flight, the ad cap, the expenditure to date, the audience to date, the status of the flight, and other campaign information. In one embodiment, the user can select the history link for each flight in the campaign summary 999 to view a more detailed analysis of the given flight. In other implementations, the user can specify the columns of information to display in the campaign summary 999 through user preferences.

Figure 11:
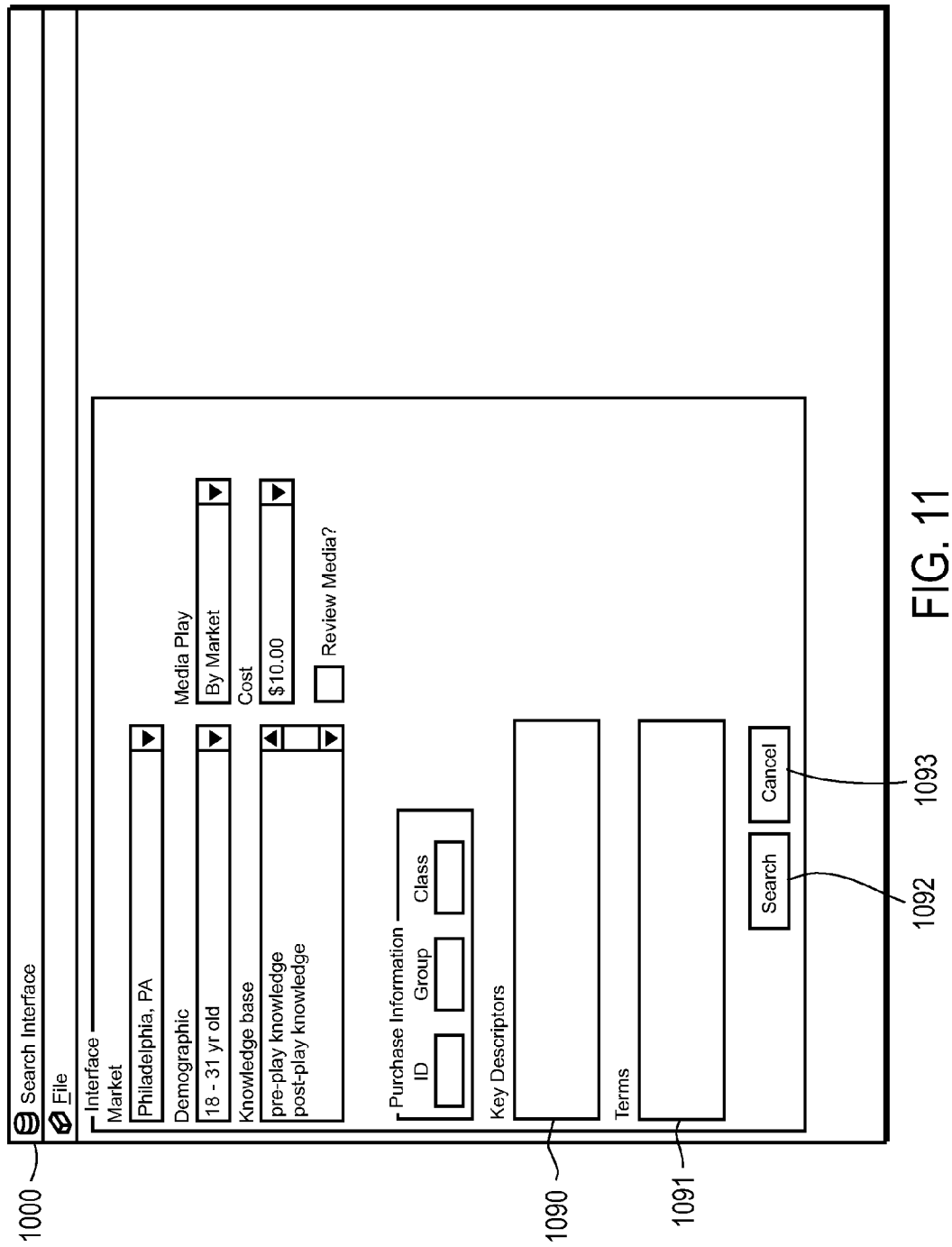
FIG. 11 is an illustration of a search interface.

FIG. 11 illustrates a search interface 1000 that may be associated with pre-play knowledge and/or post-play knowledge of a media play. For example, a media play comprising audio media may, based on the understanding of the hub, be subject to pre-play knowledge that the audio play is about to occur. Further, in an embodiment, the audio play may be speech to text converted prior to the audio play, and as such the audio may be available via a text search based on the pre-play knowledge. Similarly, an audio media play may occur, and post-play knowledge may exist that the audio play occurred. The audio may be speech to text converted, and as such may be available via a text search substantially immediately following the occurrence of the audio media play. Likewise, key descriptors related to but not present in the audio may be electronically associated with a post-play recording of the audio itself, a pre-play recording of the audio itself, or the searchable text conversion of the audio play as discussed hereinabove. Thus, the entirety of this information may be stored in a database, such a relational database, wherein keywords, key terms, text, circumstances, and pre-play and post-play knowledge of a media play are associated with the media play.

In the example interface shown in FIG. 11, the search interface 1000 allows the user to enter text into the key descriptors window 1090 or enter text into the terms window 1091. The user can then select the search button 1092 to execute a search of database storing the data about the scheduled media plays. To cancel the search for key descriptors or terms, the user can select the cancel button 1093.

For example, if the Jim and Dean Radio Show interviews the President at 9:00 a.m. on a Tuesday morning, knowledge of the occurrence of a media play comprising the audio of a radio interview between Jim and Dean and the President may allow for an association of key terms, such as "Jim and Dean Show", the "President", "Tuesday", and the like, with the audio file of the interview, or with the searchable text generated in accordance with the audio file of the interview. As such, the interface of FIG. 11 allows for the location of the audio file based on a search for terms used during the interview, and/or based on a search for the key terms associated with the interview. It will be apparent to those skilled in the art that, although the present exemplary embodiment as discussed with respect to audio media, video media and computer media may be similarly made available for searching.

With regard to the interfaces of FIGS. 9-11, the use of searching through the interface of FIG. 11 may be tracked in order to inform relevant characteristics of the advertising. For example, a high volume of searches at the interface of FIG. 11 for the terms "Jim and Dean Show" and "President" is indicative of demand for advertising spots during the broadcast. In one embodiment, the price charged for the purchase of such advertising can be positively correlated to the number of times certain keywords are entered. Consequently, a higher price can be charged for the most popular spots.

In another embodiment, via the interface of FIG. 9, advertisers can enter preferences to universally purchase advertising slots adjacent to the audio media plays that are hits for certain search terms. For example, the Walt Disney Company might desire that, through the interface of FIG. 9, an advertisement for the Walt Disney Company be scheduled to run adjacent to any broadcast that involves the term "Disney". Thus, if the "Jim and Dean Show" is scheduled to review a Disney Movie on Wednesday morning, in this example, the Walt Disney Company wants to purchase an advertisement slot, for example, before, during, or after the review.

In one implementation, keywords and descriptions can be included as headers to computerized files associated with the media play. As such, media play can be tokenized, or broken, into numerous parts, and headers for each division can be devised as to a proper description of the media play in that particular portion of the overall media play. Thereby, a media play could be searchable, and consequently associated advertising media plays could be sale-able, in accordance with the media play, searchable text associated with the media play, divisions of the media play, searchable text associated with divisions of the media play, headers associated with the media play, or headers of sections associated with the divisions of the media play.

Further, the searchability and sale-ability of media plays and portions thereof may be advantageously optimized in accordance with the association of the hub with the media plays. This is due to the fact that the hub allows for pre-play and post-play knowledge of each media play, including scheduling information, pre-emption information, linking information, or insertion information. The searchability and sale-ability of particular media plays may further be associated with the system in an inverse relationship. For example, if a user entered a particular media play for review on line, certain relevant keywords or associations made with that media play in a searchable engine, such as that of FIG. 11, may be associated with that user's accessing of the media play, and as such advertising media plays may be presented to that user in accordance with search terms deemed most likely associated with that user based on the accessing of that particular media play.

The use of the present invention in audio media play embodiments can be optimized through the use of an optimized speech to text converter. It will be apparent to those skilled in the art that, in the event an optimized speech to text converter is not available, it may be desirable to manually review speech to text conversions prior to making such conversions available through the interface of FIG. 11.

As discussed above, it is preferable that the media play interfaces of FIGS. 9-11 be associated with the hub discussed hereinthroughout. In an embodiment, media play point output, such as a radio station output, may, upon occurrence of a particular media play or for all media play, be output through a speech to text conversion, voice recognition software system. The hub, through its post play monitoring function, may be associated with, or may include, the voice recognition software and may further include, or be associated with, a data recorder to record the associated text data. Further, that recorder or a second recorder may record the actual audio that has been played, and may capture that audio in high fidelity to allow for premium sound upon play back.

It will be apparent to those skilled in the art in light of the discussion of the hub hereinabove, that in particular embodiments, such as radio station embodiments, preplaying knowledge allows that only certain aspects of media play need be recorded. For example, music files that are digitally available and are output through the radio station in accordance with the play list need not be recorded upon occurrence of the play, as such recording is inherently already available digitally. Consequently, only the fact that that particular song was played and on what station and in what region and at what time, need be made available through the search engine, because the song could be simplistically accessed without making an additional recording upon the radio station play. Consequently, in certain exemplary embodiments only the audio feed output from the media play point that is not pre-recorded or pre-play available need be run through a speech to text conversion, or through a header addendum system as is discussed hereinabove. For example, one such feed no pre-play available would be the discussion engaged in by the disc jockey with radio guests or between songs.

In an additional exemplary embodiment, indexing of the media play data for searchability and sale-ability may be performed externally. For example, the hub may make necessary recordings, and may forward the times or circumstances of media plays and the media plays that occurred along with the relevant audio recordings made to a third party, which third party may then associate header files or text conversions with the received information. For example, the third party might associate metadata with each play signifying geographic areas, station names, names of disc jockeys, relevant key search terms, or other relevant data gained automatically, such as over the internet, with the received media play file. Of course, in the example above, the same functions of generating a header and/or metadata may not be handled by a third party, but may be handled at the radio station, at the media play point, or at the hub.

There are numerous applications for the aspects of the present invention as discussed immediately hereinabove. For example, based on the pre-play tracking of all media plays at the hub, certain non-playable content may be stripped prior to playing at the media play point, but the same content may be made available via searching, or may be restricted from availability via searching. Furthermore, as mentioned above, the present invention need not be limited to radio stations. For example, independent parties may place certain media plays for availability, such as on the World Wide Web. Such media plays, if made available to the hub and if requested by a third party, would be indexed and made searchable as discussed with regard to the exemplary embodiments hereinabove. For example, certain independent singers might wish to enter a contest wherein singing recordings are made available to the hub as entrants to the contest. The hub may then associate relevant key words, headers, Metadata, the audio of the media play, the text of the media play, or portions thereof with the media play submitted for the contest. Thereby, each independent media play submitted for the contest might be made available to the search interface of FIG. 11, and thus users of the World Wide Web wishing to access those media plays, or prioritize those media plays, might be able to do so. Such media plays, and the accessing, searching, and consequent interest therein, may further be tracked in accordance with the interfaces of FIGS. 9-11, and such tracking for searches for particular media plays might allow for a prioritization of such media plays, with the highest priority of those media plays being deemed the winner of the contest. Advertisers might wish to enter advertising relevant to the particular contest, but might wish to key particular advertising to particular participants of the contest, and could do so in accordance with the interfaces of FIGS. 9-11.

Figure 12:
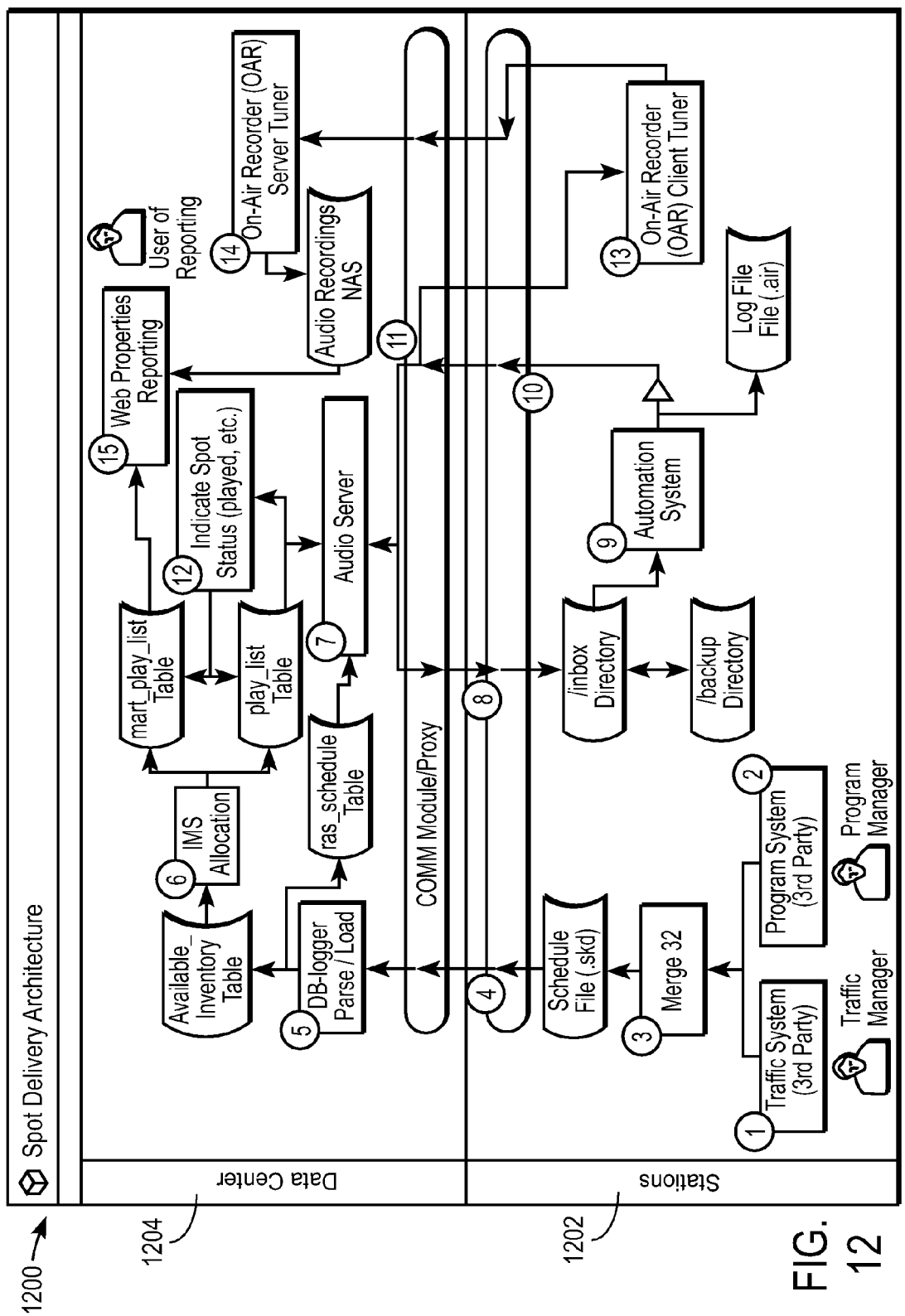
FIG. 12 is an architecture diagram showing data passing between a data center and radio stations in accordance with an embodiment of the present invention.

FIG. 12 is an architecture diagram of an Ad Management System 1200 showing data passing between a data center 1204 and radio stations 1202 in accordance with an embodiment of the present invention. The described embodiment of the Ad Management System is designed to be able to serve ads to several thousand radio stations and several hundred thousand campaigns. Although the present invention is described in particular detail in the context of terrestrial radio environments, it is recognized that the present invention can also be used in, for example, satellite radio, internet streaming, podcasts, cellular telephone, videogames, and other contexts without departing from the principles of embodiments of this invention.

In the described embodiment, each evening, the radio stations' automation software sends the station's play schedule for the following day to Audio Ads. See numerals 1-5 in FIG. 12. In other embodiments, the play schedule may come at varying times or at regular intervals or periods other than evenings. This schedule will contain the spots that Audio Ads is expected to fill. Audio Ads matches creative to these spots and sends the revised schedule back to the radio station, to be played by the station's automation software. See numerals 6-9 in FIG. 12. Periodically, for example each day, the station's automation software Audio Ads the actual schedule from the prior period or day, which can be compared against the expected schedule to determine if ads actually played. See numerals 10-12 of FIG. 12. As a final check, Audio Ads On-Air Recording System listens to the actual station's broadcast of select stations and through audio fingerprinting techniques verifies that the ads were actually broadcast. See numerals 13 and 14 of FIG. 12. Play failures are fed back into the Audio Ads system for reporting to advertisers. History has shown that roughly 15% of scheduled spots fail to play, either because of technical failures or because the DJ "talked over" the ad. This problem exists even outside of automation, so the industry has developed a "make good" practice to adjust for play failures, by playing the ad at a later, equivalent time.

In the described embodiment, the Ad Management system 1200 supports three models for buying available advertising slots: Guaranteed, reserved based on urgency, and Open (also called Auction).

Guaranteed campaigns (also referred to as Spot-Buy campaigns) are promised specific spots on a specified station, date, and daypart. In one embodiment, once the campaign books the spots, it will lose the spot only via play failure or if the forecasted inventory is not published by the station, not through preemption from another campaign booked through the system. Guaranteed campaigns can range in length anywhere up to several months in length, and can be booked up to several months in advance. At times, advertisers place value on knowing that a particular spot will run at a particular time.

Guaranteed campaigns are not simply an inventory reservation, however, because of the way that the advertisers specify their campaigns. For example, they may not specify which stations and times to play on, instead they provide targeting criteria, such as the number of listeners, listener demographics, the times of day to run, the markets play in, and so forth. Audio Ads then compares those criteria against the available inventory and presents a proposal for meeting those criteria. In one implementation, guaranteed campaigns specify a maximum CPM to pay. Each guaranteed campaign takes as much inventory as it needs to satisfy its campaign goals while keeping within its spending limits and other user-specified criteria. If the advertiser is happy with the station and time mix, then they approve the campaign and Audio Ads books it. Specifying campaign goals, viewing the proposal, and finalizing or booking the campaign are all done online through the Audio Ads front end. In one embodiment, the system should take no more than a few seconds (say, 10 seconds) to prepare a proposal once the criteria have been specified. The user must review the proposal and can book it within a few minutes. If the user waits too long to book the proposal, in one implementation, a new proposal will be generated to prevent staleness of the proposal in light of inventory changes.

In the reserved based on urgency model, campaigns can reserve inventory as in the guaranteed model. However, campaigns with a higher urgency take precedence over campaigns with lower urgency. In one embodiment, spots are presented to the campaign with the highest "urgency". Each spot is auctioned off in turn. In one embodiment, urgency is defined as being first in time to book, with one approach simply assigning earlier-booked campaigns the highest urgency.

Open campaigns play on inventory that has not been filled by guaranteed campaigns and can be preempted by guaranteed campaigns. Open campaigns are booked according to desired demographics and market criteria and the maximum CPM the advertiser is willing to pay. In one implementation, inventory spots not filled by guaranteed campaigns are filled with open campaigns at the last moment. In one embodiment, a system administrator can set a percentage inventory to set aside for open campaigns that will not be sold to guaranteed campaigns. Open campaigns compete among themselves for spots, with the "highest bidder" winning. The "bid" from an open campaign can be based on how well a spot meets the campaign goals in addition to the CPM. Every campaign determines what the spot is worth in terms of the campaign's goals. For example, each campaign evaluates each spot according to the relevant target demographic information for the campaign and adjusts the bid according to the campaign goals based on other criteria, such as time of day, market, etc. The auction process for open campaigns can be run at various intervals, for example, hourly, several times a day, once a day, or at other intervals.

One factor that complicates the reservation process is that some of the inventory is not well known in advance. Since Audio Ads often only receives the precise schedule, for example, one day in advance but spots can be sold months in advance, it is possible that spots will be sold to a guaranteed campaign that ends up not being made available. Ads also may fail to play because of play failures. Audio Ads addresses the first issue by forecast inventory, though the forecasting may not be precise. The second issue is addressed after the fact. Since it is a goal of the system to meet 100% of the guaranteed campaign requirements, Audio Ads monitors guaranteed campaigns in progress and adds additional "make good" spots whenever spots are lost or fail to play. In one embodiment the user can enable or disable make goods.

The Audio Ads Inventory Management System (IMS) 1300 is responsible for matching advertising campaigns to available advertising spots on the radio stations or other broadcast technologies serviced. Campaigns are usually specified as a set of constraints or criteria that the campaign must meet, such as markets the ad will play in, demographics it should reach, the number of listeners who should hear it, and the times of the day (dayparts) during which it should run. Radio stations typically publish the available spots one day in advance. In one embodiment, this inventory is then matched to the campaigns to satisfy the maximum number of campaigns. Since spots will be more valuable to some campaigns than to others (for example, the demographics of a certain spot may match one campaign but not another), it is desirable to optimize the allocation of spots across multiple campaigns.

In one embodiment, inventory is known just one day in advance, but campaigns generally are booked days, weeks, or months in advance. Campaigns are frequently timed to match external events such as sales or movie releases, so predictability can be important. The Audio Ads IMS 1300 deals with these competing factors by forecasting inventory. Currently, a simple exponential smoothing method is used to forecast inventory many months in advance. In other embodiments, the method accounts for trends or seasonality. Alternatively, different forecasting models are applied on a station by station basis.

Figure 13:
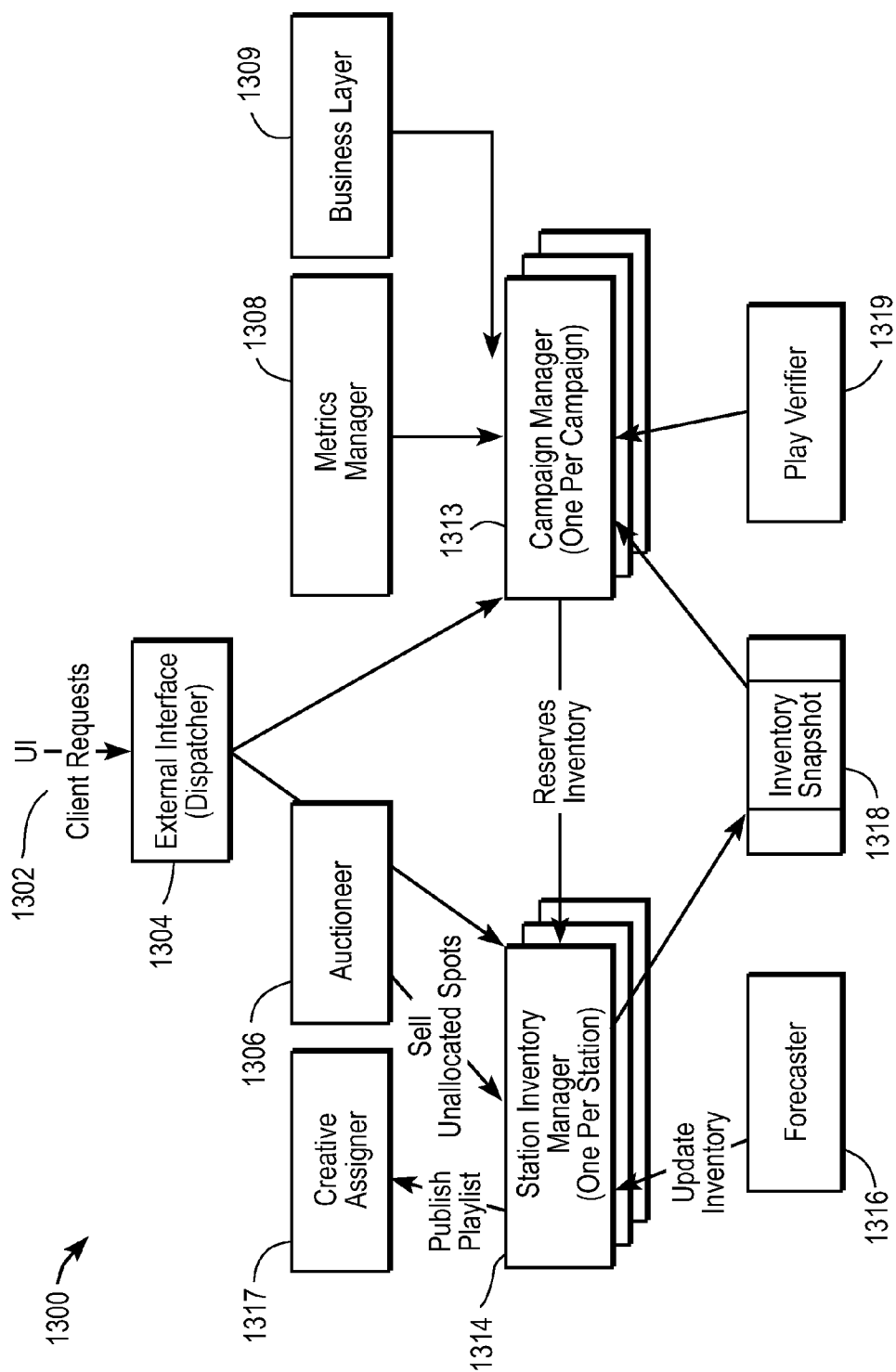
FIG. 13 is a block diagram showing elements used to schedule advertisements in a preferred embodiment of the present invention.

FIG. 13 is a block diagram showing elements in scalable IMS (Inventory Management System) 1300 used to schedule advertisements in a preferred embodiment of the present invention. The system 1300 places radio ads on select radio stations, matching advertiser campaigns and creatives with available advertising spots on radio stations.

The External Interface 1304 provides external access to the system 1300 through a UI 1302, examples of which are shown above in FIG. 9. UI 1302 interacts with the rest of system 1300 to create and manage campaigns and for reporting. A Station Inventory Manager (SIM) 1314 manages all inventory for a single station. It maintains information about each spot such as whether it is an actual available spot or a forecast spot; whether it is available, reserved, or booked; the priority of the campaign that booked it; when it was booked; who booked it; and so forth. A Forecaster 1316 is responsible for updating the inventory based on the radio station schedule. It can provide exact information for upcoming spots or may forecast future spots based on past history. A Campaign Manager (CM) 1313 manages a single campaign, buying inventory on behalf of the campaign to meet campaign goals, and buying new inventory if its existing inventory is lost or fails to play. On a regular basis, SIMs 1314 record their current allocations to persistent storage. A Creative Assigner 1317 then assigns creatives to spots (using the allocations produced by the SIMs 1314) and produces the final play list.

Each of the components in the diagram can be implemented as a separate process and could be allocated to its own machine. In other embodiments, however, for efficiency purposes, multiple SIMs will be grouped together in one task, and the Forecaster will be implemented as classes and run within the SIM's JVM (if the SIM is implemented in Java).

Components

An overview of each of the components of system 1300 is given below.

External Interface (Dispatcher) 1302

All external access to the system 1300 goes through the External Interface. The External Interface provides methods for creating and managing campaigns and for examining inventory. Methods for creating and managing campaigns will be used by the Audio Ads front-end to provide the advertiser user interface. Methods for examining inventory will be used primarily by reporting tools.

Station Inventory Manager 1314

The Station Inventory Manager (SIM) manages all inventory for a single station. It maintains a list of all known spots for that station and automatically allocates spots to particular campaigns. Since spots are forecasted, it is possible for a campaign to book a spot that later disappears from inventory. Whenever a booked spot is removed from inventory, the Campaign Manager that owns that spot will try to make up the loss.

Each spot in the inventory has a priority which matches the priority of the campaign that allocated the spot. When a campaign requests spots from the SIM, the SIM can allocate unassigned spots or spots with a lower priority than the requesting campaign. In this way, each campaign has a different view of available inventory that depends on the campaign priority. This feature is intended to allow different campaign types, such as guaranteed campaigns (where specific spots are sold in advance) and open campaigns (where spots can be taken by someone willing to pay more). It also allows urgent, high priority campaigns to take inventory from less important campaigns. If necessary to reduce memory requirements, inventory older than one day may be discarded.

Spots in the inventory have, among other attributes, a unique identifier, a play date, a play time, a length, an accuracy (actual or forecast), a booking status (available, reserved, or booked), a priority (taken from the priority of the booking campaign), a booking date, and a booking campaign. These attributes are merely examples. In other embodiments, spots in inventory may have a greater or lesser number of attributes.

Spots can be reserved on a temporary basis by a campaign so that a potential buy can be displayed to a user for approval. If the spots are not booked within the timeout period they will be returned to inventory in the same state they were in before the reservation. A campaign may only book spots that it has previously reserved. In one implementation, reserved spots cannot be reserved or booked by campaigns at the same or lower priority than the owning campaign.

Campaigns do not query inventory but instead request to reserve or book inventory. This avoids concurrency issues that would arise if a campaign requests a view of inventory but that inventory is taken by another campaign before the first campaign can reserve it. All reservations and bookings are automatic so that a campaign can be guaranteed that spots that it has booked actually belong to it. Of course, campaigns with a higher priority can still take that inventory from the booking campaign, which will need to book alternate spots to make up for the loss. For reporting and recovery purposes, the SIM will support general queries of existing inventory, but such queries should be infrequent.

When a campaign requests spots, it should make a request such as "reserve N spots of this length on this day and in this daypart". The SIM will search its inventory and do the best it can to honor the request while taking into account station rules such as maximum number of spots assigned to a single campaign, no back-to-back spots assigned to a single campaign, and so forth. The SIM manages stitching issues by coalescing adjacent shorter spots when possible and by preferentially fulfilling requests with stitched spots. For example, if a SIM has a 60-second spot available, it may assign half of it to a 30-second campaign and then assign the second half to the very next 30-second campaign.

The following sequence of events takes place in response to requests:

On reserve:
    matching spots are removed from inventory
    the reservation is timed so that spots can be restored after the timeout On book (only reserved spots can be booked):
    the spots are allocated to the booking campaign On release (either explicit or via timeout):
    if the spot is currently booked: the spot is marked as available
    if the spot is currently reserved: the spot is returned to its pre-reservation state Campaign Manager 1313

The Campaign Manager manages a single campaign, buying inventory on behalf of the campaign to meet campaign goals, and buying new inventory if its existing inventory is lost or fails to play.

When a campaign is booked, a Campaign Manager is created for that campaign which then attempts to reserve (and subsequently book) the inventory that will fill the campaign goals. It queries the Metrics Manager 1308 to learn of radio stations, AQH, CPM, etc., and determines which stations it should attempt to buy from. There will be an Inventory Snapshot 1318 available to the Campaign Manager that holds a slightly stale view of inventory. This snapshot can be used to refine the initial inventory request. For example, a campaign may wish to spread its purchases equally across markets and may need to know its chances of getting inventory in specific markets before finalizing the purchases. If any of its purchases are unsuccessful, the Campaign Manager will attempt to buy alternate spots until its goals are met.

As inventory changes due to higher priority campaigns taking inventory or because of play failures, the Campaign Manager will learn of these changes. When inventory is lost the Campaign Manager must attempt to "make good" by buying alternate spots. The Campaign Manager will attempt to buy a spot that is roughly equivalent to the spot that was lost. No other considerations will be taken when buying a "make-good" spot.

The Campaign Manager does not know the precise state of the inventory when it determines what buys to attempt. It should request N spots from the radio stations in its market within the days and dayparts that meet its criteria, while in one embodiment making a small number of large requests rather than a large number of small requests. Some of those requests will succeed and others will fail or will be only partially fulfilled. Once the Campaign Manager knows the status of all its requests, it will determine if additional buy attempts are needed to meet its goals. It may be possible that, to meet proper market or daypart distribution, a Campaign Manager will want to return spots to inventory. This is allowed if the spots have been reserved but not yet booked, and the returned spots will revert to their prior status. However, this mechanism is expected to be a small fraction of total buys.

A campaign can be paused, in which case no spots for that campaign will be actually played (unless they have already been queued to the station). The spots will not be returned to inventory unless the campaign is cancelled. If spots from a paused campaign need to be filled, they will be auctioned off by the Auctioneer. When a campaign is resumed it should not lose any of its inventory, except what was auctioned off because its play time has passed. The primary purpose for pausing a campaign would be to temporarily block a campaign because the account holder has not paid its bills. If the account is cancelled, all campaigns for that account should be cancelled; if the account is reactivated, all paused campaigns should be resumed.

If a campaign is cancelled, the Campaign Manager should release its entire inventory. The SIM provides functionality for releasing all inventory belonging to a specific campaign over a range of dates.

As described below in connection with FIGS. 15B and 16B, campaign manager 1313 can bid in accordance with a criterion, including an external criterion.

Pricing Engine

In the above-described embodiment, campaign pricing is currently determined on a campaign-by-campaign basis through negotiation with the advertiser booking the campaign. This is especially true of nationwide campaigns that buy guaranteed spots. In other embodiments, however, pricing is more dynamic and able to be set online or automatically while booking the campaign. In the embodiment of FIG. 12, the Campaign Manager 1313 uses a Pricing Engine to determine the price of spots it buys. The price from the Pricing Engine is passed to the SIM, which uses it to determine which campaigns to prefer when allocating inventory.

In one embodiment, the Pricing Engine associates each spot with a price at which a Campaign Manager can reserve it as part of a guaranteed campaign. In one implementation, the pricing set by the engine may vary based on buy type, buyer, and/or other factors.

In one embodiment, the Pricing Engine is part of the Campaign Manager. In other embodiments, the Pricing Engine is a component separate from the CM 1313.

Metrics Manager 1308

The Metrics Manager has the job of maintaining and providing station metrics for all stations supported by IMS 1300. The Campaign Manager can learn all relevant information about potential inventory from the Metrics Manager. In some embodiments, IMS 1300 also contains a business layer that determines, for example, which stations are online, what a station's format is, and what a station's market is. In other embodiments, these functions are also performed by the Metrics Manager. Metrics Manager also tells the Campaign Manager what demographics a station caters to, and what their listener numbers are. The Campaign Manager 1313 accesses the Metrics Manager 1308 and business layer 1309 to receive information. For example, the Campaign Manager can request the average listeners as reported by Arbitron for certain dayparts on certain stations. Alternatively, data from other survey or research companies can be used. The Campaign Manager can further request from the Metrics Manager 1308 data corresponding only to a specific demographic at which the campaign is targeted.

In one embodiment, the Metrics Manager 1308 holds all its data in a database In one implementation, the Metrics Manager supports various metrics for calculating the value of spots for particular campaigns on alternate research besides Arbitron.data. The Campaign Manager can indicate which research or metric type to use, and the Metrics Manager finds and normalizes the data before returning the values.

Forecaster 1316

The Forecaster's primary responsibility is to predict and adjust inventory for a station. For efficiency purposes, the Forecaster may run in the same process as the SIM 1314.

At the end of each day or other period, as the station's schedule is confirmed and the schedule performance for the prior day or period becomes known, the Forecaster should recalculate both known and expected inventory for the coming days or periods. This forecast will add new spots to inventory, remove existing spots from inventory, or adjust the play time of existing spots. If inventory is lost, the owning campaign is notified so that it can buy additional, "makegood" inventory. Note that in one embodiment, when determining which spot to eliminate, the spot within the daypart with the lowest priority should be removed.

Inventory for the immediate future should be known precisely, while inventory further in the future is be predicted. The accuracy of the prediction should be marked in the inventory and adjusted as the data becomes more precise. For example, spots for "tomorrow" might be accurate to the minute, while spots for "next month" might be accurate only to a daypart. In addition to accuracy, the forecaster also predicts the reliability of the inventory, based on an analysis of prior station performance and the accuracy of the forecast. If a station frequently schedules inventory but then fails to play it, this will be reflected in the reliability. Spot reliability may be used by the campaign buyer to evaluate the quality of the campaign.

When inventory is moved to more accurate times, it may be possible that the spots within a daypart can no longer be correctly allocated to all the campaigns that have booked spots within that daypart. For example, it may become impossible to place two spots from the same campaign because they would play too close to each other. If this should happen, the Forecaster will need to take inventory from a campaign and deallocate it. Campaign Managers are notified of any spots they lose.

In one embodiment, forecaster 1316 uses a Holt-Winters exponential smoothing method, which takes into account both trends and seasonality. The architecture supports applying different forecasting models on a station by station basis.

While the actual computation of the forecast is very fast, especially with exponential smoothing methods which can complete their computation with the addition of just a single new number, updating the inventory can be computationally expensive. The reason for this is that the Forecaster must update existing inventory by adding new spots, removing lost spots, or adjusting the play time of existing spots. Therefore, in one embodiment, the Forecaster either maintains its own copy of all existing inventory, or it queries the SIM to learn its inventory. It then calculates deltas from existing inventory to new inventory and applies the changes. For these reasons it is expected that the Forecaster will best be implemented in the same process as the SIM so that expensive, large-payload process-to-process communication is avoided.

Since the inventory update process only adds, removes, or adjusts the play time of inventory, it should be able to execute while the SIM is processing requests from the Campaign Managers. One time this would be an issue is if an update of an existing spot changes its daypart after a campaign has bought the spot but before the response has been sent, since the Campaign Manager would thus receive stale data which might alter its goal calculations. To avoid this, changes to a spot's play time (which occurs infrequently) should be synchronized with spot reservation.

Play Verifier 1319

At the end of each day the Play Verifier 1319 examines the play history for each station and determines if spots that were allocated failed to play. The owning Campaign Manager is notified for each failure. In one embodiment, Campaign Managers attempt to make good any play failures.

Creative Assigner 1317

When the final play list needs to be generated for a station, the Creative Assigner will read the persistent allocations written by the SIM(s), assign creatives to specific spots (allocations), and make the play list available to the Audio Server. As described below in connection with FIG. 16A, creative assigner 1317 can perform copysplitting in accordance with a criterion, such as an external criterion or a criterion based on effectiveness of previous plays.

Auctioneer 1306

The Auctioneer performs an auction on a regular basis when there are spots to be sold to open campaigns that have not be sold to guaranteed campaigns. The number of campaigns competing for the spots can potentially be quite large.

The method for performing the auction are as follows:

The Auctioneer opens bidding for unsold spots.

Open Campaign Managers that are interested in the station examine the Inventory Snapshot to determine what spots may potentially be bid upon.

Each Open Campaign Manager sends its bids to the Auctioneer.

The Auctioneer waits a reasonable amount of time for all bids to come in. This interval should be short enough to ensure timely completion of the auction but lengthy enough that normal latency is accounted for.

The Auctioneer picks the winning bid and books the spot with the SIM.

The Auctioneer notifies all winning Campaign Managers so that they can update their campaign status.

In one embodiment, the auction is run on a scheduled basis. Bidding will remain open for a number of minutes determined via configuration, for example about 10 minutes. Open Campaign Managers must examine the schedule and place bids in a timely manner. However, not all campaigns bid at the same time. In one embodiment, Open Campaign Managers will randomize the times at which they will place bids, to reduce peak bandwidth requirements.

Since the auction is only taking place for unallocated spots within, for example, one single day, the auction is expected to execute quickly.

Open Campaigns

While the above architecture will handle campaigns of all types and requirements, the special requirements of Open Campaigns can cause a rather large flood of inventory grabs and subsequent losses as higher priority campaigns take those spots. Open Campaigns have market and demographics requirements, but they are designed to take only inventory not allocated to guaranteed campaigns.

Following the above architecture, an Open Campaign would grab all available inventory in its desired markets, up to its price cap. This can be a large number of spots. Further, current business requirements demand that all Open Campaigns compete fairly for inventory, so as new Open Campaigns book inventory, they must, on a random basis, bump other Open Campaigns from their spots. Finally, Open Campaigns have the lowest priority of all campaigns, so as higher priority campaigns are booked, it is possible that the majority of spots they take will already be owned by an Open Campaign. Therefore, in these cases, a Campaign Manager should be notified.

These characteristics of Open Campaigns suggest that, for efficiency purposes, they should be handled separately from other campaigns. That mechanism is described here.

Rather than reserving inventory when an Open Campaign is booked, Open Campaigns will instead compete in an auction for unallocated spots just prior to the spots being published to the allocation list. It will typically cover all unsold inventory for one single day, but the timeframe can be more or less than one day.

The auction to fill spots runs before the SIM publishes its allocations. After the auction has run, allocations may be published. The Creative Assigner then reads the published allocations, assigns creatives, and writes the final play list. Any spots still left unfilled are delivered to the Audio Server unallocated, which will typically result in, for example, a Public Service Announcement being played in that spot. In one embodiment, system 1300 sends more than one ad in the stream to the target (such as a radio station or podcast target). Both ads are initially sent and at a later time, but before either of the ads is played, the system sends an indication of which ad should be played. In another embodiment, both ads are played, but the system 1300 sends an indication of their relative percentage of play time.

In one embodiment, system 1300 sends more than one ad in the stream to the target, such as a radio station or podcast target. Both ads are initially sent and at a later time, but before either of the ads is played, the system 1300 sends an indication of which ad should be played. In another embodiment, both ads are played, but the system 1300 sends an indication of their relative percentage of play time.

Figure 14:
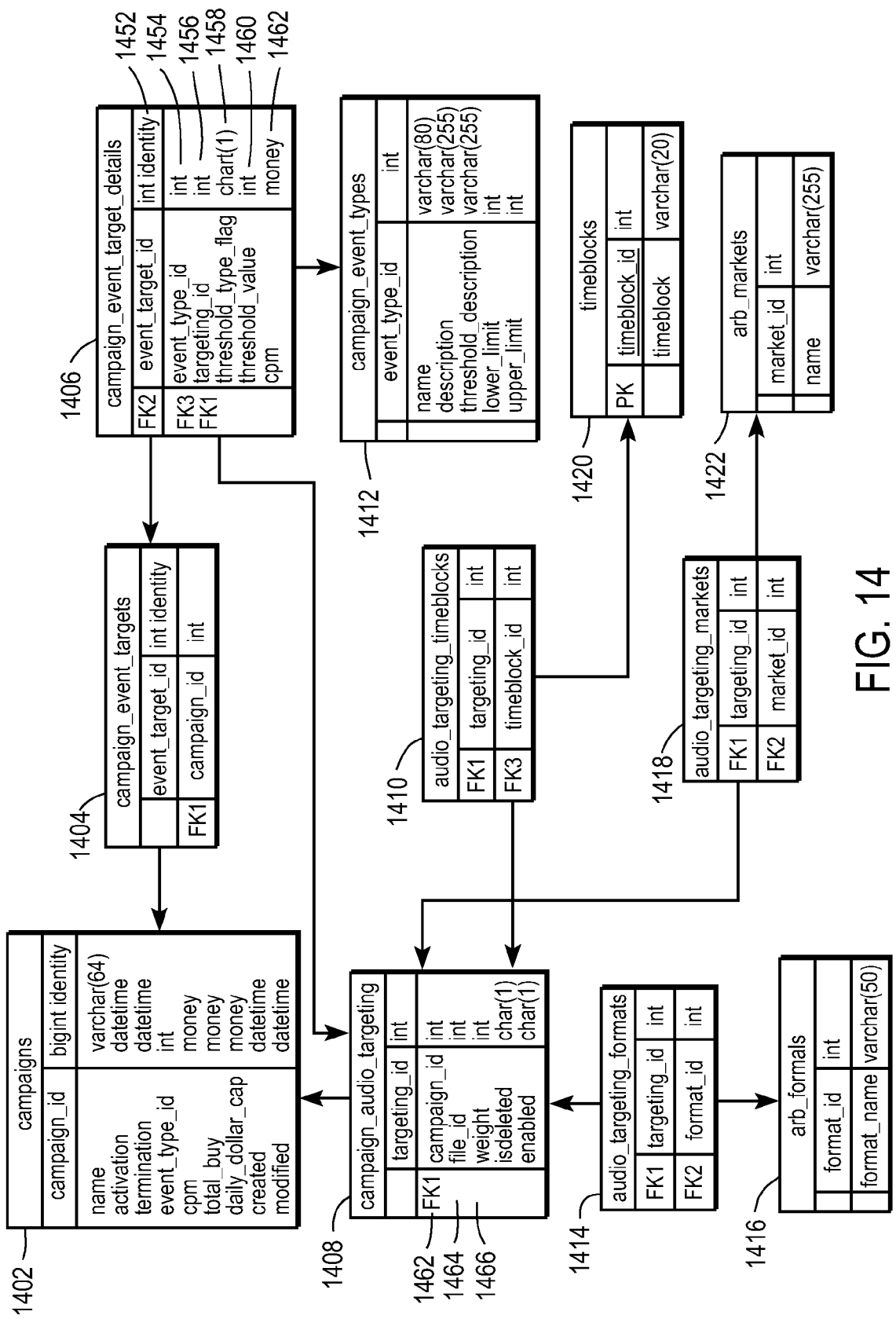
FIG. 14 shows example formats of data tables used in an embodiment of the present invention.

FIG. 14 shows tables used in an embodiment of the invention. These include a campaign table 1402; and a campaign events target table 1404. These events can be feedback based events as described herein. FIG. 14 further shows a campaign event target details table 1406 (one for each criterion); a campaign audio targeting table 1408, an audio targeting timeblocks table 1410; a campaign event type table 1412; an audio targeting formats table 1414; an arb_formats table 1416; an audio targeting markets table 1418; a timeblocks table 1420, and an arb_markets table 1422.

The tables supporting use of feedback include the campaign event target details table 1406, which can occur for each criterion set by the advertiser. These criteria can relate to creative placement (i.e., copysplitting), in which case the system references the campaign audio targeting table 1408. These criteria can also relate to the campaign and where and when it places ads, in which case, the system references the campaigns table 1402.

All campaign events have a campaign event type ID 1412, which includes a name, description, threshold description, and an upper and lower limit, which are preferably used for error checking. Assume, for example, the advertiser specifies "if the pollen count is above W use a CPM of X and above Y use a CPM of Z. In this example, there would be two instances of an event 1406: one for a pollen count of W and one for a pollen count of Z. Each event 1406 includes an event type ID 1454 (i.e., pollen count, temperature, sports scores, etc) as discussed above. It also contains a targeting ID 1456 which specifies whether it is related to creatives or campaigns. It also contains a threshold type flag 1458, which specifies whether the criterion depends on a value being greater than, lesser than, equal to, or some other measurement, as discussed above. Here, the threshold type flags would be indicates "greater than." It also contains a threshold value 1460. Here, the values for the first event would be W and for the second event would be Y. If the criterion relates to using a specific CPM if a criterion is met, the table 1406 contains a CPM value 1462. Here the first event would have a CPM of X and the second event would have a criterion of Z. If the events are campaign based (as in this example), they are used to help schedule campaigns as discussed further below.

If the event is creative based, it is not used for scheduling, but to decide which creative to play in a particular spot. Table 1408 contains a campaign ID 1463, a file ID 1464, which identifies the specific creative that will play if the criterion is met (and the rule/event containing the criterion is not trumped by another rule), and a weight 1466. In this embodiment, the weight denotes a percentage of total time that the creative is to play in a particular spot.

Figure 15A:
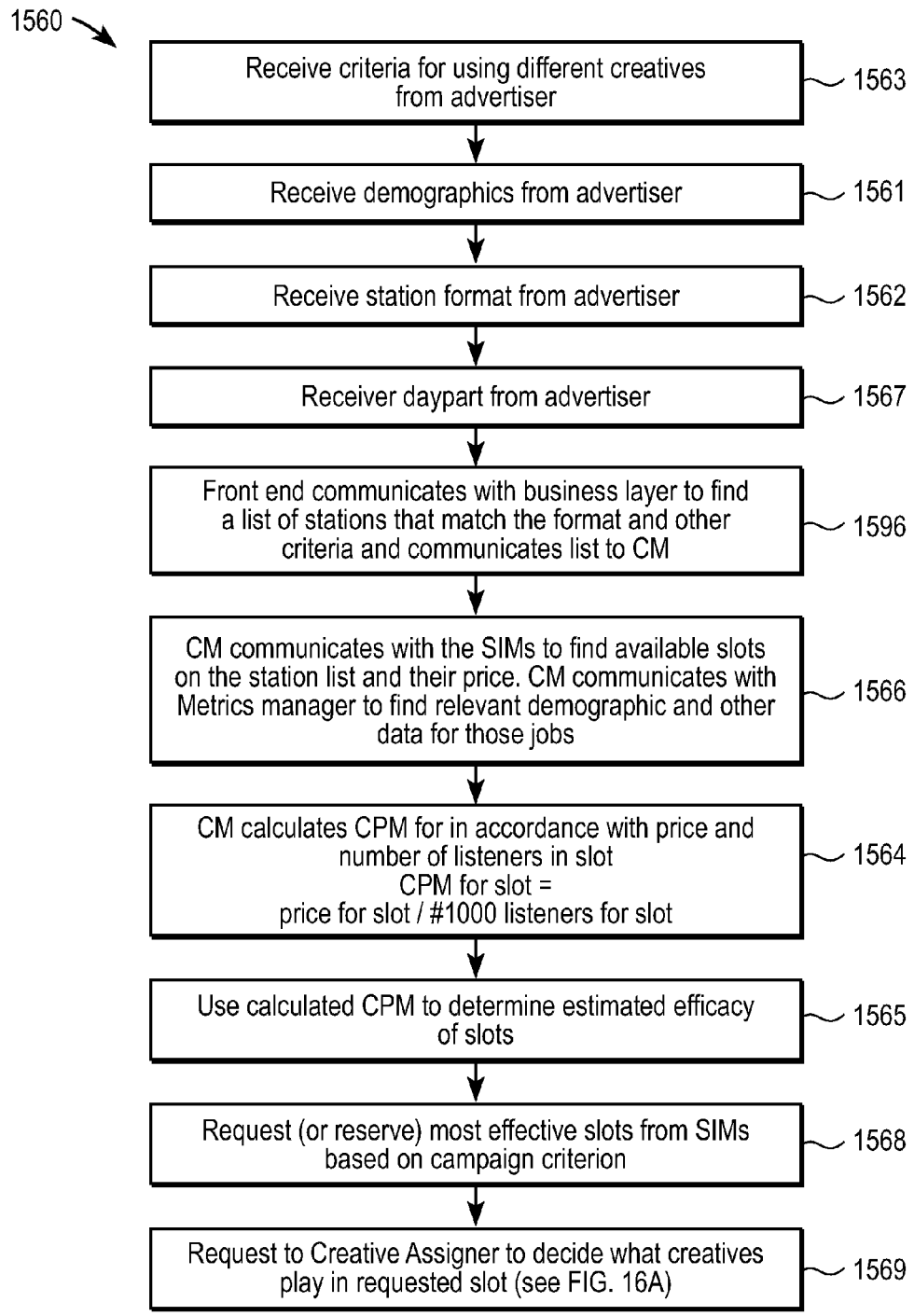
FIG. 15A is a flow chart showing a method used by a campaign manager in a guaranteed campaign.

FIG. 15A is a flow chart showing 1560 a method used by Campaign Manager 1313. This flow chart shows actions performed by CM 1313 and other elements of system 1300 to determine effective slots in which to place ads in accordance with an advertiser-entered criterion in a guaranteed campaign. In element 1563, CM 1313 receives from an advertiser at least one criterion for using different creatives. In element 1561, CM 1313 receives from an advertiser demographics for the campaign. For example, the advertiser may specify that the campaign is directed toward adults age 18-24. In element 1562, CM 1313 receives a station format from the advertiser (for example, light rock). In element 1567, CM 1313 receives a daypart from the advertiser (such as morning drive time). The order of at least elements 1563-1567 can change in other embodiments. Other embodiments can receive other information from advertisers that may affect play of advertising or other creatives. The front end communicates 1596 with a business layer to identify a list of stations that fit the user's specifications (which can include formats, etc.). This information is passed to the CM with other user inputs. In element 1566, CM 1313 knows what spots are available from the SIMs inventory. CM 1313 communicates with the Metrics Manager to find relevant demographic and other data for those slots. The CM requests price information for the slots from the SIMs. In element 1564, CM 1313 calculates CPM in accordance with a price and a number of listeners in slot.

CPM=price for slot/#1000 listeners for slot

In element 1565, CM 1313 uses the calculated CPM to determine the estimated efficacy of the slot based on the campaign criteria. In element 1568, CM 1313 requests or reserves from the SIM 1314 the most effective slots. In element 1569, Creative Assigner decides which creative to play in a requested slot. An example of this element is shown in FIG. 16A.

Figure 15B:
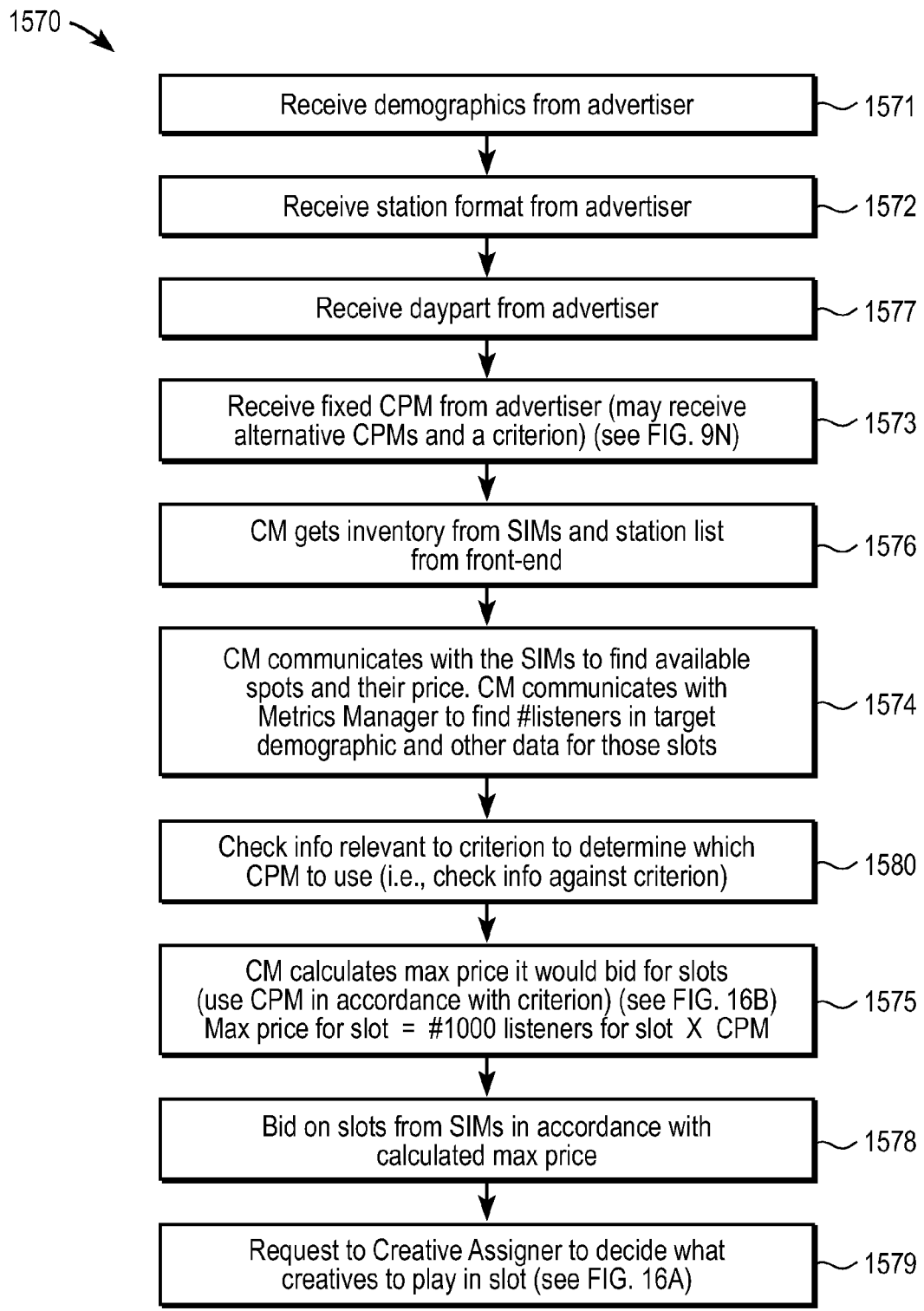
FIG. 15B is a flow chart showing a method used by a campaign manager in an open campaign.

FIG. 15B is a flow chart 1570 showing a method used by Campaign Manager 1313. This flow chart shows actions performed by CM 1313 to determine effective slots in which to place ads in accordance with an advertiser-entered criterion in an Open campaign.

In element 1571, CM 1313 receives from an advertiser demographics for the campaign. For example, the advertiser may specify that the campaign is directed toward adults age 18-24. In element 1572, CM 1313 receives a station format from the advertiser (for example, light rock). In element 1577, CM 1313 receives a daypart from the advertiser (such as morning drive time). The order of at least elements 1571-1577 can change in other embodiments. Other embodiments can receive other information from advertisers that may affect placement of advertising or other creatives. In element 1573, CM 1313 receives a fixed CPM value from the advertiser. As shown in FIG. 9N, the advertiser may enter alternative CPMs and a criterion (such as a value for pollen count). In element 1576, the CM 1313 gets inventory list from the SIMs and a station list that matches (for example) the specified format(s) from the front-end. In element 1574, the CM 1313 communicates with SIMs to find available spots and their price and communicates with Metrics Manager 1308 to find a number of listeners in the target demographic and possibly other data for those slots. In element 1580, CM 1313 checks information relevant to the criterion to determine which CPM to use (i.e., it checks the received information against the criterion). In element 1575, CM 1313 calculates a maximum price that it would bid in accordance with a price and a number of listeners in slot.

Max price for slot=#1000 listeners for slot×CPM

In element 1578, CM 1313 uses the calculated max price to communicate with SIM 1314 to bid on spots. In element 1579, Creative Assigner decides which creative to play in a slot resulting from the auction. An example of this element is shown in FIG. 16A.

Figures 16A, 16B:
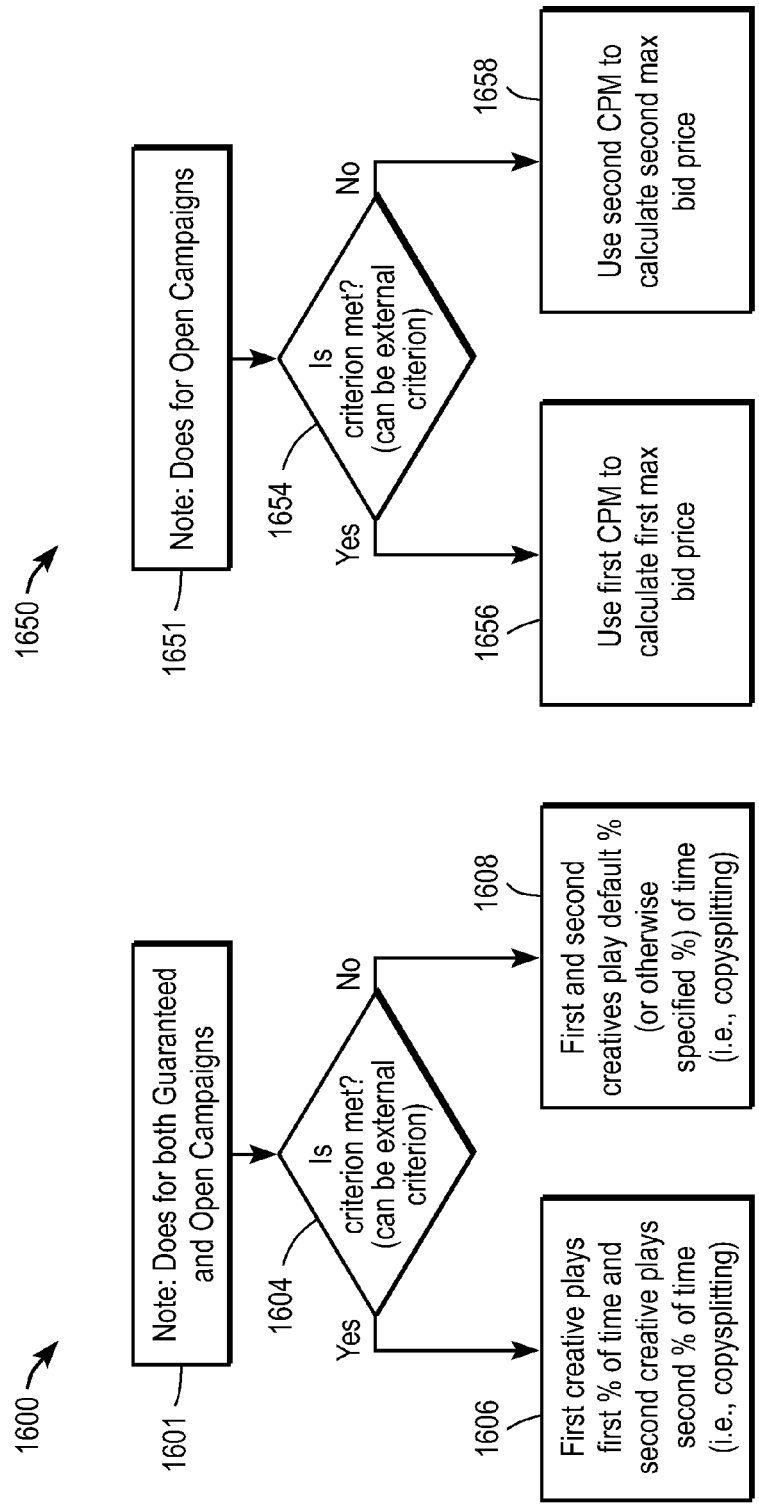
FIG. 16A is a flow chart showing a method determining which creative to play in accordance with criterion entered by the advertiser and a received external value.
FIG. 16B is a flow chart showing a campaign manager bidding differing amounts in accordance with a criterion, such as an external criterion.

FIG. 16A is a flow chart 1600 showing a copysplitting method used by Campaign Manager 1313 that depend on a criterion, such as an external criterion. This flow chart implements the criterion described by the user in FIG. 9M. In the described embodiment, this method is performed by Creative Assigner 1317. In other embodiments, the method could be performed by other appropriate portions of the system or apportioned between more than one part of the system Note that, in one embodiment, the method of FIG. 16A is performed both for open campaigns and for guaranteed campaigns 1601. If a criterion is met 1604 (for example if the pollen count is a specified value), then a first creative is scheduled in such a way that it plays for a first percentage of time, while a second creative is scheduled so that it plays for a second percentage of time. This is known as copy-splitting, although here, the percentage of the copy-splitting is dependent on the evaluated criterion.

The criterion can be an external criterion, as discussed above, such as pollen count, weather, and so on. In some embodiments, multiple criteria can be specified. In these cases, the advertiser can set the order of priority for overlapping or conflicting rules.

FIG. 16B is a flowchart 1650 showing a method of a bidding rule used by the campaign manager 1313 in accordance with a criterion, such as an external criterion. Note that, in one embodiment, the method of FIG. 16B is performed for open campaigns 1651. It will be understood that this bidding rule is only one of a plurality of rules used to schedule creatives. The plurality of rules can be overlapping. In one embodiment, an advertiser can rank the rules to indicate which is followed if there is conflict. This flow chart implements the criterion described by the user in FIG. 9N. In the described embodiment, this method is performed by Campaign Manager 1313. In other embodiments, the method could be performed by other appropriate portions of the system or apportioned between more than one part of the system.

If a criterion is met 1654, then the CM 1313 uses a first CPM to calculate a first max bid price. Otherwise 1658, it uses a second CPM to calculate a second max bid amount. Some embodiments employ multiple conditional bids that may conflict and overlap. The user can specify the priority of those conditional rules. Some embodiments allow multiple criteria in a single rule (i.e., both criteria must be met for the rule to be satisfied).

Figure 17A:
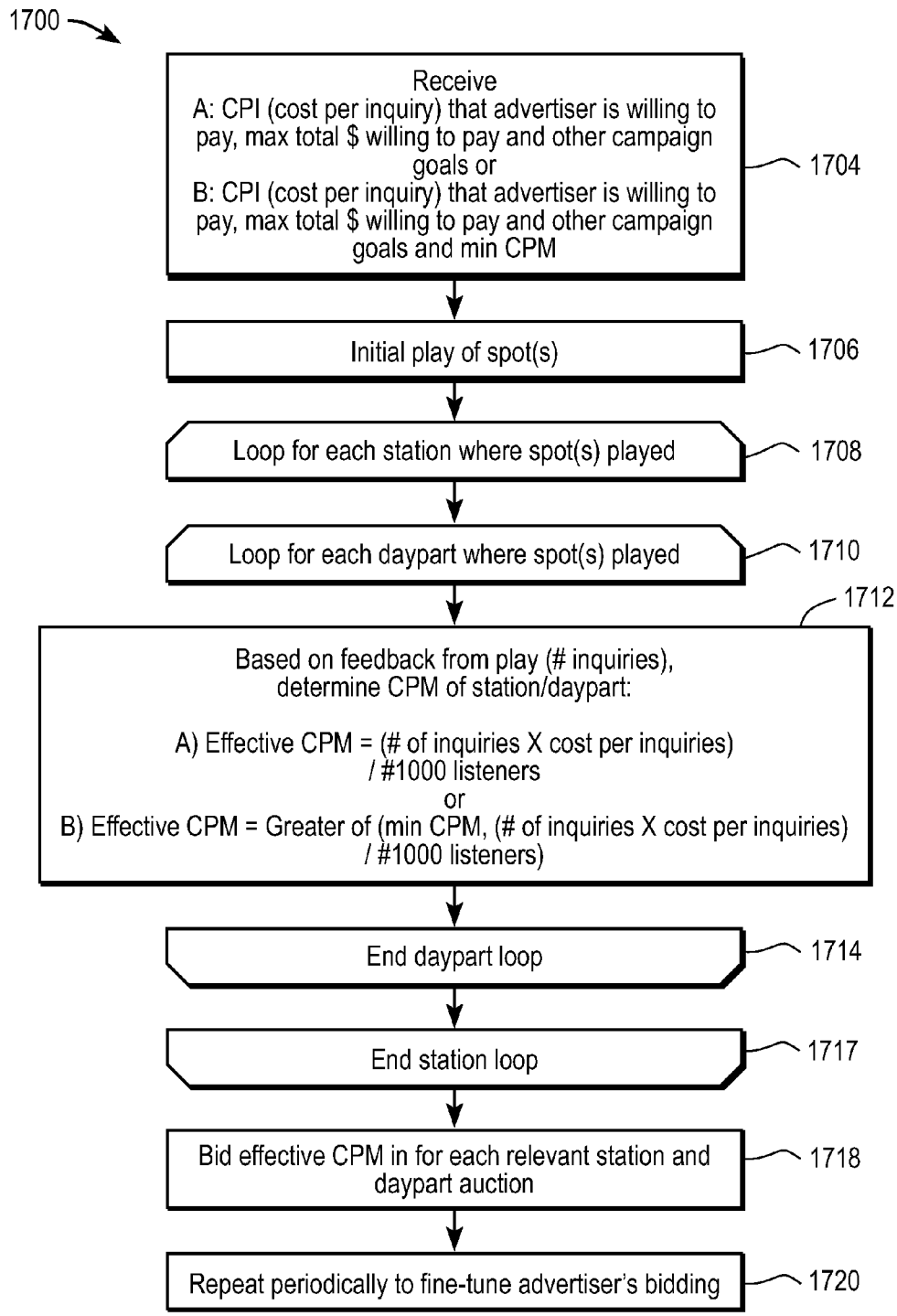
FIG. 17A is a flow chart showing an example method of determining a bid based on feedback from previous plays of a campaign creative in a CPI or CPI with minimum CPM campaign type.

FIG. 17A shows an example 1700 of using feedback from previous plays of an ad spot. In this example, the advertiser is paying based on CPI (cost per inquiry) and using an open (auction) method. The system receives 1704 a CPI that the advertiser is willing to pay and a maximum budget for the campaign, along with other campaign goals. Budgets may be by day, week, month, or other specified time periods. If the campaign is a hybrid campaign, then the advertiser also specifies a minimum CPM value (input B of element 1704). The system determines initial slots for the campaign. This may be accomplished by simply allocating a percentage of open slots to first-time campaigns with no bidding needed, or by human beings or the system estimating a starting CPM based on historical knowledge about the advertiser or on knowledge of the field. Then, the system waits for a period of time (such as an hour, a day, a week or some other time period) while the spot initially plays in advertiser-selected markets 1706. While the spot is having initial play, a third party system and/or a portion of system 1300 (not shown) collects data about the effectiveness of the spot in its various times and markets.

For example, the spot may have played in Houston and San Antonio at roughly the same days, time, and number of plays. The system generates 1712 an effective CPM using, for example, one of formulas A or B, for each station and daypart. Effective CPM could also be determined for other attributes such as each creative, each format, each audience demographic, and so on. If the collected feedback data indicates that the Houston spot generated 4 inquiries and the San Antonio spot generated 2 inquiries for a particular daypart, the cost per inquiry that the advertiser has agreed to pay is $10, and the two stations have roughly the same number of listeners (e.g., one thousand) then the CPMs for that daypart are (using calculation A in element 1712):

Houston effective CPM=40×$10/#1000 listeners in daypart=4×10/1=$40

San Antonio effective CPM=20×$10/#1000 listeners in daypart=2×10/1=$20

In a hybrid system using a min CPM of $30, the cost would be:

Houston effective CPM=greater of(30,(4×$10/1)=$40

San Antonio effective CPM=greater of(30,(2×$10/1) =$30

The system will bid the effective CPM in each relevant station and daypart auction 1718. This method is repeated periodically 1720 to fine-tune the advertiser's bidding.

Figure 17B:
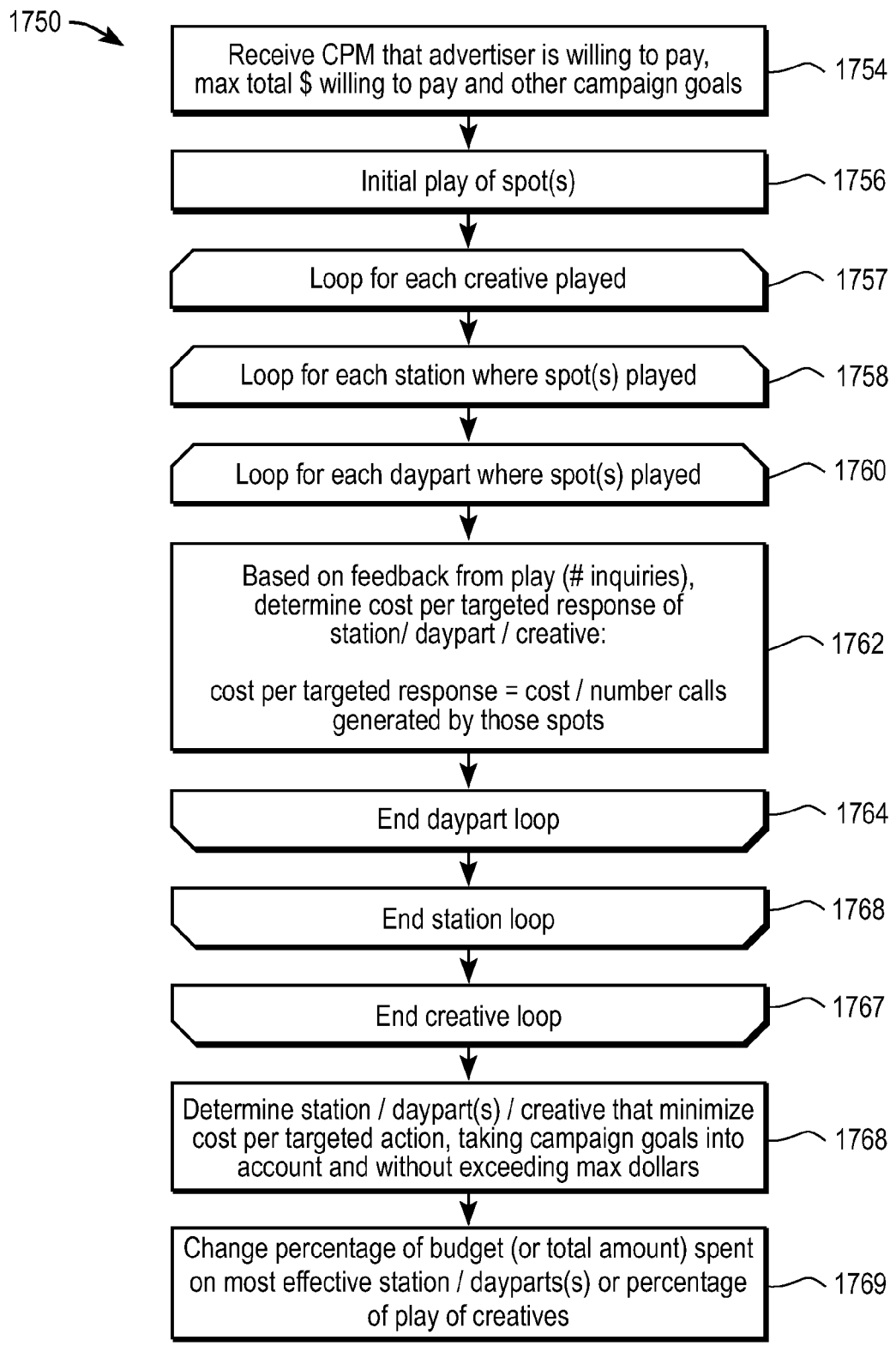
FIG. 17B is a flow chart showing an example method of determining a bid based on feedback from previous plays of a campaign creative in a CPM campaign type.

FIG. 17B shows another example 1750 of using feedback from previous plays of an ad spot. In this example, the advertiser is paying based on CPM (cost per thousand listeners). The system receives 1754 a CPM that the advertiser is willing to pay and a maximum budget for the campaign, along with other campaign goals. Budgets may be by day, week, month, or other specified time periods. Then, the system waits for a period of time (such as an hour, a day, a week or some other time period) while the spot initially plays in advertiser-selected markets. While the spot is having initial play, a third party system and/or a portion of system 1300 (not shown) collects data about the effectiveness of the spot in its various times and markets.

For example, the spot may have played in Houston and San Antonio at roughly the same days, time, and number of plays. The system generates 1762 a cost per targeted response ("CTR") cost per call for each creative, station and daypart. Effective CTR could also be determined for other attributes such as each format, each audience demographic, and so on. If the collected feedback data indicates that the Houston spot generated 4 inquiries and the San Antonio spot generated 2 inquiries for a particular daypart, and the cost of the spots are each $100:

Houston CTR=$100/4=$25

San Antonio CTR=$100/2=$50

The system will determine 1768 which station/daypart(s)/creative minimizes cost per targeted response, taking campaign goals into account and without exceeding max dollars. The system (or the system with the advertiser's approval) will then change 1769 the percentage of the total budget (or total amount) spent on most effective station/dayparts(s). In some embodiments, instead of or in addition to changing the budget allocation, the system may change the percentage of play of creatives to play effective creatives more often. This method is repeated periodically to fine-tune the advertiser's spending (not shown).

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a server computer for managing an advertising campaign on behalf of an advertiser, the method comprising:

receiving, from the advertiser, information for scheduling a plurality of plays of an advertisement, the received information including all of: a target broadcast station format, a target broadcast time, an external criterion, a first cost-per-thousand listeners (CPM) for when the external criterion is present, and an alternative CPM for when the external criterion is not present;

receiving, from an associated station inventory manager of each of a plurality of broadcast stations, an indication of unsold advertising slots across the plurality of broadcast stations, each slot having an associated broadcast station format and broadcast time;

identifying, by a processor executing a campaign manager module, an unsold advertising slot from among the unsold advertising slots having a broadcast station format that satisfies the target broadcast station format and a broadcast time that satisfies the target broadcast time;

determining, by a processor executing a metrics manager module running on the server computer in communication with a hub that accesses information on the status of certain external factors, whether the external criterion is met at the broadcast time of the identified unsold advertising slot; and bidding in an auction, by a processor executing an auctioneer module running on the server computer, for the identified unsold advertising slot using the first CPM when the external criterion is met at the broadcast time of the identified unsold advertising slot, or using the alternative CPM when the external criterion is not met at the broadcast time of the identified unsold advertising slot.

2. The method of claim 1, further comprising receiving, from the associated station inventory manager of each of the plurality of broadcast stations, an indication of audience demographic characteristics for each unsold advertising slot.

3. The method of claim 1, wherein the unsold advertising slots comprise slots during terrestrial radio broadcasts.

4. The method of claim 1, wherein the unsold advertising slots comprise slots during satellite radio broadcasts.

5. The method of claim 1, wherein the unsold advertising slots comprise slots during podcasts.

6. The method of claim 1, wherein the unsold advertising slots comprise slots during transmissions over the internet.

7. The method of claim 1, wherein the unsold advertising slots comprise slots during transmissions to mobile phones.

8. The method of claim 1, wherein the plurality of broadcast stations have different audience demographics.

9. The method of claim 1, wherein the plurality of broadcast stations broadcast to different geographic markets.

10. The method of claim 1, wherein said receiving the indication of unsold advertising slots occurs on a day, and the unsold advertising slots are slots for the next day.

11. The method of claim 1, wherein said receiving the indication of unsold advertising slots occurs on a day, and the unsold advertising slots are slots for later the same day.

12. The method of claim 1, wherein the received indication of the unsold advertising slots comprises audience demographic characteristics for each one of the unsold advertising slots.

13. The method of claim 1, wherein the broadcast station format comprises genre of broadcast content comprising one of 80' Hits, Active Rock and Light Rock.

14. The method of claim 1,
wherein the external criterion comprises a predetermined weather condition;
the hub accesses the weather condition and in communication with the processor executing the metrics manager module determines whether the external criterion is met at the broadcast time of the identified unsold advertising slot; and
wherein said bidding for the identified unsold advertising slot comprises:
using the first CPM when the predetermined weather condition is present; and using the alternative CPM when the predetermined weather condition is not present.

15. The method of claim 1,
wherein the external criterion comprises a predetermined traffic condition,
the hub accesses the traffic condition and in communication with the processor executing the metrics manager module determines whether the external criterion is met at the broadcast time of the identified unsold advertising slot; and
wherein said bidding for the identified unsold advertising slot comprises:
using the first CPM when the predetermined traffic condition is present;

and using the alternative CPM when the predetermined traffic condition is not present.

16. The method of claim 1,
wherein the external criterion comprises an occurrence of a predetermined event,
the hub accesses secondary information or a third party and in communication with the processor executing the metrics manager module determines whether the external criterion is met at the broadcast time of the identified unsold advertising slot; and;
wherein said bidding for the identified unsold advertising slot comprises:
using the first CPM after the occurrence of the predetermined event;
and using the alternative CPM before the occurrence of the predetermined event.

17. The method of claim 1,
wherein the external criterion comprises a predetermined use of a keyword,
the hub is associated with databases wherein at least use of keywords are stored and with the processor executing the metrics manager module determines whether the external criterion is met at the broadcast time of the identified unsold advertising slot; and;
wherein said bidding for the identified unsold advertising slot comprises:
using the first CPM when the predetermined use of the keyword has occurred; and using the alternative CPM when the predetermined use of the keyword has not occurred.

18. The method of claim 1,
wherein the external criterion comprises a target wait time of a call center,
wherein the wait time of the call center is provided by information input to the hub and with the processor executing the metrics manager module determines whether the external criterion is met at the broadcast time of the identified unsold advertising slot; and:
wherein said bidding for the identified unsold advertising slot comprises:
using the first CPM when the wait time is less than the target wait time; and
using the alternative CPM when the wait time is more than the target wait time.

19. The method of claim 1,
wherein the external criterion comprises a targeted response to a previous play of the advertisement,
the hub accesses responses to previous plays and in communication with the processor executing the metrics manager module determines whether the external criterion is met at the broadcast time of the identified unsold advertising slot; and;
wherein said bidding for the identified unsold advertising slot comprises:
using the first CPM when the targeted response is met; and
using the alternative CPM when the targeted response has not been met.

20. The method of claim 19, wherein the targeted response comprises a predetermined number of phone calls.

21. The method of claim 19, wherein the targeted response comprises a predetermined number of website hits.

22. The method of claim 19, wherein the targeted response comprises a predetermined number of coupon usages.

23. The method of claim 19, wherein the targeted response comprises a predetermined number of sales.

24. The method of claim 1, wherein the external criterion is unrelated to competitive bidding in the auction.

25. A computer program product for managing an advertising campaign, the computer program product stored on a non-transient computer readable medium, the computer program product comprising instructions that when executed by data processor causes the data processor to perform operations comprising:
receiving, from the advertiser, information for scheduling a plurality of plays of an advertisement, the received information including all of: a target broadcast station format, a target broadcast time, an external criterion, a first cost-per-thousand listeners (CPM) for when the external criterion is present, and an alternative CPM for when the external criterion is not present;
receiving, from an associated station inventory manager for each of a plurality of broadcast stations, an indication of unsold advertising slots across the plurality of broadcast stations, each slot having an associated broadcast station format and broadcast time;
identifying, by a processor executing a campaign manager module, an unsold advertising slot from among the unsold advertising slots having a broadcast station format that satisfies the target broadcast station format and a broadcast time that satisfies the target broadcast time;
determining, by a processor executing a metrics manager module running on the server computer in communication with a hub that accesses information on the status of certain external factors, whether the external criterion is met at the broadcast time of the identified unsold advertising slot; and
bidding in an auction, by a processor executing an auctioneer module running on a server computer, for the identified unsold advertising slot using the first CPM when the external criterion is met at the broadcast time of the identified unsold advertising slot, or using the alternative CPM when the external criterion is not met at the broadcast time of the identified unsold advertising slot.

26. The computer program product of claim 25, wherein the plurality of broadcast stations have different audience demographics.

27. The computer program product of claim 25, wherein the plurality of broadcast stations broadcast to different geographic markets.

28. The computer program product of claim 25, wherein each of the unsold advertising slots comprises audience demographic characteristics.

29. The computer program product of claim 25, wherein said receiving the indication of unsold advertising slots occurs on a day, and the unsold advertising slots are slots for the next day.

30. The computer program product of claim 25, wherein said receiving the indication of unsold advertising slots occurs on a day, and the unsold advertising slots are slots for later the same day.

31. The computer program product of claim 25, wherein the external criterion is unrelated to competitive bidding in the auction.

* * * * *

UNITED STATES PATENT AND TRADEMARK OFFICE
CERTIFICATE OF CORRECTION

PATENT NO. : 8,239,267 B2  Page 1 of 1
APPLICATION NO. : 11/694684
DATED : August 7, 2012
INVENTOR(S) : Chad E. Steelberg It is certified that error appears in the above-identified patent and that said Letters Patent is hereby corrected as shown below:

Column 43, line 38, claim 18, please delete "and:" and insert therefor --and--

Column 44, line 28, claim 25, please delete "the" and insert therefor --a--

Signed and Sealed this
Thirteenth Day of November, 2012

David J. Kappos
*Director of the United States Patent and Trademark Office*